United States Patent
Hayakawa

(10) Patent No.: US 6,765,559 B2
(45) Date of Patent: Jul. 20, 2004

(54) PAGE INFORMATION DISPLAY METHOD AND DEVICE AND STORAGE MEDIUM STORING PROGRAM FOR DISPLAYING PAGE INFORMATION

(75) Inventor: Keisuke Hayakawa, Tokyo (JP)

(73) Assignee: NEC Corporation, Tokyo (JP)

( * ) Notice: Subject to any disclaimer, the term of this patent is extended or adjusted under 35 U.S.C. 154(b) by 379 days.

(21) Appl. No.: 09/811,659

(22) Filed: Mar. 20, 2001

(65) Prior Publication Data

US 2001/0024195 A1 Sep. 27, 2001

(30) Foreign Application Priority Data

Mar. 21, 2000 (JP) .................................... 2000-078220

(51) Int. Cl.[7] .............................................. G09G 5/00
(52) U.S. Cl. ..................................... 345/173; 715/525
(58) Field of Search .............................. 345/173, 174, 345/902, 901, 775, 776, 777, 784, 18.03, 18.05, 18.06, 18.07; 715/525, 503, 505, 909

(56) References Cited

U.S. PATENT DOCUMENTS

| | | | | |
|---|---|---|---|---|
| 5,289,569 A | * | 2/1994 | Taniguchi ................ | 715/525 |
| 5,696,982 A | * | 12/1997 | Tanigawa et al. ........... | 715/528 |
| 5,900,876 A | * | 5/1999 | Yagita et al. ............... | 345/776 |
| 6,225,996 B1 | * | 5/2001 | Gibb et al. ................ | 345/784 |

FOREIGN PATENT DOCUMENTS

| | | |
|---|---|---|
| JP | 63-36426 | 2/1988 |
| JP | 2-144768 | 6/1990 |
| JP | 5-165595 | 7/1993 |
| JP | 5-257991 | 10/1993 |
| JP | 6-236247 | 8/1994 |
| JP | 7-84721 | 3/1995 |
| JP | 8-16353 | 1/1996 |
| JP | 8-76926 | 3/1996 |
| JP | 8-286882 | 11/1996 |
| JP | 9-138745 | 5/1997 |
| JP | 10-40301 | 2/1998 |
| JP | 10-301751 | 11/1998 |

OTHER PUBLICATIONS

Japanese Office Action dated Mar. 16, 2004 with Partial English Translation.

* cited by examiner

*Primary Examiner*—Chanh Nguyen
(74) *Attorney, Agent, or Firm*—McGinn & Gibb, PLLC

(57) ABSTRACT

A page information display method for displaying electronic information includes a page turning operation detecting step of outputting a page turning operation detecting signal when a dragging is made on an operation unit in parallel or unparallel to a predefined page turning direction at a current page read from a storage unit that is to be displayed at present, a next display page setting step of setting a preceding page or a succeeding page immediately before or after a current page depending on a direction of a dragging operation to a next display page to be displayed next, when a page turning operation detecting signal is detected in the page turning operation detecting step, and a page turning process step of displaying the next display page set in the next display page setting step in place of the current page on a display unit.

9 Claims, 67 Drawing Sheets

No pressure

Pressure (medium)

Pressure (large)

Overwrite type

Slide type

Compression type 3D type

FIG.21(A)

| Display dot number data [dot] | Total page number data | Unit tag length | Minimum reference length |
|---|---|---|---|
| 1600 | ap | 1600/ap | 80 |
| 1200 |  |  | 10 |

FIG.21(B)

| Display dot number data [dot] | Total page number data | Tag display area length | Minimum reference length | Unit tag length |
|---|---|---|---|---|
| 1600 | ap | 40 cm | 2 cm | $\frac{40}{ap}$ [cm] |
| 1200 |  | 30 cm | 0.5 cm |  |

*FIG. 29(A)* Tag integral type

*FIG. 29(B)* Plural pages integral type

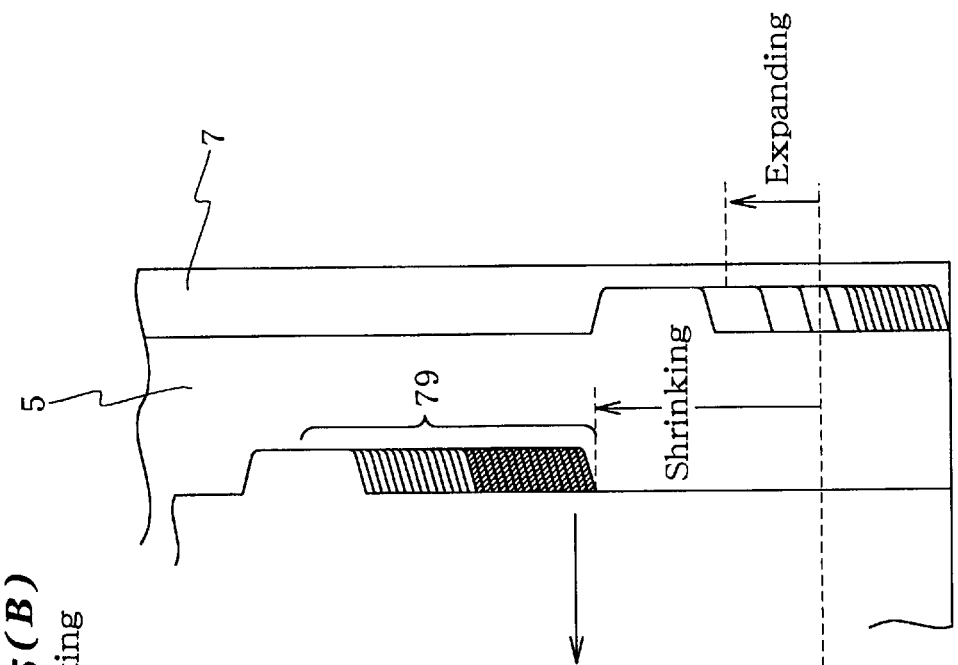
FIG.35(A) Turning plural pages
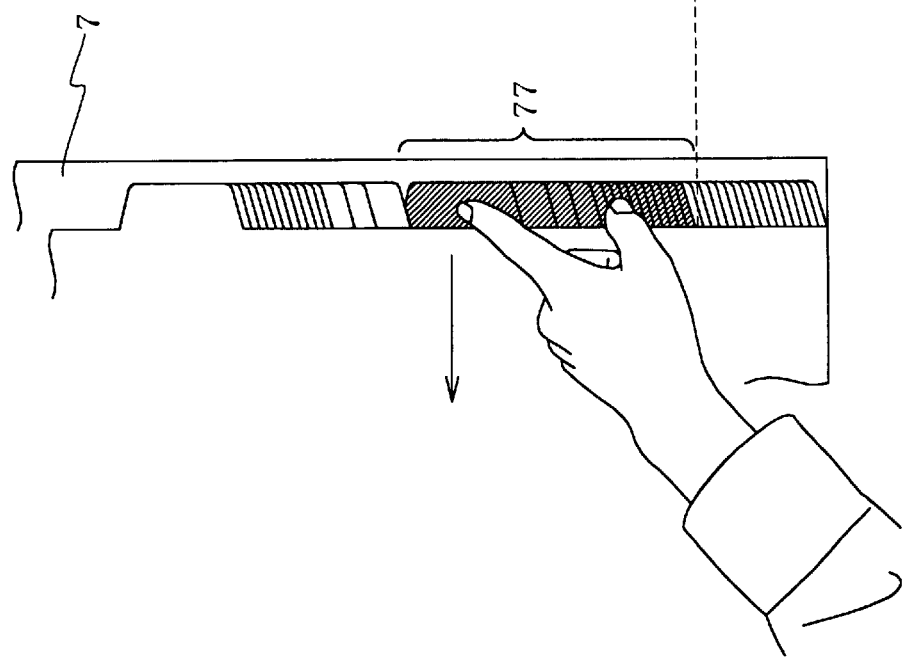
FIG.35(B) Executing

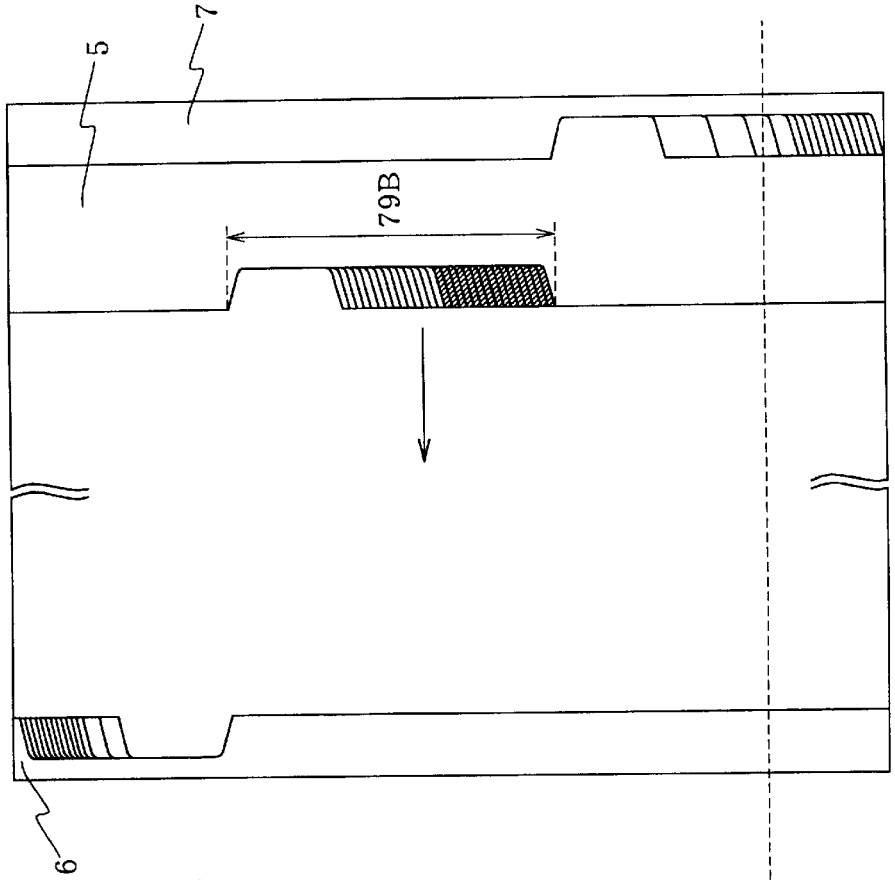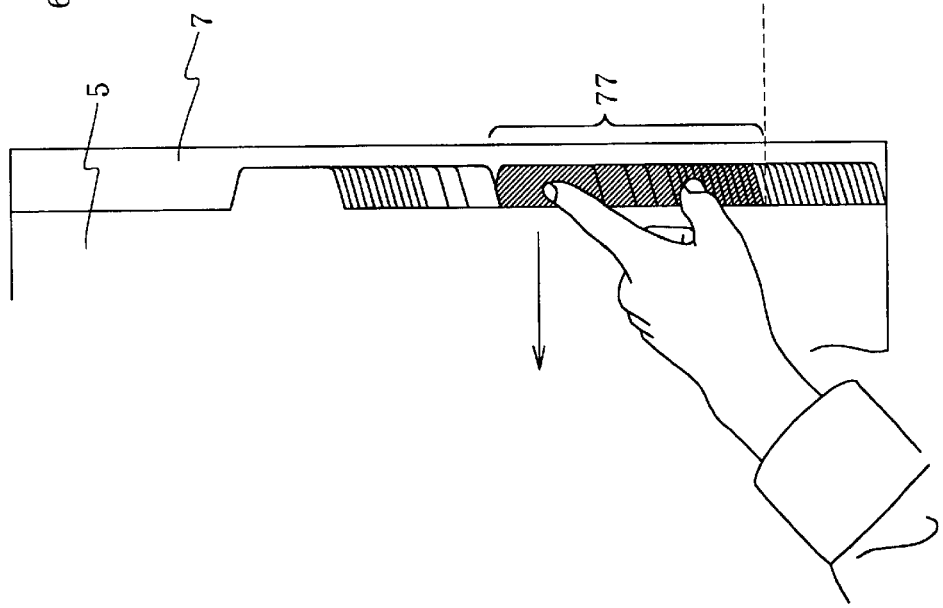

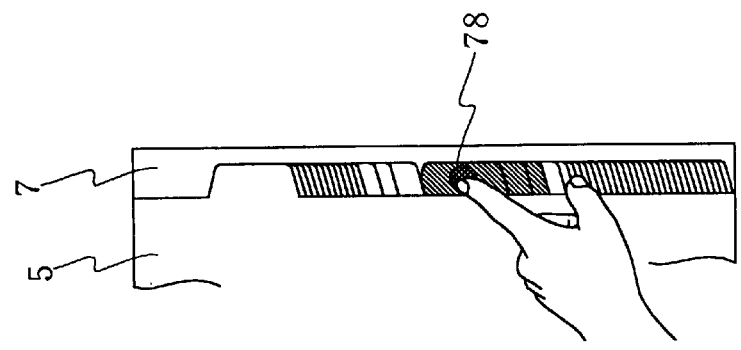
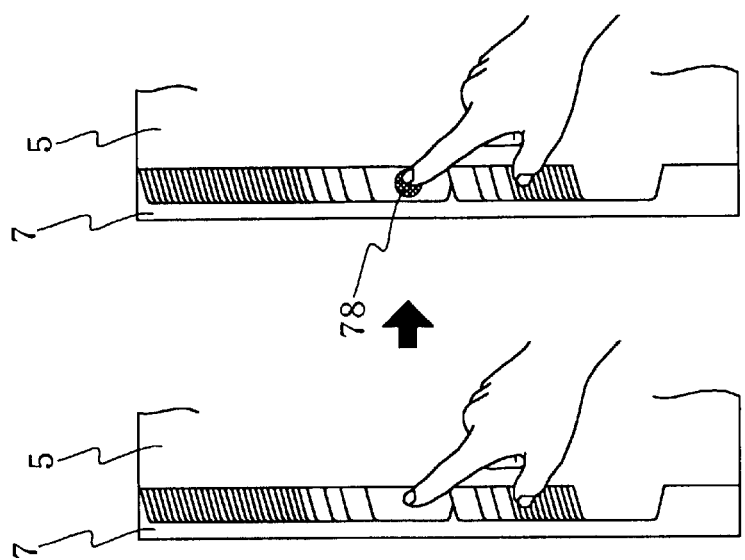
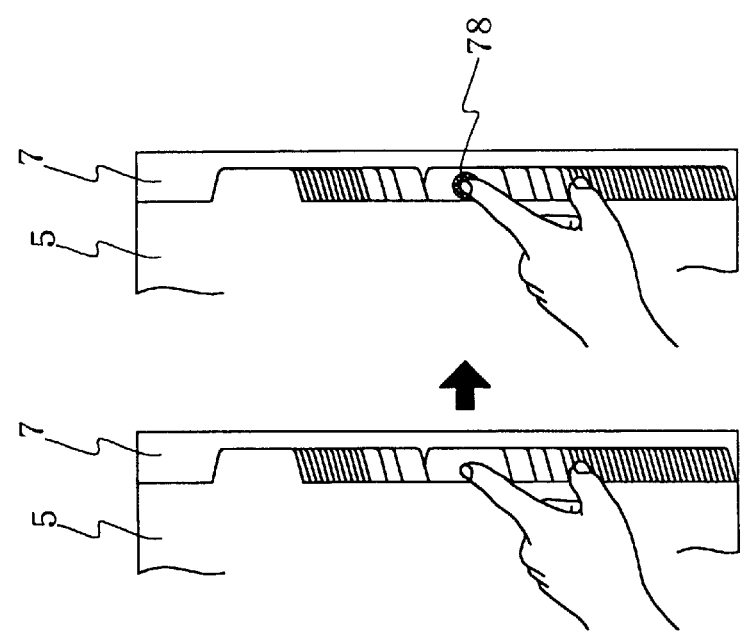

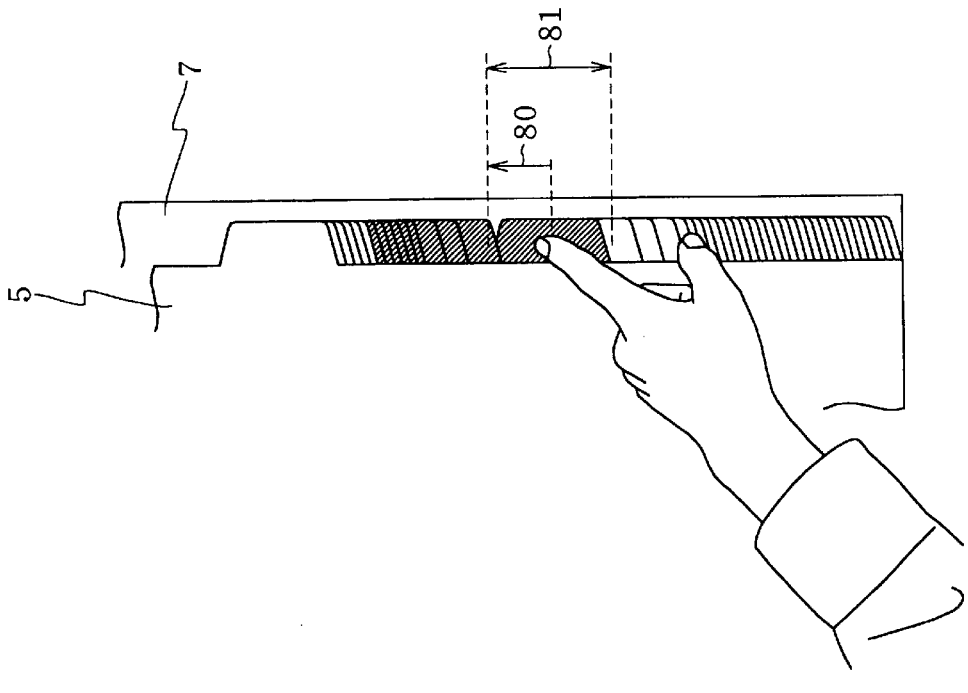
FIG.39(A) Holding preceding pages
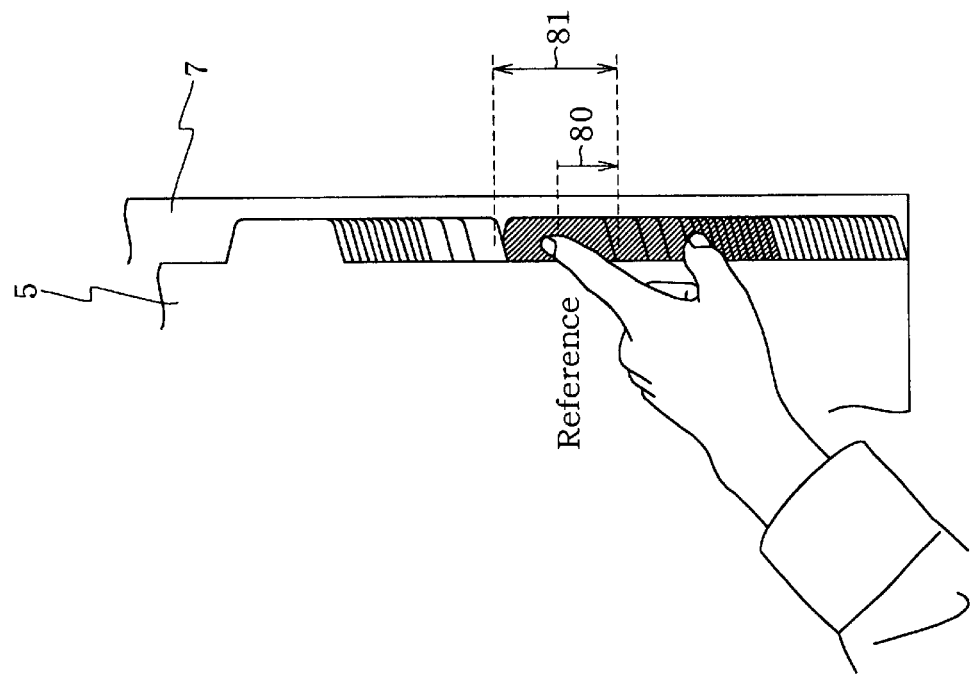
FIG.39(B) Holding succeeding pages

FIG. 48

| Page number | File name of page information | Article information | Coordinate range of article information |
|---|---|---|---|
| 1 | AAA | aaa | ... |
|  |  | bbb | ... |
| 2 | BBB | ccc | ... |
| 3 | DDD | None |  |

FIG.50

| Kind of pointer event | Content of page turning |
|---|---|
| Drag one tag | Display next page of dragged page |
| Click one tag | Display clicked page |
| Drag over plural tags | Pointer down time or pressure above predetermined value |
| Pointer down time or pressure above predetermined value | Hold the number of sheets in accordance with the time or pressure |
| Drag straightly in the page turning direction | Turn the page in the dragging direction |
| Click on the article information | Display in enlargement the article information |
| Drag plural articles | Continuous enlargement of dragged article information |

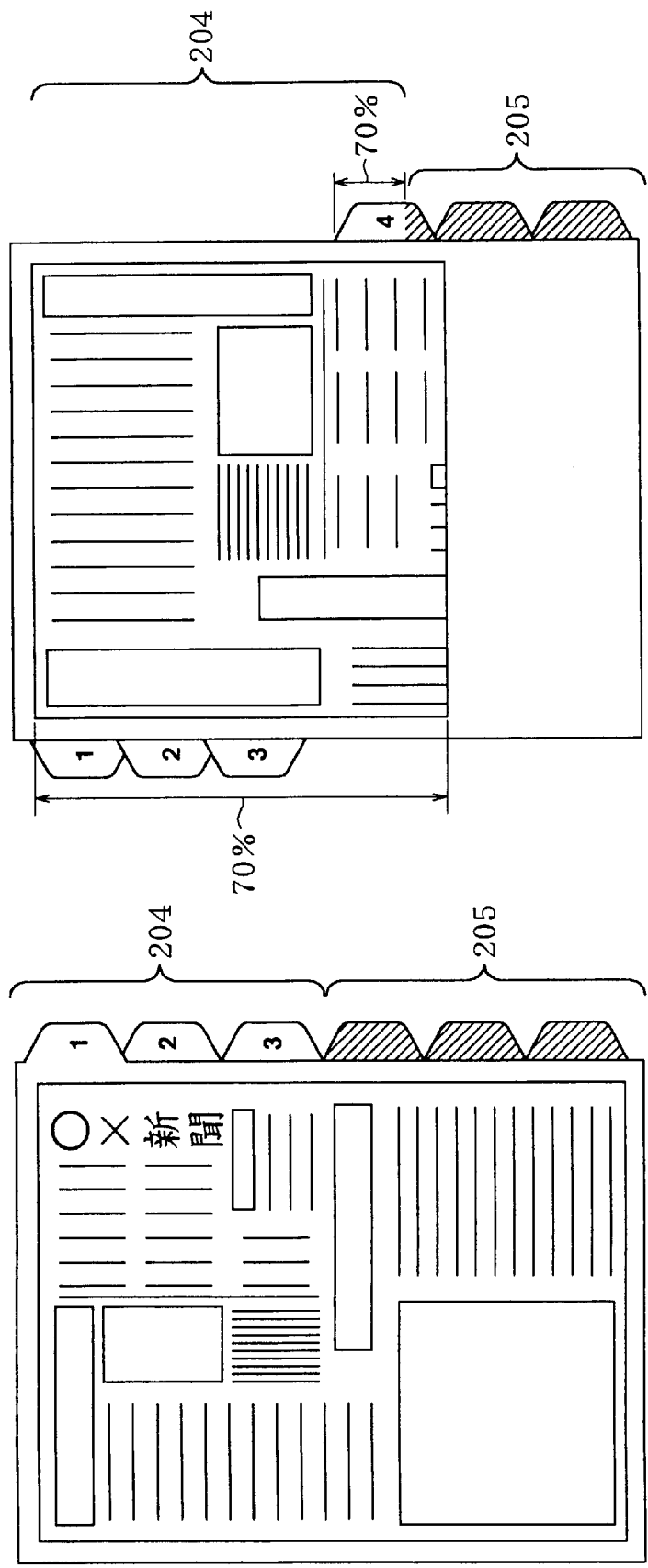

```
---Top of History File
    PageRight  ←Turned page to right
    PageRight
    PageRight
    PageRight
    PageRight
    PageLeft   ←Turned page to left
---End of History File
```
~210

FIG.63(A)

```
---Top of History File
    PageRight    ←Turned page to right
    PageLeft     ←Turned page to left
    PageDirect 6 ←Direct page turning. Numeral devotes
                  directly opened number
    PageConse 28 ←Disconnected page turning. Numeral
                  devotes start page number and end
                  page number
---End of History File
```
~211

FIG.63(B)

PAGE INFORMATION DISPLAY METHOD AND DEVICE AND STORAGE MEDIUM STORING PROGRAM FOR DISPLAYING PAGE INFORMATION

BACKGROUND OF THE INVENTION

1. Field of the Invention

The present invention relates to a page information display method and device, and in particular to a page information display method and device for displaying electronic information in a unit of page of predetermined size.

2. Description of the Prior Art

Conventionally, the information required for the work, study or life is provided from the origins of information to the reader, using media such as books, or periodical publications, e.g., newspaper or magazines or the like. Also, the administrative or judicial information is provided in publications or documents.

In recent years, the Internet (Inter Network) by a TCP/IP has been well prepared to enable computers for the government, company, college, and individual to be interconnected directly or via a telephone network. With the development of providing the information via the Internet, a variety of information is created as an ML page (e.g., HTML page or XML page) created on the basis of a makeup language, which allows this page (typically referred to as a home page) to be accessed by using a computer. To provide the ML page, a large amount of documents are created in a PDF format, and can be downloaded from respective home pages. Just as a patent gazette is provided in CD-ROM, the important information may be publicized or circulated in the computer readable medium other than the Internet.

The information provided in a format accessible using a computer may include information contents from a wide variety of information sources covering data sheets of products manufactured by the company, the information of new products, documents created by the administration, pieces of legislation in making, the Supreme Court gists, research results of the college laboratory, detailed information of lodgings in a certain region, news, weather forecasts, for example. These maybe duplicately provided in other paper media such as newspaper columns, magazines, or catalogues, but simply provided through the Internet or in the computer readable medium. Most of the past information may be often difficult to obtain substantially in paper media.

As the information infrastructures such as the Internet are prepared throughout the world in the future, more informatization will penetrate into the society increasingly. Thereby, it is apprehended that there occurs a personal difference in the amount or quality of necessary information between the user familiar with the computer and the user unfamiliar with the computer.

Means for operating the computer may be a graphical user interface (GUI, hereinafter referred to as a desktop metaphor) useful in most cases, which is metaphoric to the working environment of desk in the actual world. Through the user interface in the desktop metaphor, the working environment of desk is comically drawn to allow a file structure specific to the computer which is nonobjective and uneasy to understand to correspond with something present in the working environment of desk such as a file or folder. Thus, the computer beginners can operate the computer intuitively. For example, to delete a file, the file indicated by an icon which is metaphoric to paper is dragged and dropped into a garbage box.

However, through use of the user interface of desktop metaphor, many people in the world may think that the simple operation of gaining access to the electronic information in the computer is difficult. That is, through the user interface of desktop metaphor, it is required to make access to the electronic information by instructing or operating indirectly a virtual device such as buttons drawn on the display of computer, a pop-up menu, or a slide bar, using an input device such as a mouse or keyboard peculiar to the computer.

BRIEF SUMMARY OF THE INVENTION

Object of the Invention

In the conventional examples as described above, there was a drawback that the access of information through the use of a computer was difficult. The operation scheme specific to the computer may take considerable time to master the operation. Thus, everyone can not easily make use of electronic information provided by the computer. Accordingly, there is a personal difference in the quality and amount of information available between the users. If many people feel it difficult to use the computer, the information provider abolishes the paper media for the information necessary to be conveyed and cannot entirely transfer to the electronic information.

For example, it was reported that when a large company introduced a computer system to do all business contacts and settlements of accounts by abolishing the paper media, the preparatory period was set to two years, and one year or more was dedicated to an education period for new staff members to get accustomed to the computer, so that the company fully succeeded in computerization. Some colleges provide computer literacy courses to educate the basic usage of computer. Generally, in the study and training of new staff members in the companies or government offices, the computer operation is educated. They are taught about not only access of the information, but also input and origination of the information. However, for the people who never have used the computer at all, it is a difficult work to simply access the information.

Therefore, it is desirable to provide a user interface which is intuitive and easy to operate, rather than a desktop metaphor. Particularly, an information access device which has a simple appearance and enables the operation intended to access the electronic information is promising.

To cope with such a problem, a prior access device which is an improved desktop metaphor was disclosed in Japanese Patent Laid-Open No. 5-165595. This realizes the appearance of a book on the display unit, and relies on a method of visualizing the electronic information on the display unit by outputting the overlapped pages composed of a plurality of sentences dislocated slightly to the display unit. A heading symbolizing a set of sentences is appended with the content of sentences as a unit of set to improve the desktop metaphor. However, in this conventional example, the amount of information to be displayed increases in proportion to an increase in the number of pages. Therefore, it is often difficult to secure the display area sufficiently. Consequently, there is a problem that the access area is reduced to make the access difficult.

A CRT or a liquid crystal display is becoming higher in resolution year after year. For example, if the resolution of about 150 dpi in A4 size is realized, it is possible to access the whole one face of newspaper in A4 size. That is, if the display has substantially a resolution of facsimile class, the newspaper or magazine is made readable in a size which is smaller than the actual size. In such a high-resolution display, the display of 1200×1600 dots can be made in A4 actual size. Therefore, the physical size becomes too small to be useful for the icon in the conventional operating system, giving an impression of something intricate to the user, possibly resulting in a user interface which is rather uneasy to understand.

Therefore, the development of a user interface in the next generation which can be intuitively used by the computer beginners as well is required. Then, it is desired to adopt a high-resolution display without changing the operation. In other words, it is desired to develop the user interface which is easy to master the operation and not dependent on the resolution.

OBJECT OF THE INVENTION

It is an object of the present invention to resolve the inconveniences associated with the conventional example, and to provide a user interface for enabling access to the information which is easily understood by all people, irrespective of the computer experiences.

SUMMARY OF THE INVENTION

Therefore, the present invention adopts a user interface having a metaphor like a book, newspaper or magazine. To realize the metaphor of this book, the electronic information is allowed to access in a unit of page of predetermined size. That is, the electronic information is displayed in a unit of page of predetermined size in an information access area of a display unit. And there is only a single information access area and the page can not be turned physically, unlike books. But a user interface which is metaphoric to the operation of turning over pages enables the information access area to be effectively used. This invention has a new feature in the user interface metaphoric to the operation of turning over pages, as will be detailed later.

Based on the above described analysis, and in order to accomplish the aforementioned object, the present invention provides a page information display method for displaying the electronic information using an information access device comprising a storage unit for storing the electronic information having plural pages of information in a unit of page of predetermined size, a display unit for displaying the electronic information stored in the storage unit in the unit of page, and an operation unit for inputting an operation to gain access to the page information, the operation unit being provided in the substantially same area as the display unit, and the method comprises: a page turning operation detecting step of outputting a page turning operation detecting signal when a dragging is made on the operation unit in parallel or anti-parallel to a predefined page turning direction at a current page read from the storage unit that is to be displayed at present; a next display page setting step of setting a preceding page or a succeeding page immediately before or after the current page depending on a direction of the dragging operation to a next display page to be displayed at the next time, when the page turning operation detecting signal is detected in the page turning operation detecting step; and a page turning process step of displaying the next display page set in the next display page setting step in place of the current page on the display unit.

The operation unit, which is provided in the substantially same area as the display unit, corresponds to a touch panel or a computer display, for example. When a dragging is made in a page turning direction on this operation unit, in other words, a dragging operation to press a mouse button and hold it down while moving the pointer in a page turning direction (or an opposite direction), and release the mouse button is performed, a page turning operation detecting signal is output in the page turning operation detecting step. In the next display page setting step, a preceding page or a succeeding page of the current page is set as a next display page, depending on a direction of dragging operation. If the next display page is set, the next display page is displayed in place of the current page on the display unit in the page turning process step. In this way, when a dragging operation is performed in parallel or anti-parallel to the page turning direction, a page turning process is effected one page by one page in accordance with the direction of that dragging operation. Therefore, it is possible to turn over pages of the electronic information with the same operation as the motion of the user's hand.

BRIEF DESCRIPTION OF THE DRAWINGS

This above-mentioned and other objects, features and advantages of this invention will become more apparent by reference to the following detailed description of the invention taken in conjunction with the accompanying drawings, wherein:

FIGS. 2A and 2B are block diagrams illustrating examples of page information display devices in the first embodiment as shown in FIG. 1, wherein FIG. 2A is a diagram showing an overall configuration, and FIG. 2B is a diagram showing a detailed configuration of a display controller;

FIGS. 5A, 5B, 5C and 5D are explanatory views illustrating examples of displaying the number of holding pages with the configuration as shown in FIG. 4, wherein FIG. 5A is a view illustrating a pressure circle, FIG. 5B is a view illustrating a time circle, FIG. 5C is a view illustrating a pressure/time operation performed in a predetermined region, and FIG. 5D is a view illustrating an example of displaying the pressure circle in accordance with the operation as shown in FIG. 5C;

FIGS. 6A and 6B are explanatory views illustrating operation examples in the second embodiment as shown in FIG. 4, wherein FIG. 6A is a view illustrating a configuration of a page information display device, and FIG. 6B is a view illustrating an example of displaying the pressure circle;

FIGS. 8A, 8B and 8C are explanatory views illustrating examples for displaying a coated circles with the configuration as shown in FIG. 4, wherein FIG. 8A is a view illustrating an example of the coated circle in a solid color, FIG. 8B is a view illustrating an example of the coated circle having transparency, and FIG. 8C is a view illustrating an example of the coated circle having gradation;

FIGS. 9A, 9B, 9C and 9D are explanatory views illustrating other examples for displaying a coated circles with the configuration as shown in FIG. 4, wherein FIG. 9A is a view illustrating one example of the coated circle having a distortion, FIG. 9B is a view showing the reference causing the distortion, FIG. 9C is a view illustrating an example of distortion in the instance of a medium pressure, and FIG. 9D is a view illustrating an example of distortion in the instance of a large pressure;

FIGS. 12A and 12B are explanatory views illustrating examples of the display format at the time of turning a page with the configuration as shown in FIG. 10, wherein FIG. 12A is a view illustrating one example of the display format of an overwrite type, and FIG. 12B is a view illustrating one example of the display format of a slide type;

FIGS. 13A and 13B are explanatory views illustrating other examples of the display format at the time of turning a page with the configuration as shown in FIG. 10, wherein FIG. 13A is a view illustrating one example of the display format of a compression type, and FIG. 13B is a view illustrating one example of the display format of a 3D type;

FIGS. 21A and 21B are tables showing examples of the page information display data for use in the fourth embodiment, in which FIG. 21A is a table illustrating an example where the minimum reference length is defined by the number of dots, and FIG. 21B is a table illustrating an example where the minimum reference length is defined by the physical length;

FIGS. 29A and 29B are explanatory views illustrating examples of a page turning display format using a tag, wherein FIG. 29A is a view illustrating one example the display format of tag integral type, and FIG. 29B is a view illustrating one example of the display format of pages integral type;

FIGS. 35A and 35B are explanatory views illustrating a tag display example in the process of turning plural pages collectively as shown in FIG. 34;

FIGS. 36A and 36B are explanatory views for highlighting the tag display in an information access area in the process of turning plural pages collectively as shown in FIG. 34;

FIGS. 38A, 38B and 38C are explanatory views illustrating examples in which a pressure circle is displayed over a tag, wherein FIG. 38A is a view illustrating an example of a left page tag, FIG. 38B is a view illustrating an example of a right page tag, and FIG. 38C is a view illustrating an example in which the tag coloring and the tag pressure circle are employed at the same time;

FIGS. 39A and 39B are explanatory views illustrating examples in which a holding object page is changed depending on an operation direction upon the tag, wherein FIG. 39A is a view illustrating one example of holding a previous page, and FIG. 39B is a view illustrating one example of holding a succeeding page;

FIGS. 45A and 45B are explanatory views illustrating examples of an article enlargement display with wire frame, wherein FIG. 45A is a view illustrating a display example at the time of an enlargement process, and FIG. 45B is a view illustrating one example of the enlarged article information;

FIGS. 46A, 46B and 46C are explanatory views illustrating examples of a process of embossing and enlarging the article information, wherein FIG. 46A is a view illustrating a state in which an article is shaded for embossing, FIG. 46B is a view illustrating a state in which a selected article is being enlarged, and FIG. 46C is a view illustrating a state after the enlargement process is completed;

FIG. 48 is a diagram illustrating one example of an article information table which lists in correspondence the page information and the article information;

FIG. 50 is a diagram illustrating the relation between a pointer event and a page turning in the process as shown in FIG. 49;

FIGS. 51A and 51B are explanatory views illustrating examples of a process for selecting one of the page turning and the continuous display of article information in a locus of dragging, wherein FIG. 51A is a view illustrating the locus on the straight line, and FIG. 51B is a view illustrating the locus having a curve;

FIGS. 57A and 57B are explanatory views illustrating examples of the link structure of an ML page, wherein FIG. 57A is a view illustrating one example of the link structure, and FIG. 57B is a view illustrating an example in which the link structure is transformed into a book structure;

FIGS. 61A and 61B are views illustrating examples of controlling the tag display in accordance with the amount of downloaded data in the configuration as shown in FIG. 60, wherein FIG. 61A is a view illustrating an example of displaying the tag for the page which has been completely downloaded, and FIG. 61B is a view illustrating an example of setting the tag for the page being downloaded to the tag length in accordance with the downloaded volume;

FIGS. 62A and 62B are views illustrating examples of controlling the tag display in accordance with the amount of downloaded data in all pages in the configuration as shown in FIG. 60, wherein FIG. 62A is a view illustrating an example of normally displaying the page tag only, and FIG. 62B is a view illustrating an example of normally displaying the page tag by the length of tag in accordance with the volume of one page that has been downloaded;

FIGS. 63A and 63B are explanatory views illustrating examples of handling the history information in a sixth example of the invention, wherein FIG. 63A is a view illustrating one example of the history information in which the commands for limited operations are memorized, and FIG. 63B is a view illustrating one example of the history information in which the commands for all operations are memorized;

FIGS. 67A and 67B show other conventional user interfaces, in which FIG. 67A is an explanatory view showing the state of selecting the sheet 1, and FIG. 67B is an explanatory view showing the state of selecting the sheet 2.

DETAILED DESCRIPTION OF THE PREFERRED EMBODIMENTS

The preferred embodiments of the present invention will be described below with reference to the drawings. A first embodiment involves a process of turning one page, a second embodiment involves a process of turning plural pages collectively, and a third embodiment involves the display format during the page turning process. A fourth embodiment involves associating an operation using a tag with an element in each of the above embodiments. The cases where the page information has plural pages of information, and the page information is downloaded from a server, will be described later by way of example.

First Embodiment

Figure 1:
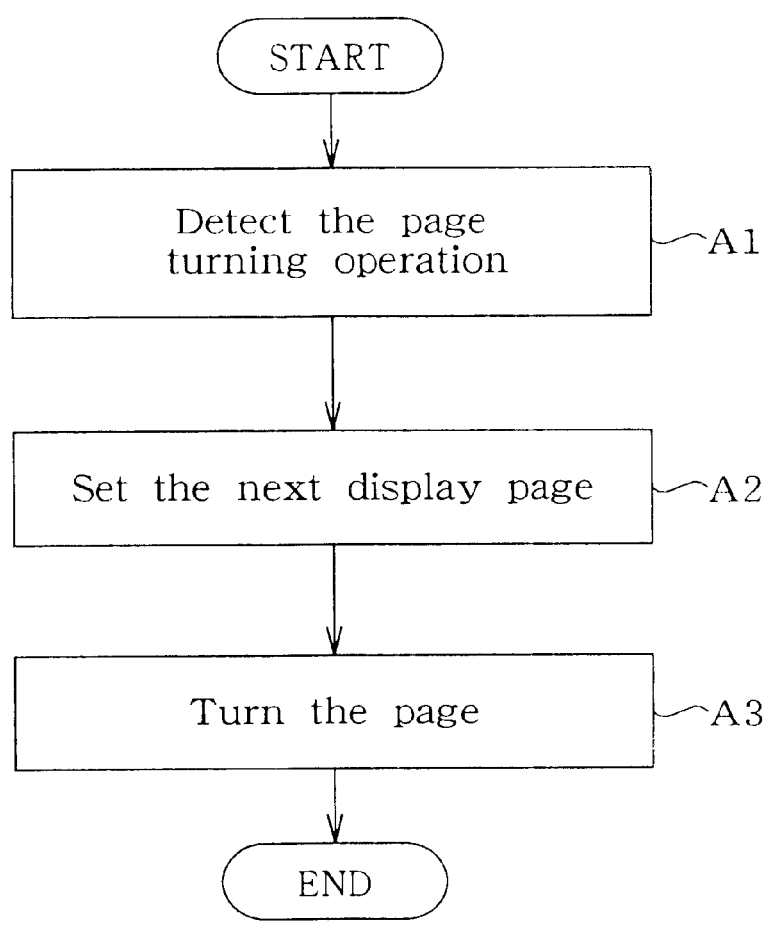
FIG. 1 is a flowchart illustrating one example of a page information display method according to a first embodiment of the present invention.

In the first embodiment, the intuitive operation is allowed to facilitate the access to the electronic information, and a page turning process is effected in accordance with an operation on an operation unit such as a touch panel. At this time, a page turning direction is determined depending on an operation direction. FIG. 1 is a flowchart illustrating one example of a page information display method according to the first embodiment of the invention. The page information display method of this embodiment displays the electronic information using an information access device comprising a storage unit (electronic information memory) 4 for storing the electronic information having plural pages of information in a unit of page of predetermined size, a display unit 1 for displaying the electronic information stored in this storage unit in the unit of page, and an operation unit 1C for inputting an operation to gain access to the page information, the operation unit being provided in the substantially same area as the display unit. In an example of using a touch panel as the display unit 1, the display unit 1 and the operation unit 1C are integrated.

Referring to FIG. 1, the page information display method comprises a page turning operation detecting step A1 of outputting a page turning operation detecting signal when a dragging is made on the operation unit in parallel or anti-parallel to a predefined page turning direction at a current page read from the storage unit 4 that is to be displayed at present, a next display page setting step A2 of setting a preceding page or a succeeding page immediately before or after the current page depending on a direction of the dragging operation to a next display page to be displayed at the next time, when the page turning operation detecting signal is detected in the page turning operation detecting step A1, and a page turning process step A3 of displaying the next display page set in the next display page setting step in place of the current page on the display unit 1.

The page turning operation detecting step A1 further comprises a page turning operation judging substep of judging, as the page turning operation, an operation exceeding a minimum operation length in the page turning direction within a predefined allowance region in a direction orthogonal to the page turning direction. The next display page setting step sets a page number that is equal to the page number of the current page incremented or decremented by one, depending on the direction of dragging operation, to the next display page. And the page turning process step A3 performs the page turning process to make the next display page a new current page. That is, by dragging a pointer in the page turning direction on the operation unit 1C, the next page is displayed. In the case where the pointer is dragged in a direction anti-parallel to the page turning direction, the previous page is displayed. The pointer may be a pointing device of the mouse, or a fingertip of the user. In the case where the touch panel 1 is employed to perform the page turning operation, the page turning operation is allowed in a broader area than selecting the area where the tag is displayed.

The page turning process involves deleting the current page from the display unit 1, and displaying the next display page on the display unit 1. To present the state of turning a page to the user more intuitively by effecting this page turning process at stages, the current page may be gradually reduced, and the next display page may be displayed on the display unit at stages (refer to the third embodiment). Then, the page turning operation detecting step A4 may further comprise an operation rate calculating substep of calculating a page turning rate that is a speed of the page turning operation, and the page turning process step A3 may further comprise a display rate setting substep of setting a display rate corresponding to the page turning rate calculated in the operation rate calculating step to change the display from the current page to the next display page. Consequently, the relation between the page turning operation and the page turning process can be informed to the user more clearly.

Figure 2A:
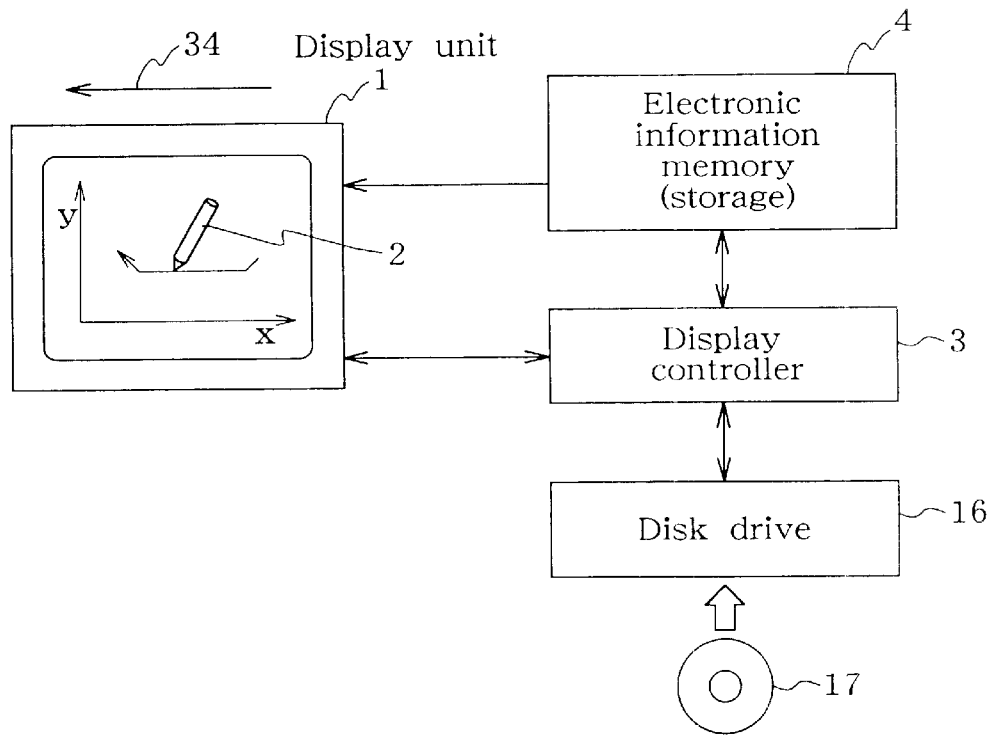
Figure 2B:
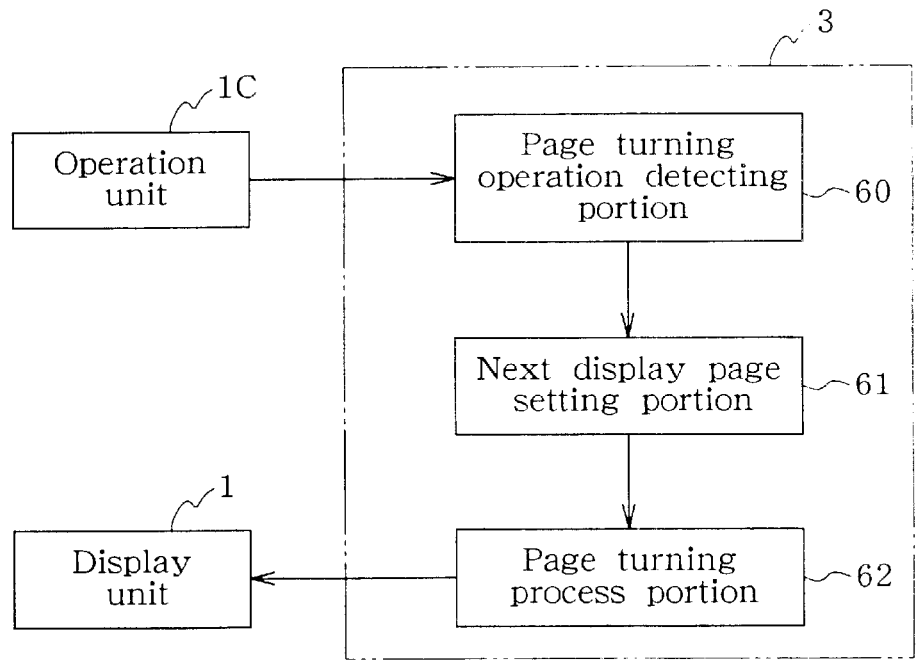

FIG. 2 is a block diagram illustrating one example of a page information display device in the first embodiment as shown in FIG. 1, wherein FIG. 2A is a diagram showing the overall configuration, and FIG. 2B is a diagram showing the detailed configuration of a display controller. The page information display device of this embodiment has an electronic information memory 4 for memorizing the electronic information having plural pages of information in a unit of page of predetermined size, a touch panel 1 for displaying the electronic information stored in this electronic information memory 4 in the unit of page, as well as inputting an operation to gain access to the page information, and a display controller 3 for controlling the display of the page information stored in the electronic information memory 4 on the basis of an operation content input into this touch panel 1.

And the display controller 3 comprises a page turning operation detecting portion 60 for outputting a page turning operation detecting signal when a dragging is made on the touch panel 1 in parallel or anti-parallel to a predetermined page turning direction 34 at a current page read from the electronic information memory that is to be displayed at present, a next display page setting portion 61 for setting a preceding page or a succeeding page immediately before or after the current page depending on a direction of the dragging operation to a next display page to be displayed at the next time, when the page turning operation detecting signal is output by the page turning operation detecting portion 60, and a page turning process portion 62 for displaying the next display page set in the next display page setting portion 61 in place of the current page on the touch panel. The process of FIG. 1 can be implemented under the control of the display controller 3 having the above portions.

Figure 3:
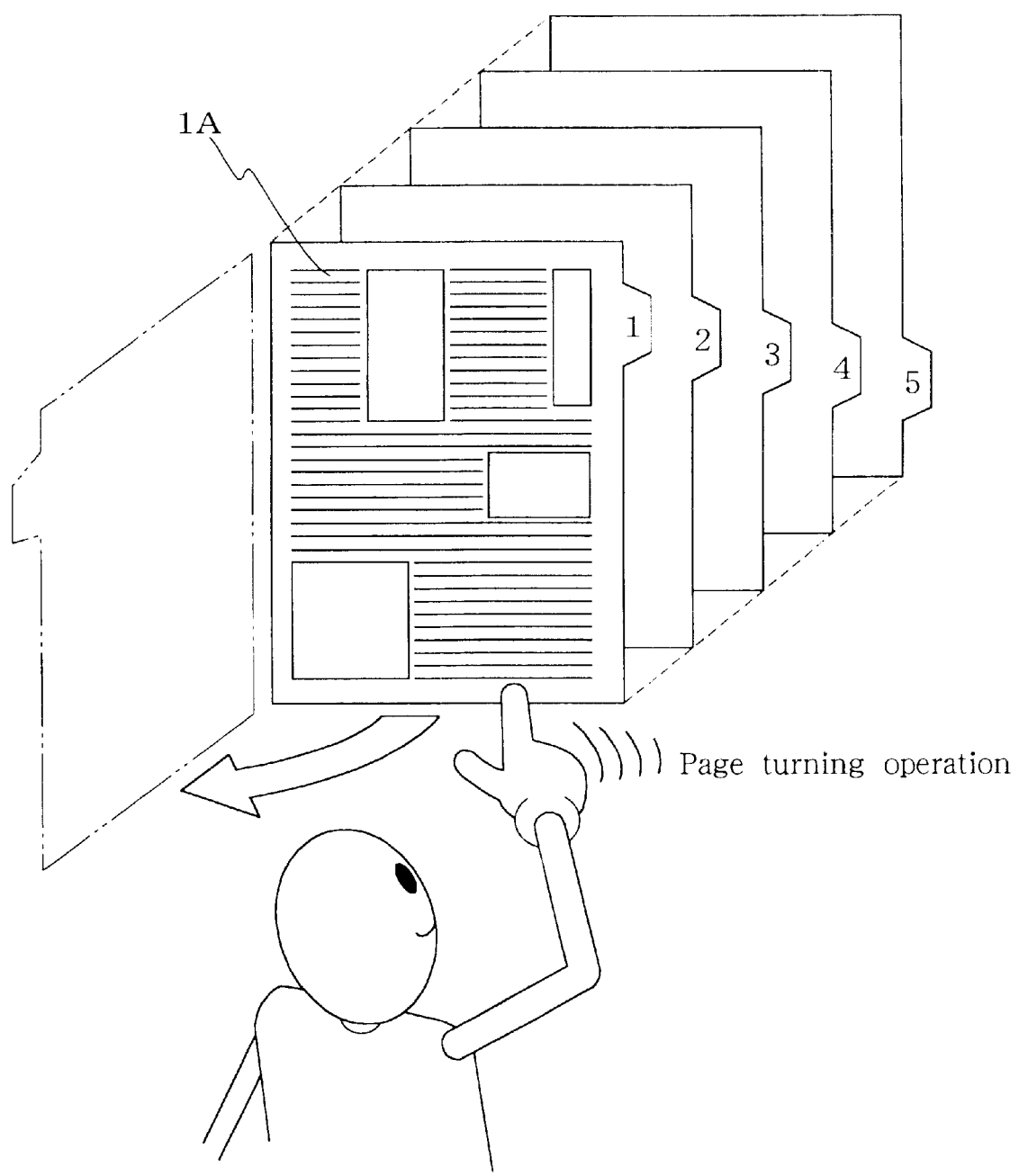
FIG. 3 is an explanatory view illustrating an example of a page turning operation with the configuration as shown in FIGS. 1 and 2.

FIG. 3 is an explanatory view illustrating one example of the page turning operation with the configuration as shown in FIGS. 1 and 2. As shown in FIG. 3, the page information having a one-dimensional structure (book structure) is accessed by turning pages sequentially, whereby the user unfamiliar with the computer operation can acquire the necessary information surely.

The process contents of FIGS. 1 and 2 can be realized by a page information display program that is executed under the control of the display controller. In this case, the page information display program has the commands corresponding to the configuration as shown in FIGS. 1 and 2. Specifically, the page information display program comprises, as the commands for operating the display controller 3, a page turning operation detecting command for outputting a page turning operation detecting signal when a dragging is made on the touch panel in parallel or anti-parallel to a predetermined page turning direction at a current page read from the electronic information memory that is to be displayed at present, a next display page setting command for setting a preceding page or a succeeding page immediately before or after the current page depending on a direction of the dragging operation to a next display page to be displayed at the next time, when the page turning operation detecting signal is output, and a page turning process command for displaying the next display page set in accordance with the next display page setting command in place of the current page on the touch panel. If each of the commands is executed by the display controller 3, the configuration as shown in FIG. 2B is realized, so that the process of FIG. 1 is performed. When the page information display device has the function added or changed, a command corresponding to the function to be added or changed may be newly introduced.

This page information display program is stored in a storage medium 17 such as a CD-ROM, read by a disk drive 16 as shown in FIG. 2A, and stored in a hard disk, not shown. The page display program stored in the hard disk is employed by the display controller 3.

One example of judging the page turning operation or not is a judgment with the change and locus of operated coordinates. As shown in FIG. 2A, the xy coordinates are defined on the display unit (operation unit) 1, the amount of movement from an input coordinate (Px, Py) when the fingertip first touches at the operation unit IC to an input coordinate (PX, PY) to which the fingertip is moved within a fixed time is measured. Herein, it is assumed that the amount of movement |PY-Py| in the Y axis direction is smaller than an arbitrary value (DY), and the amount of movement |PX-Px| in the X axis direction is larger than an arbitrary value (DX). That is, the operation in the page turning direction is beyond the arbitrary value (DX), while the amount of movement of pointer in a direction orthogonal to the page turning direction is below the arbitrary value (DY). And if a value of "PX-Px" is negative, the next display page setting portion 61 sets the page information of a succeeding page of the current page to the next display page. On the other hand, if the value of "PX-Px" is positive, it sets a preceding page of the current page to the next display page.

Accordingly, if the pointer 2A is moved to the right on the operation unit 1C in FIG. 2, for example, the page information displayed is turned from left to right, while the next page appears. Similarly, if the pointer 2A is moved to the left, the page information displayed is turned from right to left, while the preceding page gradually appears. In this way, an access method for accessing the page information by turning the pages one after another can be implemented in such a manner as to display the page information while visually presenting how the page is turned. That is, in this example, by detecting the movement direction of the pointer (input cursor) residing on the display unit 1 and the operation unit 1C, an intuitive access operation is enabled by simulating the operation of turning directly the page or chapter with a fingertip.

The operation with the tag or in the information access area may be performed by controlling the number of turning pages or the display rate in continuous display in accordance with the operation rate or pressure. In this way, it is possible to effect the display control in more intricate manner through the more intuitive operation.

Second Embodiment

Figure 4:
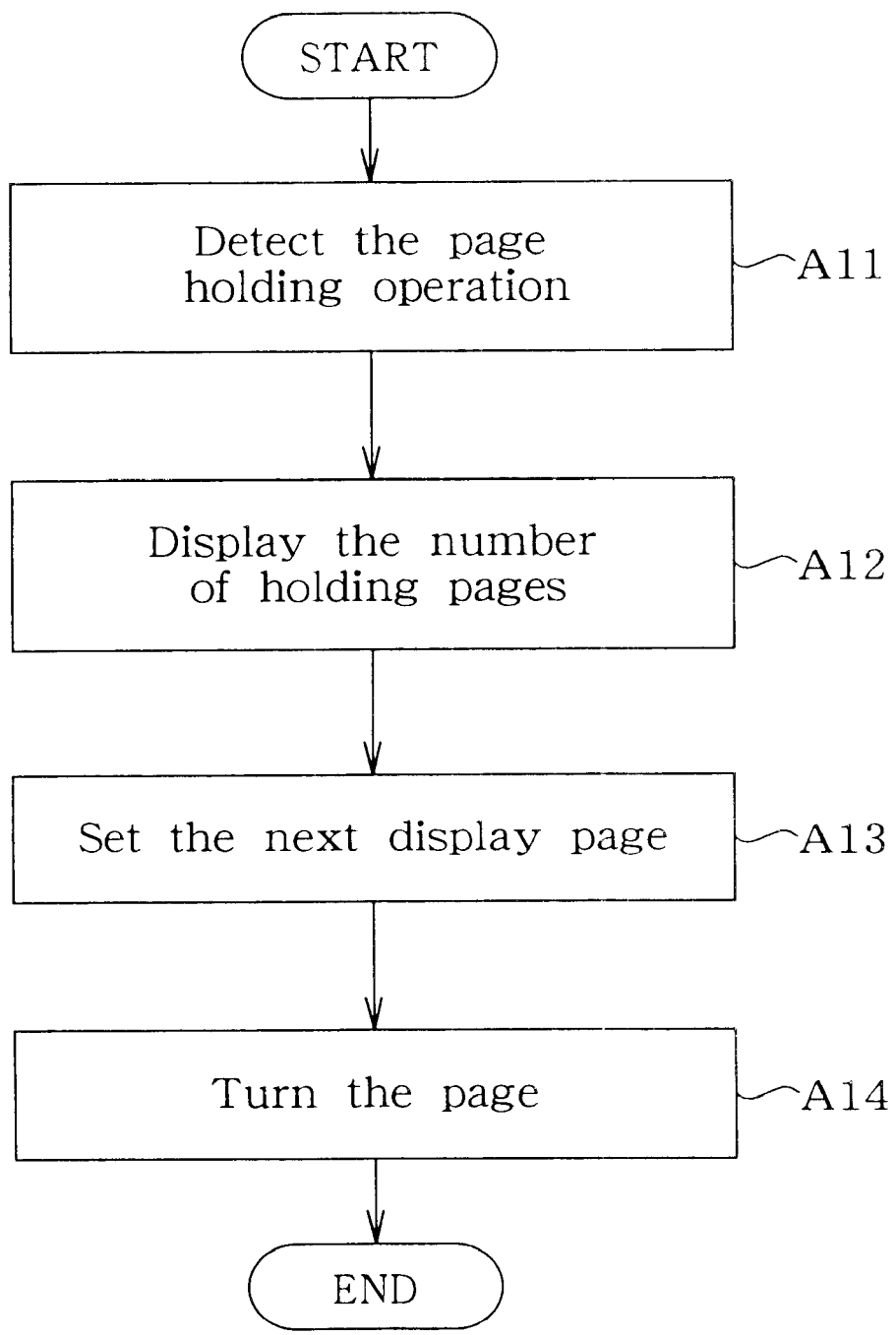
FIG. 4 is a flowchart showing a configuration of a page holding operation according to the second embodiment of the invention.

In the second embodiment, a process of holding plural pages is introduced to improve the operability while maintaining the intuitive operation. FIG. 4 is a flowchart illustrating a configuration of the page holding process according to the second embodiment of the invention. As shown in FIGS. 2 and 4, the page information display method of the second embodiment comprises a page holding operation detecting step A11 of outputting a page holding operation detecting signal when a predetermined page holding operation is made at a current page read from the electronic information memory 4 that is to be displayed at present, a holding page number displaying step A12 of displaying the total number of holding pages in accordance with the amount of the page holding operation on the display unit, when the page holding operation is initially detected in this page holding operation detecting step A11, a next display page setting step A13 of setting a page having a page number that is equal to the current page added or subtracted by the amount of the holding operation to a next display page to be displayed at the next time, when the page holding operation detecting signal is output in the page holding operation detecting step A11, and a page turning process step A14 of displaying the next display page set in this next display page setting step A13 in place of the current page on the display unit.

The page holding operation detecting step further comprises a pressure holding page number calculating substep of calculating the number of holding pages in accordance with the magnitude of a pressure applied to the substantially same position of the operation unit 1C, when the operation unit 1C is a pressure detecting type, for example. Also, the page holding amount operation detecting step may comprise a time holding page number calculating substep of calculating the number of holding pages in accordance with the elapsed time of a depressing operation that continues at the substantially same position of the operation unit 1C, instead of the pressure holding page calculating step. Accordingly, in this embodiment, an operation of turning plural pages continuously while grasping a book at the ends with a pressure to turn a few pages of the book is metaphorically simulated to realize a process of "holding" plural pages in accordance with a pressure applied on the display unit 1.

The page turning process step A14 executes a process of turning pages by effecting a page turning operation of moving the fingertip left or right in a state of holding plural pages. If the user holds plural pages but releases hold of the touch panel without effecting the page turning operation, holding plural pages is canceled, and an original operation state is restored.

Figure 5A:
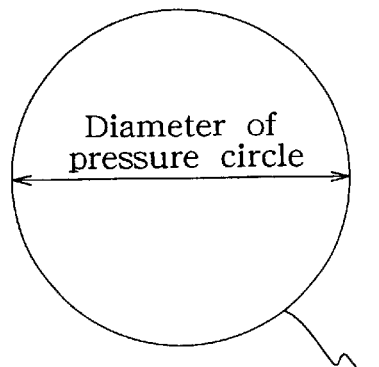
Figure 5B:
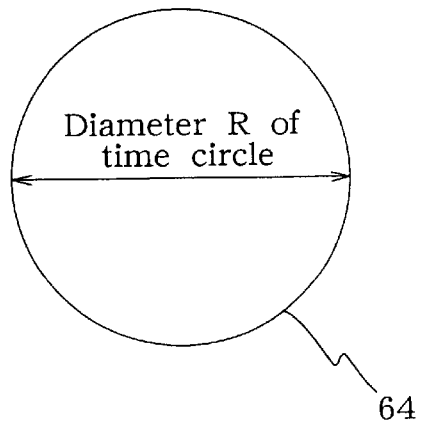

To indicate the number of holding pages, various forms of display may be adopted. The total number of holding pages grasped actually may be indicated in numerical value, but the state of holding pages may be indicated in some form. For example, FIG. 5 is an explanatory view illustrating a display example of the number of holding pages with the configuration as shown in FIG. 4, wherein FIG. 5A is a view illustrating a pressure circle, and FIG. 5B is a view illustrating a time circle. In the examples as shown in FIGS. 5A and 5B, the holding page number display step as shown in FIG. 4 comprises a substep of displaying the holding display circles 63, 64 defined with a radius of the size corresponding to the amount of holding pages on the display unit 1.

By displaying this holding display circle 63 on the display unit, the number of holding pages with an operation can be intuitively grasped. In the pressure circle as shown in FIG. 5A, the diameter of the circle around the fingertip is increased or decreased in accordance with the magnitude of pressure. The term "in accordance with the magnitude of pressure" not only means that the diameter of circle is proportional to the pressure, but also means that the diameter of circle is increased acceleratively in accordance with the pressure (the number of holding pages is increased). In the case where the operation of a plurality of turning pages with pressure is performed, the maximum diameter ($<\infty$) is set in an initial file, because the number of holding pages may depend on the resolution of a pressure sensor. The radius of the pressure circle can be calculated in accordance with the following expression.

(Diameter of pressure circle)=(maximum diameter)×(current pressure value)/(resolution of pressure sensor) (Number of holding pages)=(diameter of pressure circle)/(differential threshold for user's pressure)

Figure 5C:
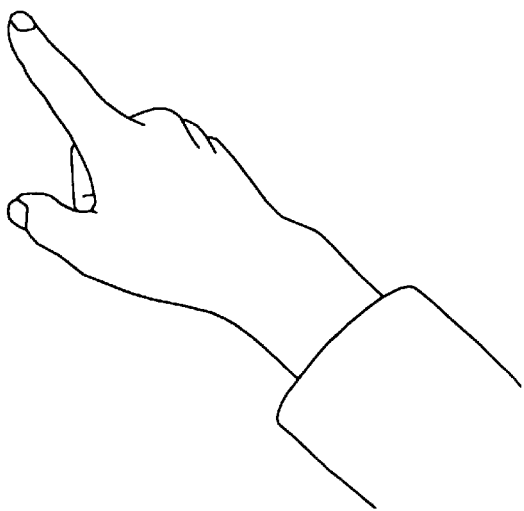
Figure 5D:
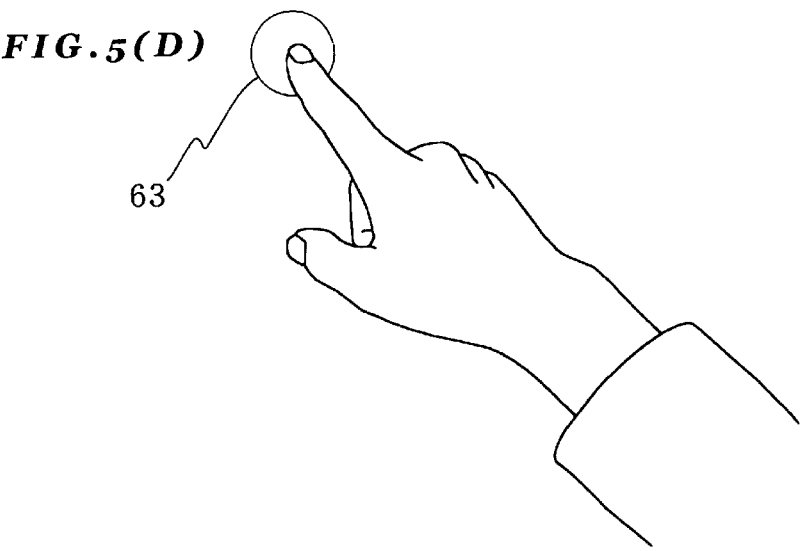

In order to implement a page turning operation with the finger, and a function of holding plural pages (hereinafter referred to as a plural pages turning operation) with the pressure or time, it is necessary that the system can readily discriminate a difference between the page turning operation and the plural pages turning operation. In this embodiment, to validate the plural pages turning operation, this difference can be discriminated as the fingertip is kept for a certain time while touching at the touch panel as shown in FIG. 5C. To clarify that the plural pages turning operation is effective, the pressure circle is displayed in reduction around the fingertip if the plural pages turning operation is validated, as shown in FIG. 5D.

When plural pages are turned with the time as shown in FIG. 5B, the number of holding pages is increased in accordance with the length of the elapsed time. The diameter of the time circle, unlike the pressure circle, may become infinite unless the maximum diameter is set. In other words, in the case where plural pages are held with the time, it is possible to hold as many turning pages as present. In the case of the pressure circle, the diameter can be set to be infinite, but because the pressure sensor has a limited resolution, the operation becomes very sensitive, if the diameter is set to be infinite. An algorithm for calculating the diameter of the time circle (corresponding to the pressure circle) is as follows.

(Diameter of time circle)=F (elapsed time)

(Number of holding pages)=(constant)×(diameter of time circle)

F (elapsed time) signifies a function having a variable of the elapsed time. Herein, this function is assumed to be increasing.

Figure 6A:
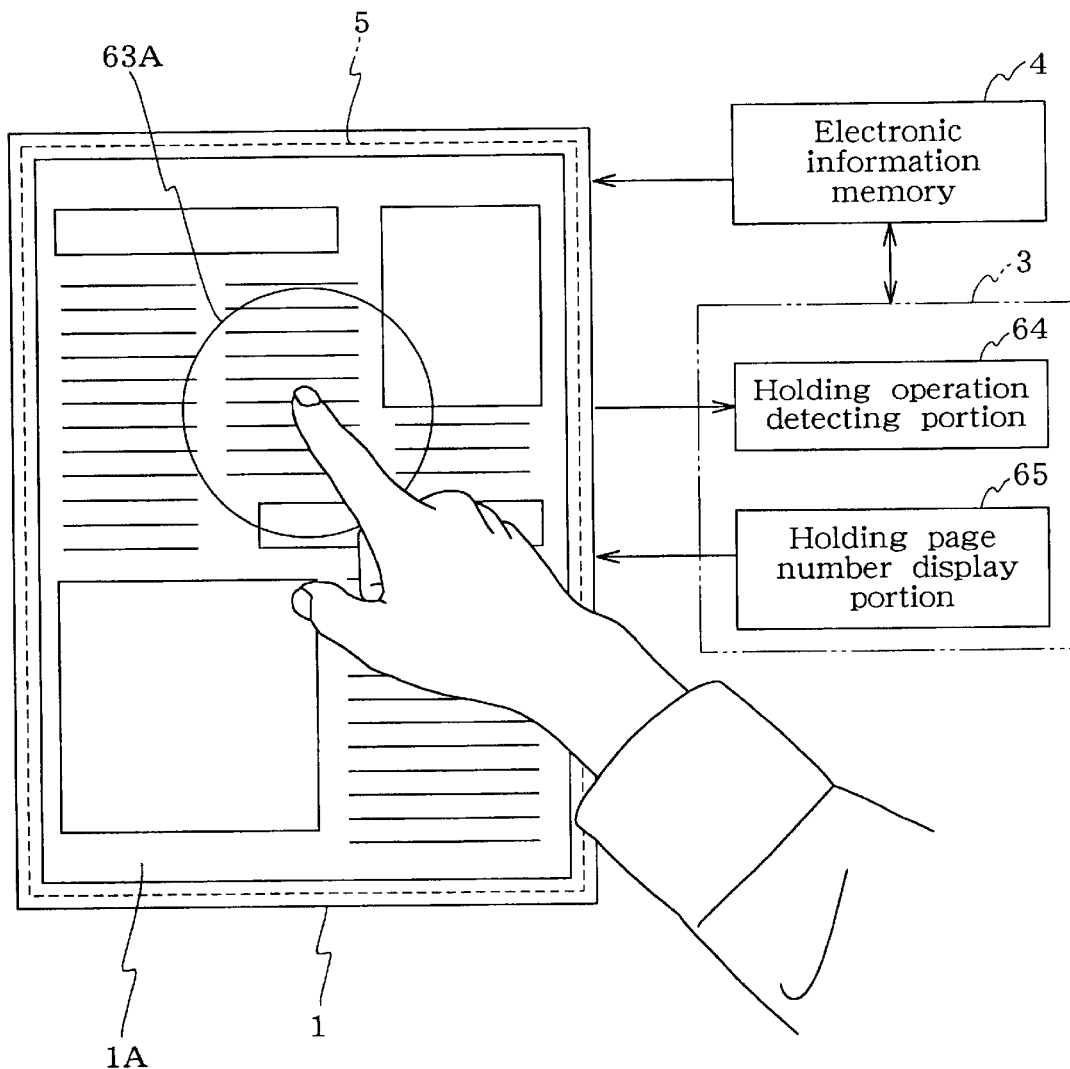

FIG. 6A is a view illustrating a configuration of a page information display device. As shown in FIG. 6A, in the page information display device of the second embodiment, the display controller 3 comprises a page holding operation detecting portion 64 for outputting a page holding operation detecting signal when a predetermined page holding operation is performed at a current page read from the electronic information memory 4 that is to be displayed at present, and a holding page number display unit 65 for displaying the total number of holding pages in accordance with the operation amount of the page holding operation on the display unit, when the page holding operation is initially detected by the page holding operation detecting portion. The other configuration is the same as the first embodiment of FIG. 2. The page holding operation detecting portion 64 detects the number of holding pages in accordance with the pressure or elapsed time applied on the operation unit 1C. And the holding page number display unit 65 displays this holding page number on the display unit 1.

In order to realize the display controller 3 as shown in FIG. 6, the page information display program comprises a page holding operation detecting command for outputting a page holding operation detecting signal when a predetermined page holding operation is performed at a current page read from the electronic information memory that is to be displayed at present, and a holding page number display command for displaying the total number of holding pages in accordance with the operation amount of the page holding operation on the display unit, when the page holding operation is initially detected upon the page holding operation detecting command.

Figure 6B:
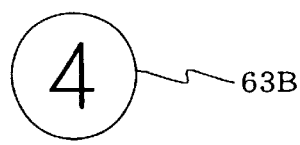

In FIG. 6A, a pressure circle 63A is displayed on the display unit. The pressure circle 63A is only drawn with an outer contour, and the article under the circle can be read during the operation. On the other hand, the actual number of holding pages can not be displayed, but the number of holding pages can be approximately grasped in terms of the diameter in this example. Hence, multiple operations may be needed. On the contrary, in the example as shown in FIG. 6B, the number of holding pages is displayed in numerical value inside (or around the circumference of) the pressure circle. In the example as shown in FIG. 6B, four pages are being held, and if the page turning operation is performed in this state, a preceding or succeeding page by four pages before or after the current page is displayed, depending on a direction of the page turning operation.

Figure 7A:
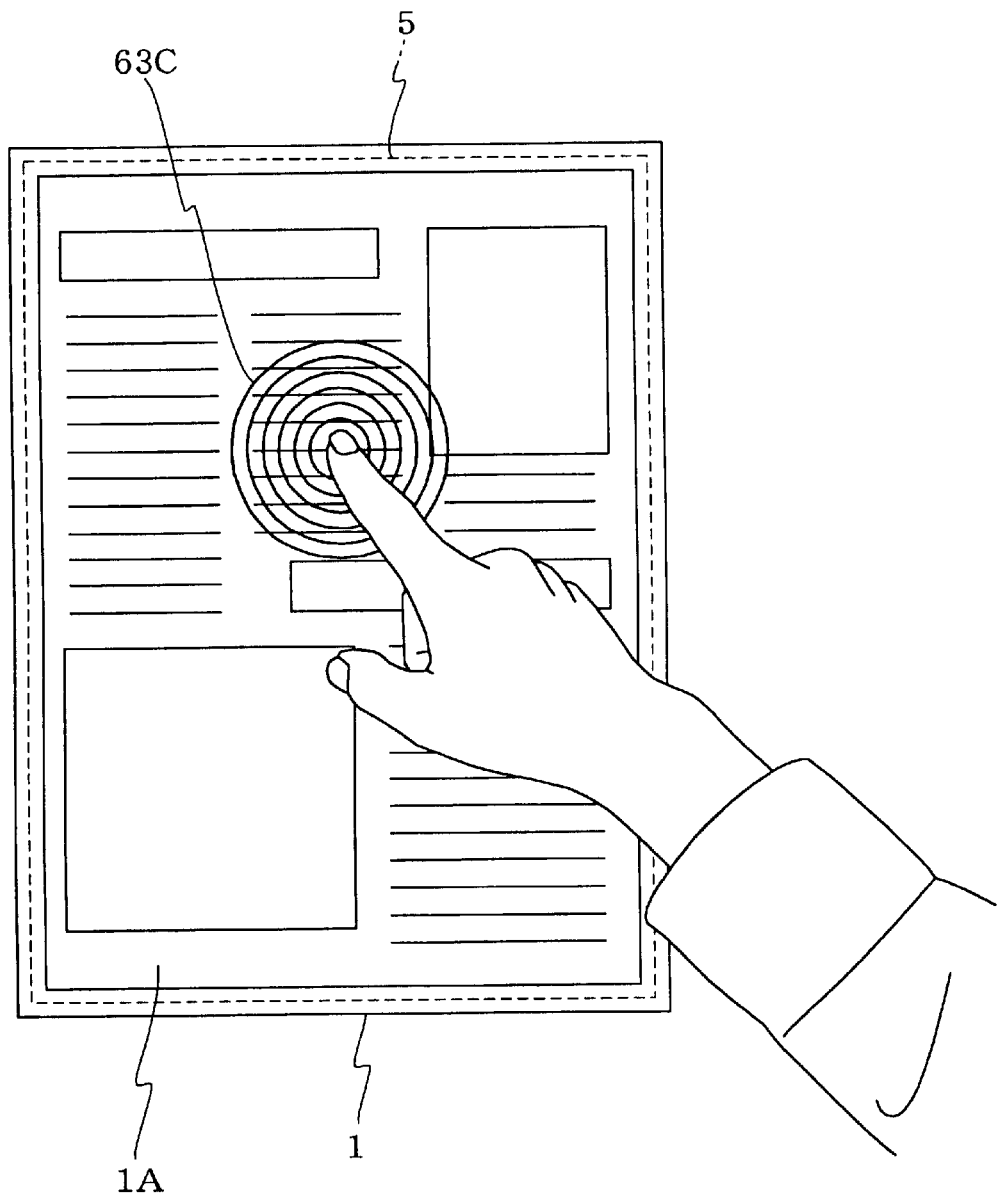
FIGS. 7A, 7B and 7C are explanatory views illustrating one example for displaying a multiloop with the configuration as shown in FIG. 4.
Figure 7B:
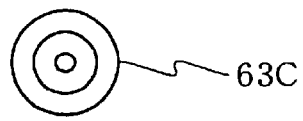
Figure 7C:
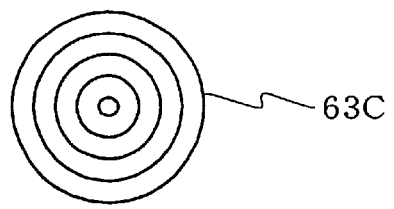

FIG. 7 is an explanatory view illustrating one example of displaying a multiloop with the configuration as shown in FIG. 4. In the example as shown in FIG. 7, the holding page number displaying step A12 comprises a substep of displaying a multiloop consisting of a number of circles around the same center and corresponding to the page holding amount. With this method of displaying the multiloop, the number of loops increases or decreases like a tree ring with the greater or smaller pressure. Therefore, the loop serves as a memory for holding pages. The number of holding pages is calculated readily by changing the color or the line thickness of loop at every five pages, for example. That is, as the rule of 5 cm or 10 cm has the graduation that is easy to read, the color or the line thickness of loop may be changed as a memory at every five pages. In the example as shown in FIG. 7B, there is a circle indicating the holding in an inner region, with a number of loops corresponding to the number of holding pages around its outer circumference. The multiloop 63C as shown in FIG. 7B indicates that two pages are being held, and the multiloop 63C as shown in FIG. 7C indicates that four pages are being held. Also, the circle indicating the holding may be omitted.

FIG. 8 is an explanatory view illustrating one example of displaying a coated circle with the configuration as shown in FIG. 4. In the example as shown in FIG. 8, the holding page number displaying step A12 comprises a substep of displaying a coated circle defined with a radius of predetermined size, the circle being coated corresponding to the page holding amount. For the coated circle, various forms of coating may exist as shown in FIGS. 8 and 9. The coated circle desirably has its diameter varied corresponding to the holding page number in each form of coating, but the number of holding pages may be indicated according to the coating color or the extent of variation. In this case, the coated circle itself has its fixed diameter.

Figure 8A:
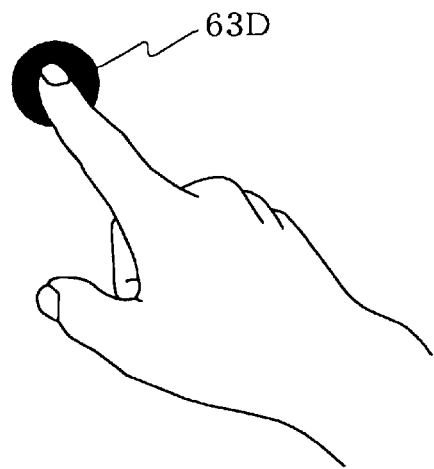
Figure 8B:
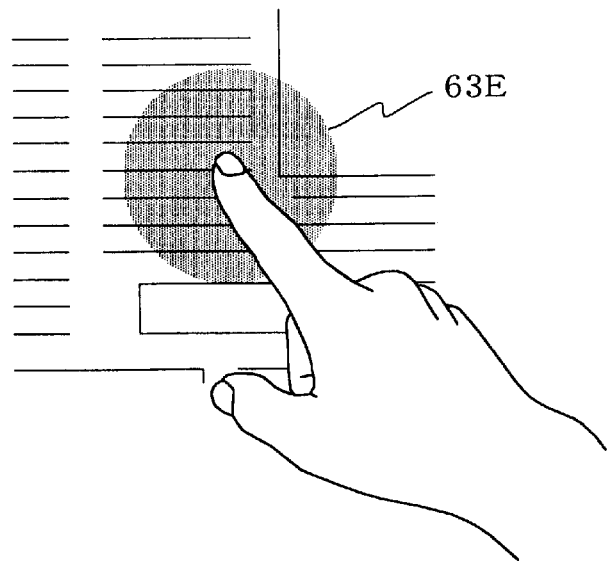

FIG. 8A is a view illustrating one example of the coated circle in a solid single color. In the coating of solid single color, the content of the page information at the current page can not be read, and hence, this solid coating in single color may be confused with the operation of enlarging part of the page information. FIG. 8B is a view illustrating one example of a coated circle having transparency. If the coated circle is translucent, the article under the coated circle can be read even during the operation of turning plural pages.

Figure 8C:
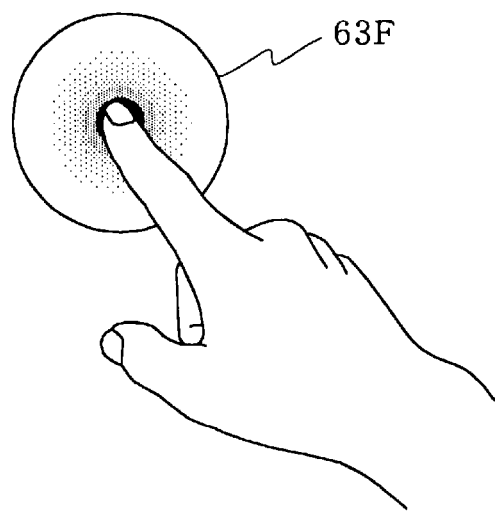
Figure 9A:
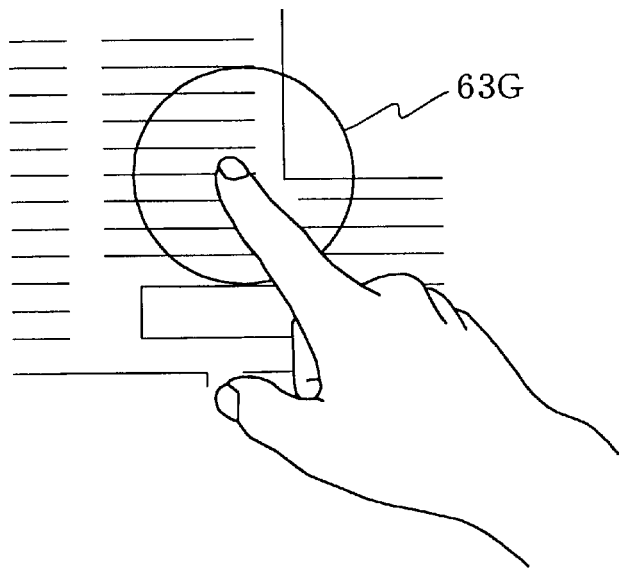
Figure 9B:
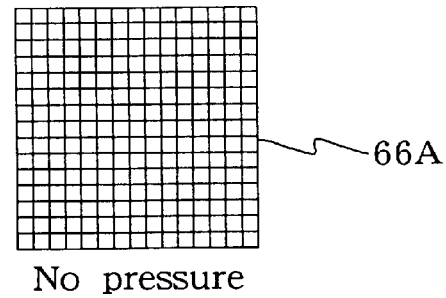
Figure 9C:
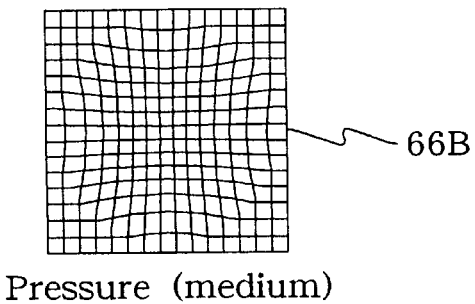
Figure 9D:
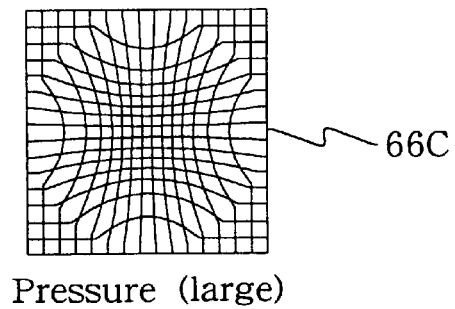

FIG. 8C is a view illustrating one example of a coated circle having gradation. This display method is suitable employed when the number of holding pages is detected using the pressure. This gradation makes it possible to display the limit of resolution or the current operation state clearly by making dense the color in the central portion in accordance with the magnitude of pressure. Even if the actual pressure distribution is not displayed, this effect can be obtained. That is, if the actual paper face is pressed strongly (i.e., turning more pages corresponds to an action of pressing on the paper face more strongly), the paper face is sunk physically. Therefore, the circle is gradated so that the color is dense (dark) in the central portion with the high pressure, and becomes lighter toward the outside. Thus, the operation state can be displayed excellently. If the coated circle with gradation is translucent, as shown in FIG. 8B, how the paper face is sunk with pressure can be represented.

FIG. 9 is an explanatory view illustrating another example of displaying a coated circle with the configuration as shown in FIG. 4. This display method represents a sense of how the paper face is sunk at the fingertip by deforming the paper face three-dimensionally in accordance with the pressure. In the example as shown in FIG. 9A, an outside loop of the coated circle is drawn with the line, but this outside loop can be omitted. The term "three-dimensionally" does not necessarily mean dealing the paper face as the three dimensional graphics, but is met if a sense of sinking can be represented. For example, the image data of a part of the current page drawn with the reference as shown in FIG. 9B may be mapped onto a framework as shown in FIG. 9C or 9D to represent the deformation caused by the medium pressure or large pressure.

Third Embodiment

In the third embodiment, the current page being turned and the next display page are displayed effectively to promote an understanding of the correspondence between the operation and process contents by displaying the reaction or process of an access device as a result of operation clearly.

Figure 10:
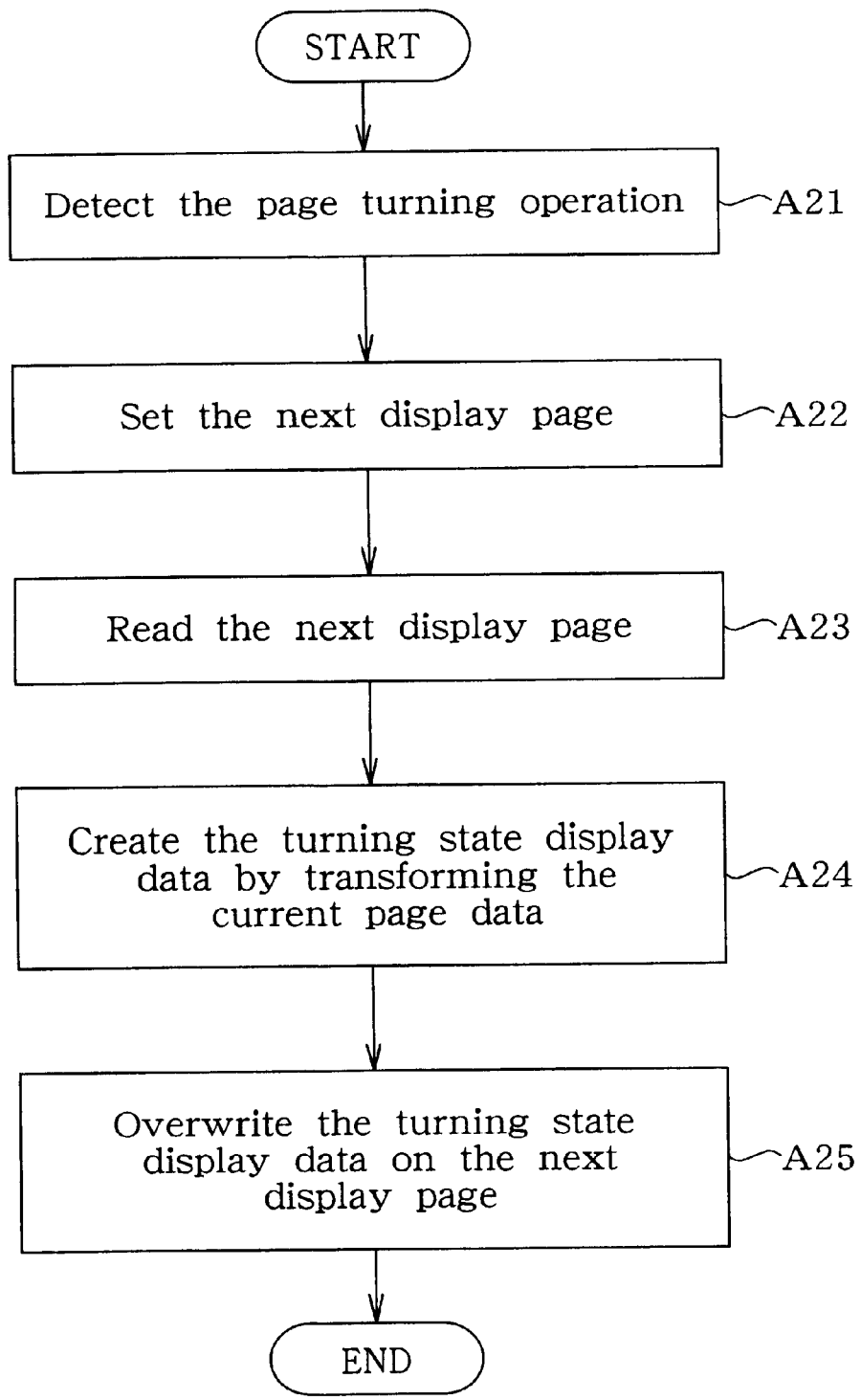
FIG. 10 is a flowchart illustrating an example of selecting a display format according to a third embodiment of the invention.

FIG. 10 is a flowchart illustrating a process example of selecting a display format according to the third embodiment. Referring to FIG. 10, the page information display method comprises a page turning operation detecting step A21 of outputting a page turning operation detecting signal having the number of holding pages and a page turning direction defined, when a page turning operation for turning one or more pages is performed in the operation unit, a next display page setting step A22 of setting a preceding page or a succeeding page by the number of holding pages before or after the current page depending on the page turning direction to a next display page to be displayed at the next time, when the page turning operation is completed in the page turning operation detecting step A21 and the page turning operation detecting signal is output, and a page turning process step of displaying the next display page set in the next display page setting step A22 in place of the current page on the display unit.

And the page turning process step comprises a next display page reading substep A23 of reading the next display page from the storage unit, when the next display page is set, a turning state display data creating substep A24 of transforming the current page data making up the current page that is being displayed on the display unit at every unit display time, as well as creating the turning state display data into which the current page is transformed, when the page turning operation detecting signal is output, and a turning state display data overwriting step A25 of overwriting the turning state display data created in the turning state display data creating substep on the next display data read in the next display page reading substep at every unit display time until the turning state display data is exhausted.

In this embodiment, a behavior of the page being actually turned is visually displayed on the display unit in performing the page turning process, to promote an intuitive understanding that the current page is deleted from the display unit 1 and the next display page appears on the display unit 1. Also, if the page turning process is displayed excellently, it is easier to learn that the page turning operation performed by the user is correct. Herein, the page turning operation detecting step A21 detects either turning one page in the first embodiment or holding plural pages in the second embodiment. Turning one page can be also considered as the operation of holding one page. The next display page setting step A22 designates a next display page on the basis of the page turning direction and the number of holding pages detected in the page turning operation detecting step A21. The page turning process comprises displaying the next display page at stages, as well as deleting the current page at stages. Therefore, the transformed current page is overwritten on the next display page. There are various ways of transforming the current page.

Figure 11:
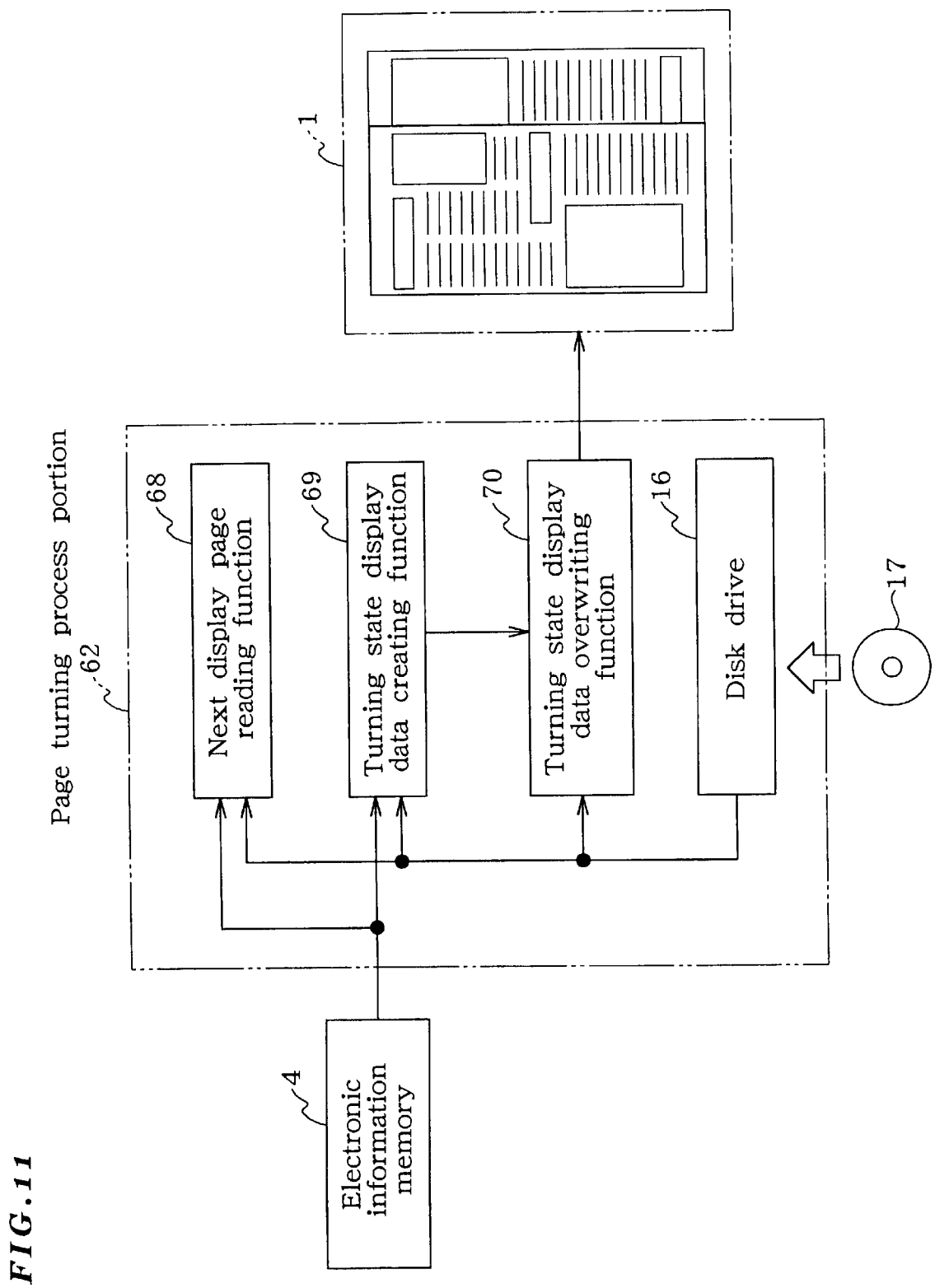
FIG. 11 is a block diagram illustrating a configuration of a page information display device in the third embodiment.

FIG. 11 is a block diagram illustrating a configuration of the page information display device according to the third embodiment. Referring to FIG. 11, the page information display device comprises an electronic information memory 4 for memorizing the electronic information having plural pages of information in a unit of page of predetermined size, a touch panel 1 for displaying the electronic information stored in the electronic information memory 4 in the unit of page, as well as inputting an operation to gain access to the page information, and a display controller 3 for controlling the display of the page information stored in the electronic information memory on the basis of an operation content input into the touch panel 1.

And the display controller 3, like that of the first embodiment as shown in FIG. 2B, comprises a page turning operation detecting portion 60 for outputting a page turning operation detecting signal with the number of holding pages and a page turning direction defined, when a page turning operation for turning one or more pages is performed on the touch panel, a next display page setting portion 61 for setting a preceding page or a succeeding page by the number of holding pages before or after the current page depending on the page turning direction to a next display page to be displayed at the next time, when the page turning operation is completed in the page turning operation detecting portion 60 and the page turning operation detecting signal is output, and a page turning process portion 62 for displaying the next display page set in the next display page setting portion in place of the current page on the display unit.

This page turning process portion 62, as shown in FIG. 11, comprises a next display page reading function 68 of reading the next display page from the electronic information memory, when the next display page is set, a turning state display data creating function 69 of transforming the current page data making up the current page that is being displayed on the touch panel 1 at every unit display time as well as creating the turning state display data into which the current page is transformed, when the page turning operation detecting signal is output, and a turning state display data overwriting function 70 of overwriting the turning state display data created in the turning state display data creating function 69 on the next display page read in the next display page reading function 68 until the turning state display data is exhausted.

A page information display program for realizing the page turning process portion as shown in FIG. 11 comprises, as the page turning process commands, a next display page reading command for reading the next display page from the electronic information memory, when the next display page is set, a turning state display data creating command for transforming the current page data making up the current page that is being displayed on the display unit at every unit display time as well as creating the turning state display data into which the current page is transformed, when the page turning operation detecting signal is output, and a turning state display data overwriting command for overwriting the turning state display data created in accordance with the turning state display data creating command on the next display page read in accordance with the next display page reading command at every unit display time until the turning state display data is exhausted.

Figure 12A:
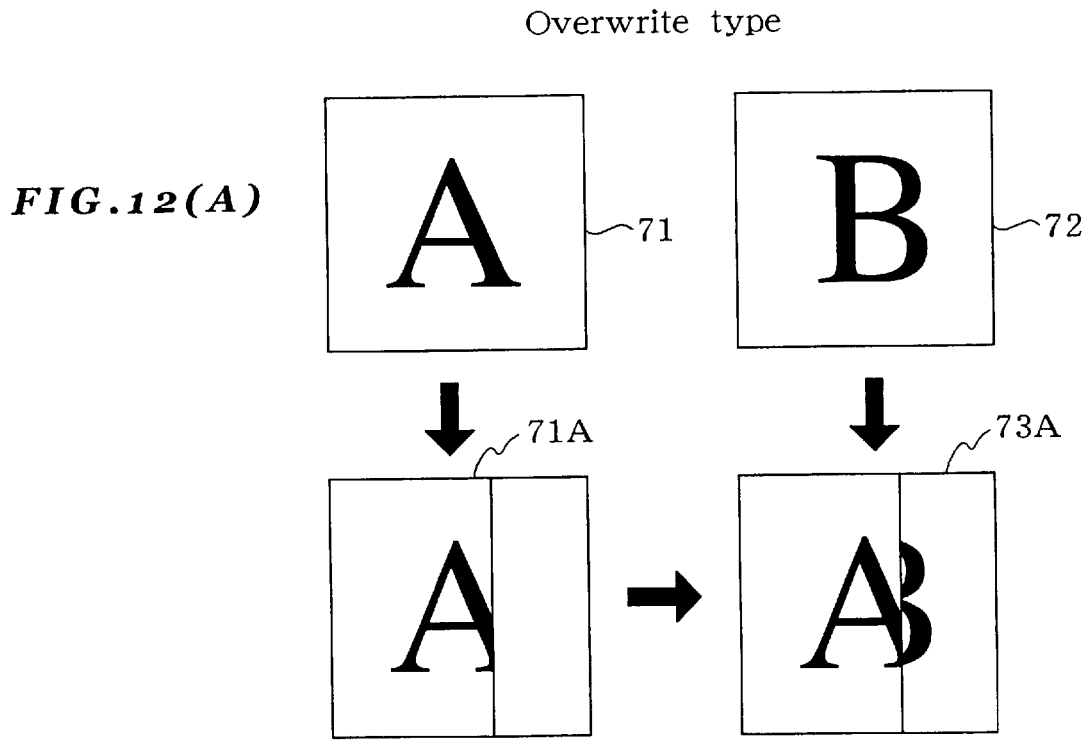

Referring to FIGS. 12 and 13, a form of transforming the current page (i.e., a display format of the page turning process) will be described below. In the examples as shown in FIGS. 12 and 13, the page turning direction is leftward in the figure, and for the simplification of explanation, the page information has an alphabet or a triangle or circle over the entire surface. FIG. 12A is a view illustrating one example of the display format of overwriting type. In the example as shown in FIG. 12A, the turning state display data creating step A24 further comprises an overwriting display control substep of deleting an area on the start point side in the page turning direction at every unit time. In the example as shown in FIG. 12A, the turning state display data 71A is produced by deleting a current page 71 from the right hand side in the figure at stages. By overwriting this turning state display data 71A on the next display data 72, the turning state is displayed. In this overwriting type, the next display data successively appears from the right hand side of the current page.

Figure 12B:
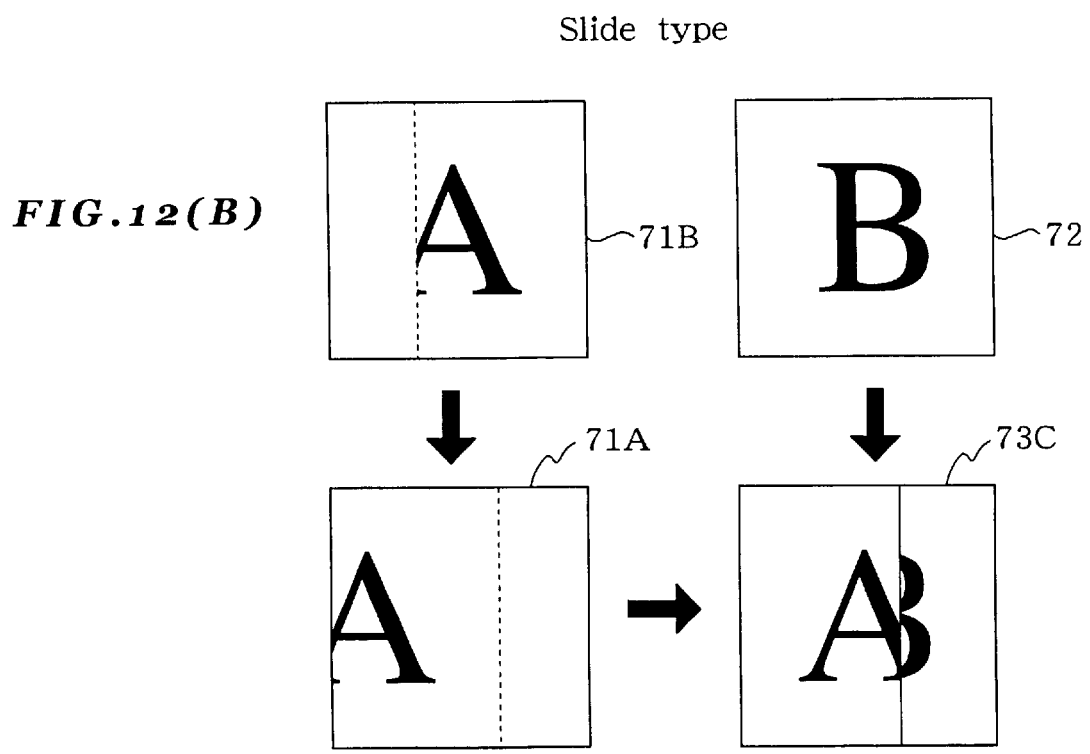

FIG. 12B is a view illustrating one example of the display format of slide type. In the example as shown in FIG. 12B, the turning state display data creating step A24 comprises a slide display control substep of deleting an area on the end point side in the page turning direction at every unit time as well as shifting the current page data by the amount of deleted area in the page turning direction. In the example as shown in FIG. 12B, the left hand side of the current page data 71B is deleted in the figure, and the current page data is shifted by the amount of deleted area in the page turning direction. This shifted image data as the turning state display data 71C is overwritten on the next display page 72. In the example as shown in FIG. 12B, the current page is slid gradually in the page turning direction so that the next display page 72 appears.

Figure 13A:
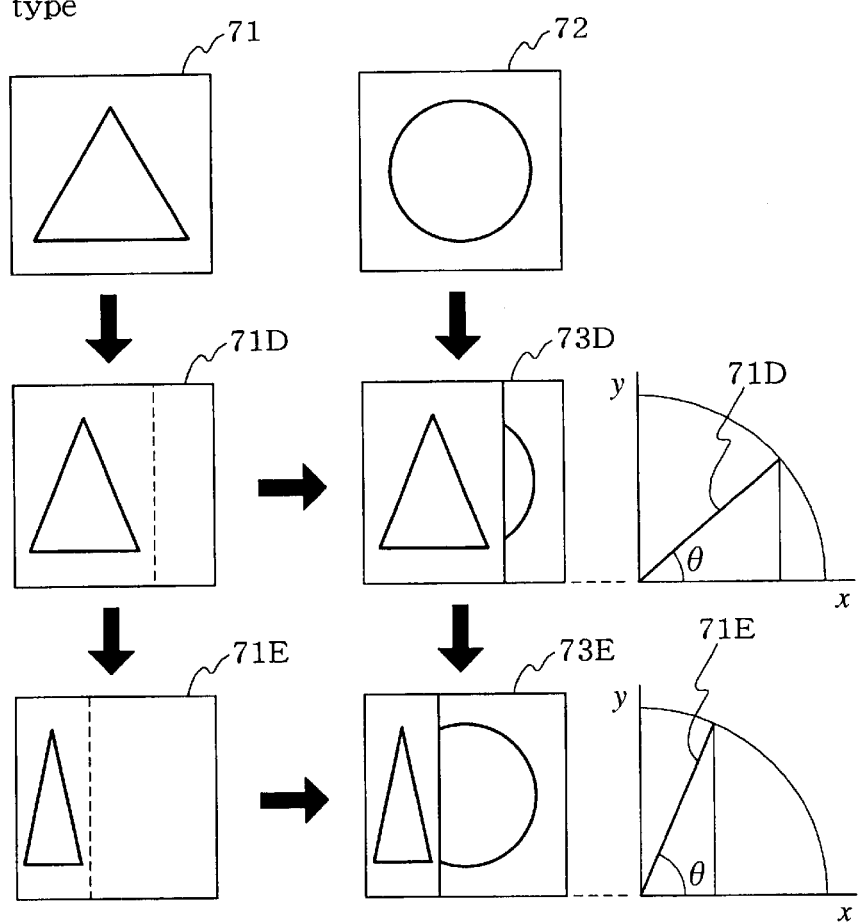

FIG. 13A is a view illustrating one example of the display format of compression type. In the example as shown in FIG. 13A, the turning state display data creating step A24 comprises a compression display control substep of reducing the display length in the page turning direction at every said unit time as well as compressing the current page data to the reduced display length in the page turning direction. In the example as shown in FIG. 13A, it is allegorized that the current page is lifted in a normal direction (z axis direction) of the display unit at the end (or left end in the figure) along the page turning direction. If the display area of the current page 71 is reduced and compressed in the page turning direction, the current page has a shape as indicated by reference sign 71D. Then if further compressed, the current page has a shape as indicated by reference sign 71E. If they are overwritten on the next display page 72, the current page has its shape changed sequentially from a state indicated by reference sign 73D to a state indicated by reference sign 73E. Defining θ in the xy plane as shown in FIG. 13A, the current page 71 is transformed so that the change rate (or angular velocity) of θ may be constant. Thereby, the behavior of how the page is turned can be represented dynamically.

Figure 13B:
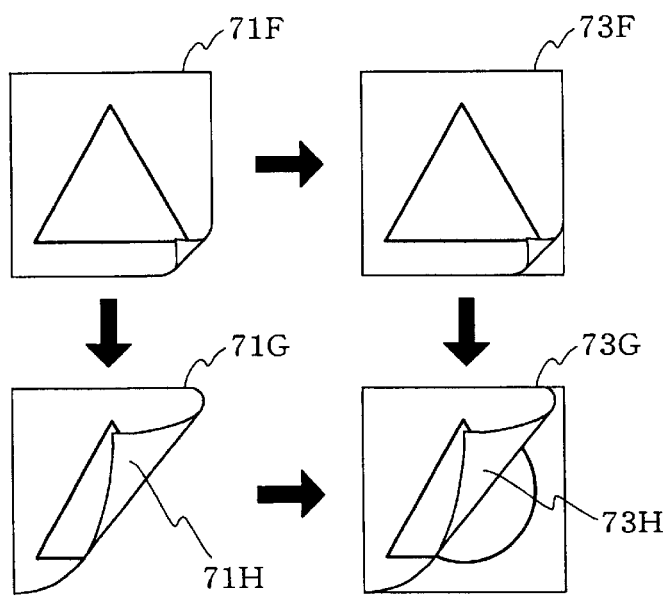

FIG. 13B is a view illustrating one example of the display format of 3D type. In the example as shown in FIG. 13B, the turning state display data creating step A24 comprises a three dimensional space defining substep of defining a virtual space in a normal direction of the display unit, a current page rotating substep of rotating the current page within the virtual space around the end point side in the page turning direction, and a three dimensional display control substep of drawing a front side and a back side of the current page rotated virtually in the current page rotating substep in a two dimensional plane as viewed in a normal direction of the display unit as well as setting the drawing data to the turning state display data. In the example as shown in FIG. 13B, the state of turning the paper in the three-dimensional space is displayed on a two-dimensional plane. As an example of rotating the current page, there is a shape as indicated by reference sign 71G in FIG. 13B. In this case, the backside of the current page is indicated by reference sign 71H. The current page is drawn in the two-dimensional plane, and superposed on the next display page 73F, resulting in a shape as indicated by reference sign 73G. In this embodiment, because the page information is not displayed on the back side of the page, the current page may be drawn in a state where the content of the current page is seen through the back side, or the content of the next display page is reflected on the back side of the current page.

Fourth Embodiment

In the fourth embodiment, for the purpose of an easy understanding of the relation between the operation content and the process content in order to enhance the operability with the tag, the tag is effectively used for the display of the operation state. That is, in the fourth embodiment, as a method of indicating the total number of pages and the position of the current page as well as enabling an operation of turning the pages intuitively, the tag is employed. Referring to FIGS. 14 to 28, the method of displaying the tag will be described below, and then the relation between holding plural pages and the tag, and the extended use of the tag in the third embodiment, will be described below.

Figure 14:
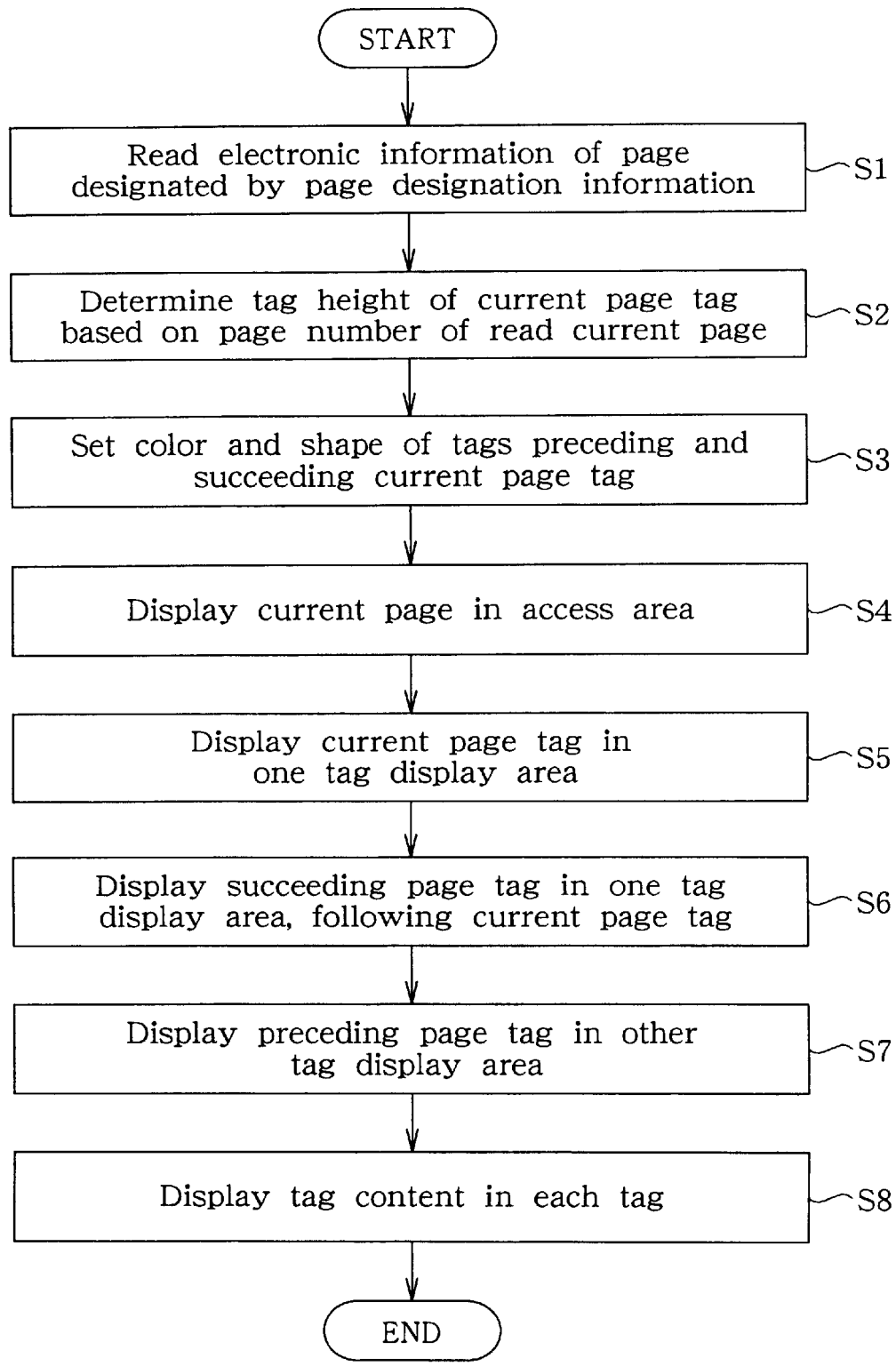
FIG. 14 is a flowchart showing a configuration of a page information display method according to one embodiment of the invention.
Figure 15:
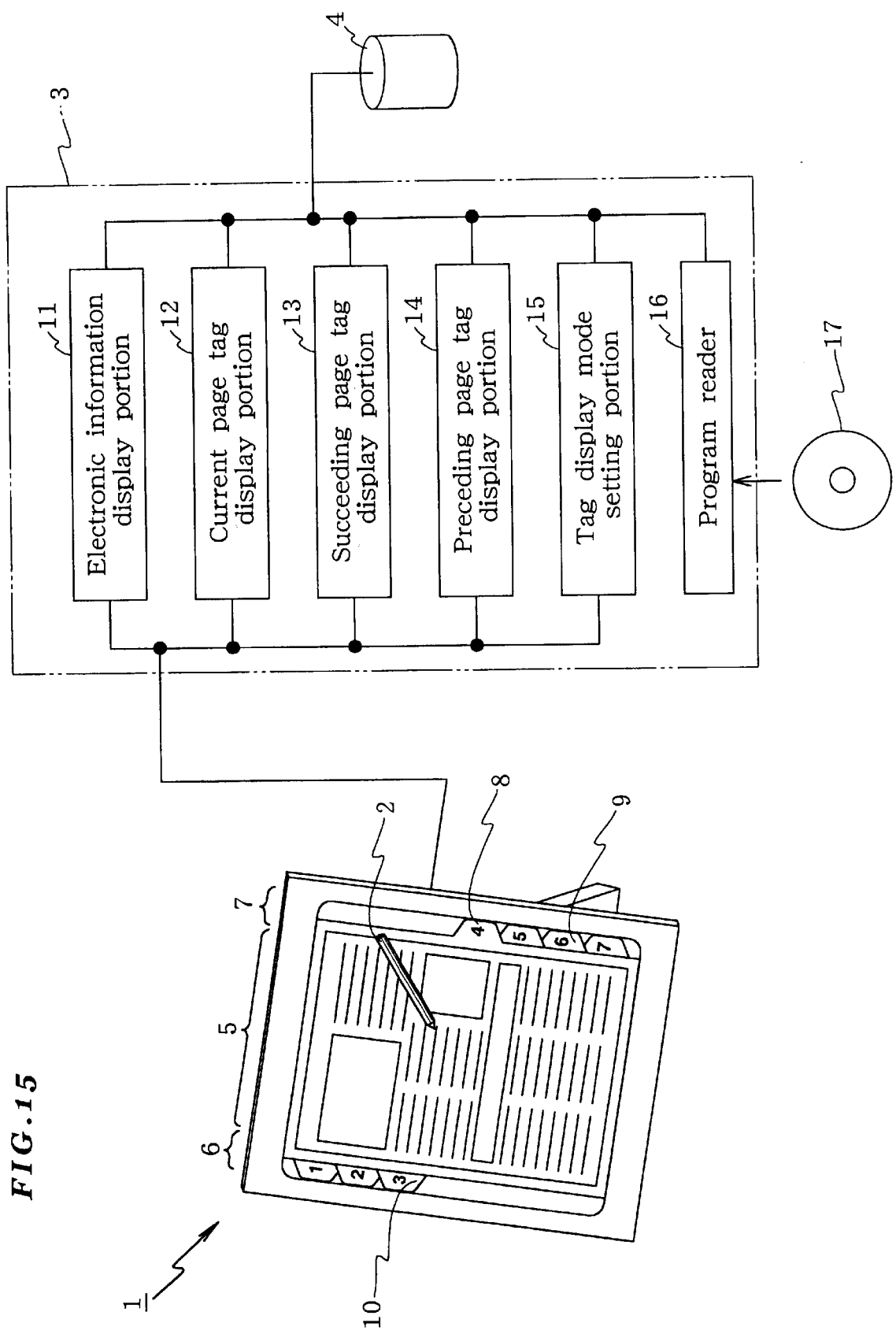
FIG. 15 is a block diagram illustrating a configuration of a page information display device suitable for practicing each step as shown in FIG. 14.

FIG. 14 is a flowchart showing a page information display process according to the fourth embodiment of the invention. FIG. 15 is a block diagram showing a configuration of a page information display device which is suitable for practicing this process. In this embodiment, a display unit 1 is provided with an information access area 5 for displaying the page information, as shown in FIG. 15. Further, one and other tag display areas 6, 7 are provided to the left and right, or upward and downward of this information access area 5. A tag of a page displayed in the information access area is displayed in a right-side tag display area. Beneath this current page tag, a tag for a succeeding page (succeeding page tag 9) having a page number greater than a current page is appended. And in a left-hand tag display area, a tag for a preceding page (preceding page tag 10) of the current page is appended. In an example of FIG. 15, the fourth page is displayed.

In the example as shown in FIG. 15, the page information display device comprises a storage unit (electronic information memory) 4 for storing the electronic information having a plurality of pages in a unit of page of predetermined size, a display unit (display) 1 having an information access area 5 for displaying the electronic information stored in the storage unit 4 in a unit of the page and a tag display area 6, 7 for displaying a tag indicating the content of the page, the tag display area being provided on both ends of the information access area 5, and a display controller 3 for displaying the page information read from the storage unit 4, with a tag appended, on the display unit. The display controller executes the process as shown in FIG. 14.

Referring to FIG. 14, the display controller first reads the electronic information of a page designated with page designation information (step S1). Subsequently, the height of a current page tag is determined, on the basis of the page number of read current page (step S2, determining the current page tag height). Further, the color and shape of a tag indicating each page preceding and succeeding the current page are determined (step S3). At this step S3, the highlighting of current page tag, the tag color or color variation, and the tag shape variation are set.

Subsequently, the current page of current display object read from the storage unit is displayed in the information access area at step S4. Further, the tag appendant to the current page is displayed in the one or other tag display area at step S5 (displaying the current page). And before or after displaying the current page, a tag 9 appendant to each page (fifth to seventh page) following the current page (fourth page in the example of FIG. 15) is displayed in one tag display area (S6, displaying the succeeding page tag). Also, before or after displaying the current page, a tag appendant to each page preceding the current page in page number is displayed in the other tag display area (S7, displaying the preceding page tag). In the example of FIG. 14, each tag has the tag content displayed, the tag content being a content of tag (step S8). In the example as shown in FIG. 15, the page number is displayed as the tag content (displaying the page number). Other than the page number, a mark or character indicating the place of page may be used.

Referring to FIG. 15, the display controller 3 has a variety of functions to implement the process as shown in FIG. 14. Specifically, it comprises an electronic information display portion 11 for displaying the page information of a current page of current display object read from the storage unit 4 in the information access area 5, and a current page tag display portion 12 for displaying the current page tag in the one or other tag display area. The display controller 3 further comprises a succeeding tag display portion 13 for displaying a tag appendant to each page following the current page at a position forward of the height of the current page tag in the one tag display area, and a preceding page tag display portion 14 for displaying a tag appendant to each page preceding the current page in page number at a position rearward of the height of current page in the other tag display area. In a preferred embodiment, the display controller 3 comprises a tag display mode setting portion 15 for setting the mode of tag (shape and color). The current page tag display portion 12 may have a current page tag height calculating function of calculating the page height of current page, on the basis of the ratio of the page number of current page relative to the total page number of electronic information.

The display controller 4 comprises a CPU for executing a page information display program and a RAM which is a main memory of this CPU. The page information display program is stored in a storage medium such as a CD-ROM and carried to the page information display device. The display controller 4 controls a program reading portion 16 such as a CD-ROM drive to read a program and store it in the storage unit 4. If this page information display program is executed, all or part of the process as shown in FIG. 14 is performed.

This page information display program may comprise the commands for operating the display controller 4 including a current page display command for displaying a current page of current display object read from the storage unit 4 in the information access area 5 and displaying a tag appendant to the current page in the one or other tag display area 6, 7, a succeeding page tag display command for displaying a tag appendant to each page following the current page in the one tag display area, before or after displaying the current page, and a preceding page tag display command for displaying a tag appendant to each page preceding the page number of the current page in the other tag display area, before or after displaying the current page.

As shown in FIG. 15, the display 1 consists of the information access area 5 and the tag display areas 6, 7 provided on the both sides of the information access area 5. For example, the electronic information display portion 11 draws the access information stored in the storage unit 4 in the information access area 5 of the display 1. Further, the tag display mode setting portion 15 specifies the tag display mode in accordance with the preselected setting. Subsequently, each tag display portion 12, 13 and 14 draws one sheet with tags 8, 9, 10 indicating the tag contents 18 such as the page number appended in the tag display area 6, 7, having an appearance with a tag added sheet. The current page tag 8 appended to the current page displayed in the information access area 5 has desirably a specific appearance of color or shape with a highlighted font for the tag content 18 such as the page number, for example, to easily distinguish it from other tags 9, 10.

Each tag 8, 9, 10 is arranged in accordance with the tag content 18 such as the page number. To make the page arranging order of the page information clear, the absolute positional relation of information provided for the computer is clarified by drawing comically the overlapping condition of tags. For example, the tag 10 displayed in one tag display area 6 has a smaller page number than the page number of the current page. The tags are displayed in overlapping condition so that the tag having a greater page number is placed visually in front of the tag having a smaller page number. Further, the tag displayed in the other tag display area 7 has a greater page number than the page number of the current page. The tags are displayed in overlapping condition so that the tag having a greater page number is placed visually in the rear of the tag having a smaller page number.

As compared with the tag content 18 such as the page number of the tag 8, 9, 10 appended in the information access area 5, the tag having a greater tag content 18 such as page number is displayed in one tag display area 6, and the tag having a smaller page number is displayed in the other tag display area 7. Also, the tags 8, 9, 10 are displayed differently in appearance in accordance with the page number of tag, which is an effective drawing method for clarifying the relative positional relation of access information.

Figure 16:
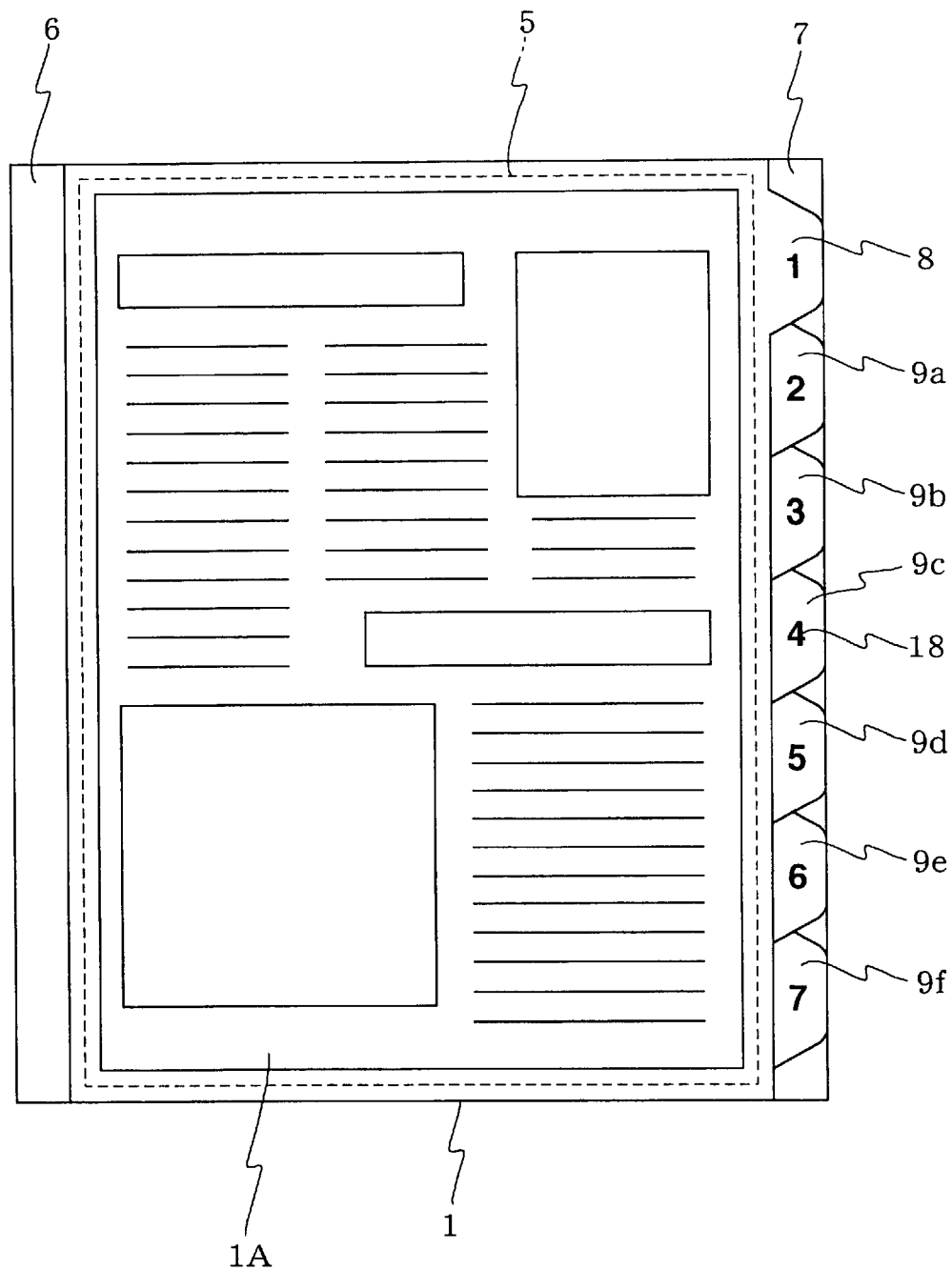
FIG. 16 is an explanatory view illustrating one example of an initial state of a tag display in this embodiment.
Figure 17:
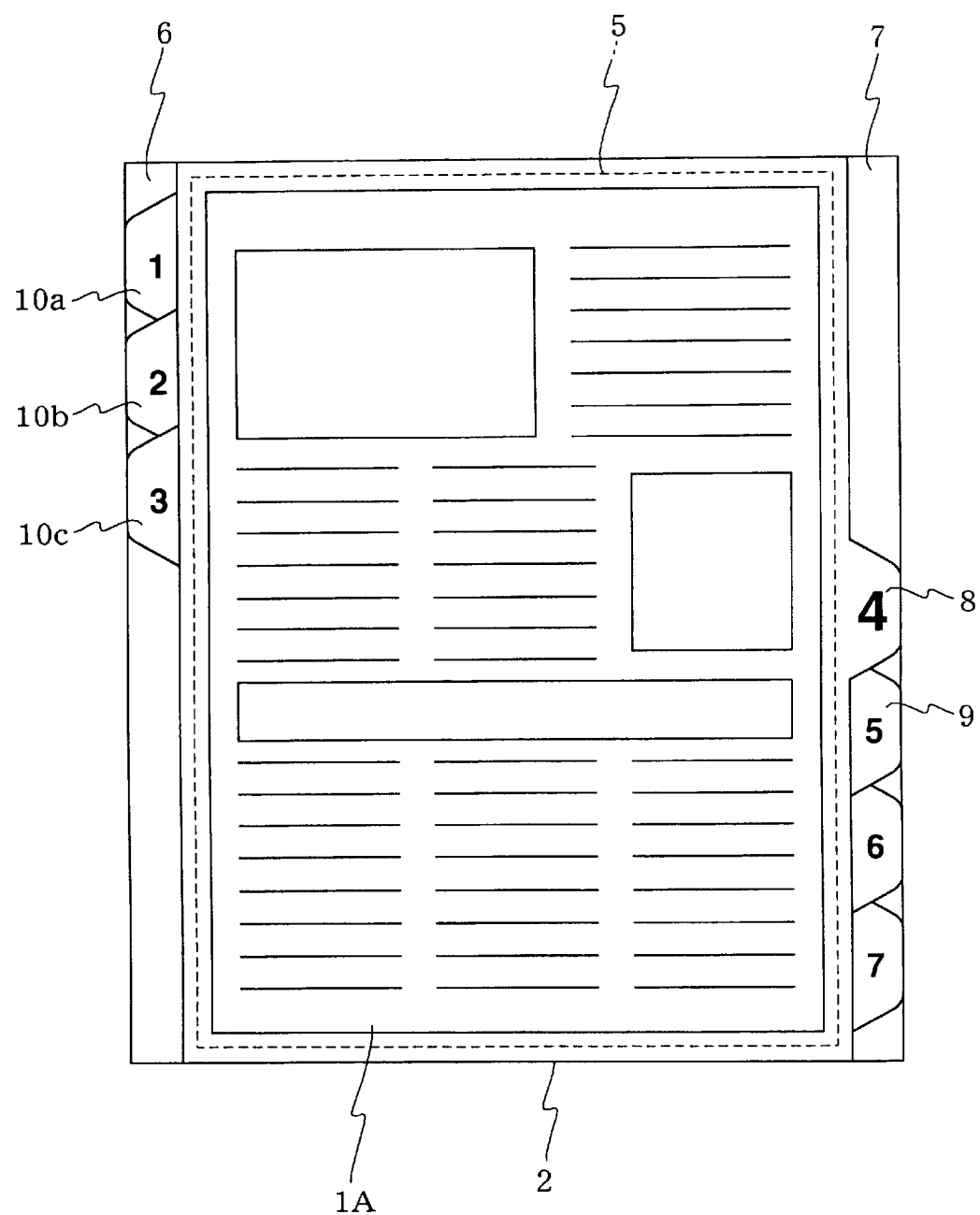
FIG. 17 is an explanatory view illustrating a tag display example at the fourth page with the configuration as shown in FIG. 16.

FIG. 16 is an explanatory diagram showing an initial state of the tag display according to this embodiment of the invention. FIG. 17 is an explanatory diagram showing a tag display example in which the fourth page is displayed in the configuration as shown in FIG. 16. Herein, the display unit 1 has the information access area 5 and the tag display areas 6, 7. The electronic information 1A stored in the storage unit 4 is displayed in the information access area 5 by reconstructing, as the page information in a unit of page, the amount of information which can be displayed in the information access area 5. The page information is data in a unit of page of predetermined size.

The page information display device arranges the tags 8, 9, 10 in the order of the tag content 18 such as the page number, with each tag 8, 9, 10 appended to the extremity of each page marking the tag content 18 such as page number, to exhibit that the arrangement of page information has a linear information structure, so that the page information in a unit of page can be superposed in succession like a book.

In the example of FIG. 16, the total page number of electronic information is 7 pages. Seven tags having the length of the tag display area 7 divided by the page number 7 are displayed. In order to overlap the tags, as shown in FIG. 16, this tag length is equal to the length divided plus the overlapping length. Typically, for the tag 8 appendant to the current page, the height or position of tag in a tag display direction may be determined, on the basis of the ratio of the page number of current page to the total page number of electronic information, at a step S2 of determining the current page tag height as shown in FIG. 15.

In the example as shown in FIG. 16, the page number of the page with the tag appended is displayed as the tag content indicated within the tag at a step S8 of displaying the page number. Accordingly, the number appended to the tag in FIG. 16 is the page number of electronic information. As shown in FIG. 16, even in the case where the page information is accessed using only one information access area 5, the tag having the page number is displayed in the tag display area, so that the user can see intuitively the total amount or depth of electronic information. And in the example of marking the tags 8, 9, 10 with the page number, unlike the tag having the heading information marked, there is no problem that the page number can not be fully written in the tags 8, 9, 10. Of course, if there is a sufficient space in the tag display area 6, 7, an icon or the like suggesting the content of character information or page information may be attached.

Before or after the step S8 of displaying the page number, the current page tag 8 may be highlighted. In the example as shown in FIGS. 16 and 17, the bold character is used as the font of current page tag.

Referring to FIGS. 16 and 17, the overlapping of tags will be described below. Firstly, with respect to the current page tag 8, as shown in FIG. 16, the succeeding page tags 9a to 9f are lower level tags. The order is such that the tag is at lower level as the page leaves away from the current page. Accordingly, the current page tag 8 is at the uppermost level. And the tags 9a, 9b, . . . , 9f are placed at lower level in the order of 9a, 9b, . . . , 9f. The overlapping of tags is such that the lowermost tag 9f is at the lowest level, and the tags are overlapped in the order of 9e, 9d, . . . , 9a. Thus, the user can understand the structure from the current page to the seventh page at a glance. In a case where there is an operation of gaining access to the fourth page, the preceding page tags are transferred to the one tag display area 6 in this embodiment, as shown in FIG. 17, rather than changing the overlapping relation only in the other tag display area 7. Thereby, the position of current page relative to the total page number of electronic information can be quickly and correctly informed to the user.

As shown in FIG. 17, among the preceding page tags 10, a tag 10c indicating a previous page (third page) of the current page is at the uppermost level, and the tag having smaller page number is placed at the lower level. Thereby, the depth of electronic information can be represented. After all, the hierarchical relation is such that the current page is at the uppermost level, and the page is positioned at lower level as the absolute value of a difference between the page number of the page and the current page number increases. Therefore, at a step of defining the tag relation, the current page tag 8 or the page tag preceding or succeeding the current page is at the uppermost level, and the page is positioned at lower level as the absolute value of a difference between the current page and the page for appending the tag increases. And at a step of setting the overlapping, the upper level tag overlaps the lower level tag in the one or other tag display area in accordance with the hierarchy of the page defined at the step of defining the tag relation. To clarify the order of arranging the pages, the depth of page can be visualized on the tag display area 6, 7 by comically drawing the overlapping of tags. In this way, in this embodiment, the tag 8, 9, 10 indicating the tag content 18 such as the page number is appended to the page information, which is then displayed in the tag display area 6, 7. Using an input unit 2, the tag 8, 9, 10 can be directly designated. The page information corresponding to the tag content 18 such as the page number for the tag 8, 9, 10 is displayed in the information access area 5. Then, the display mode for the tag 8, 9, 10 appended to the page information is changed, thereby making it possible to easily grasp the amount of information or the information structure provided for the computer. This is because the comparison between the number of tags in one tag display area 6 and that in the other tag display area 7 is visually easily made as shown in FIG. 15.

Further, in this embodiment, it is also possible to detect an input operation for accessing the page information such as turning the page in the information access area 5. For example, using a pointing device for the input operation with a fingertip such as a touch panel over the tag display area 6, 7 for input, there is provided a user interface which enables an access operation to be performed intuitively with the gesture of turning the page.

In the example of effecting the process as shown in FIG. 14, an access area and an operation area are provided in the display area on an output device of the computer to enable the electronic information displayed in the information access area to be fully listed. Further, the amount of information which can be displayed in the information access area is appropriately drawn by appending the tag indicating the page number to the electronic information in a unit of page, with the overlapping of tags. Therefore, the user can easily grasp visually the electronic information arranged for each page. The user, unfamiliar with the computer can also easily understand the information structure in the order of pages for the electronic information.

According to this embodiment of the invention, the user can easily grasp visually the absolute position of the page being currently accessed with respect to the amount of information provided for the computer in the order of arranging the tags. And the user can also easily grasp the relative position between the page or chapter being currently accessed and the arbitrary page or chapter, using the order of arranging the tags.

Figure 18:
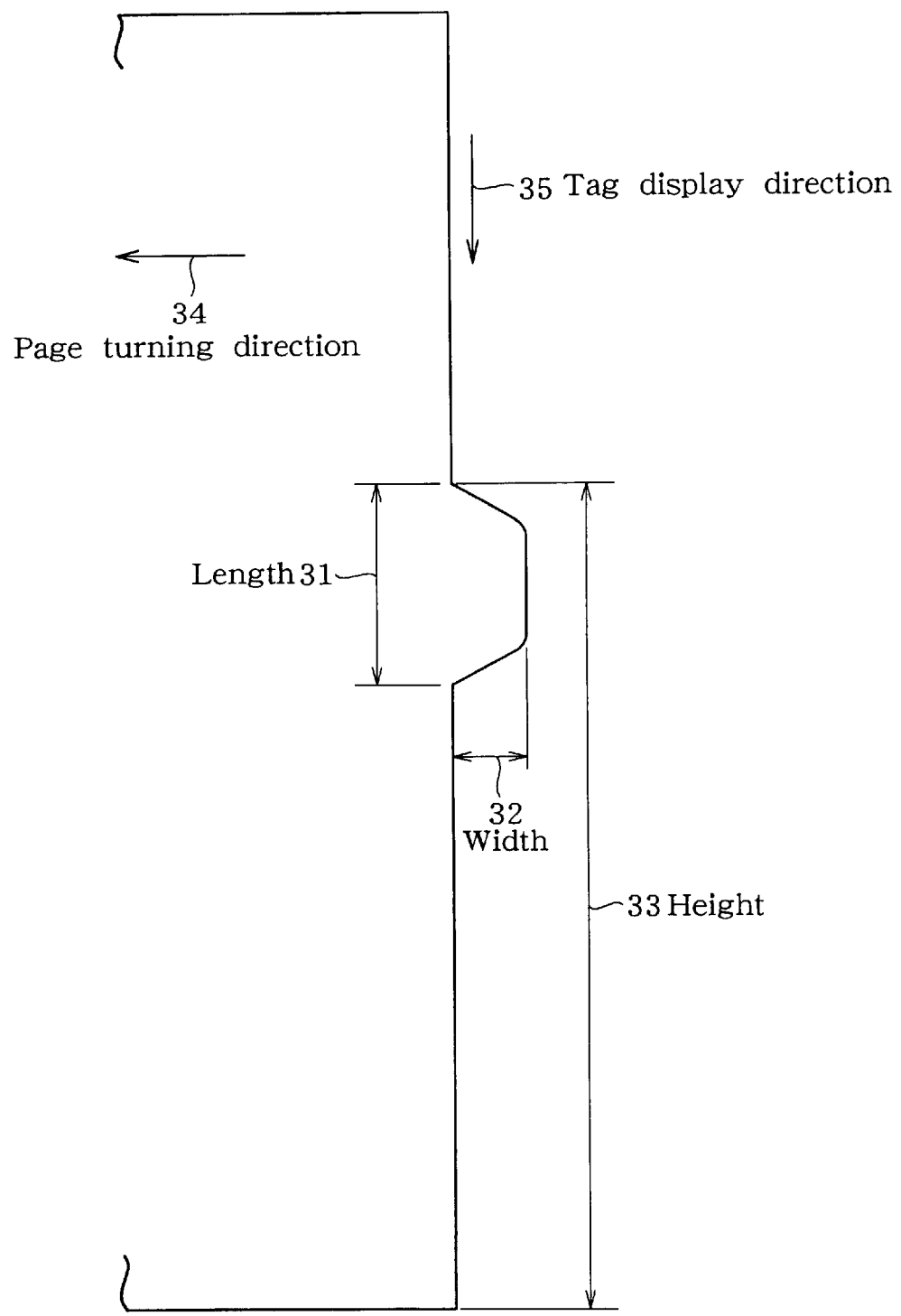
FIG. 18 is an explanatory view for defining various technical terms for use in a fourth embodiment of the present invention.

FIG. 18 is an explanatory diagram for defining the terms such as "tag width" for use in the present specification. Normally, in the English text or Japanese text written laterally, the characters are written from left to right and the page is turned from right to left. On the other hand, for the Japanese text written vertically, the page is turned from right to left. Also, in the case where the A4 sheets of paper for a report are fastened at the upper side, the page is turned from bottom to top. In this way, the direction of turning the pages may exist in the books, reports or magazines. Herein, a term "page turning direction" referred to above means one direction as indicated by reference numeral 34, or a direction of turning the page from right to left in FIG. 18. The page turning direction is typically parallel (or anti-parallel) to the character writing direction, or orthogonal to it. In this embodiment, a term "tag display direction" is defined as a direction orthogonal to the page turning direction. The tag is displayed along this tag display direction 35. When turning the page from right to left, the tag display direction is from top to bottom. When turning the page from bottom to top, the tag display direction is from left to right as shown in FIG. 14.

Herein, a term "tag length" is defined as a distance from the start point of tag to the end point in the tag display direction. A term "tag width" is defined as a length of tag in the page turning direction. Accordingly, if the tag length and the tag width are determined, the size required to display one tag can be determined. In this embodiment, the position of arranging the tag is variable along the tag display direction, depending on various elements. Herein, a term "tag height" can be defined as a length from one end point in the tag display direction. When the tag is trapezoid, the elements specifying one tag are "tag length", "tag width" and "tag height", as far as the angle of trapezoidal side face is determined.

Adjusting the Tag Length at the Start Time of Access

In this embodiment, a method of determining the tag length at the start time of access is disclosed. The electronic information 1A or electronic information 1B has the total page number which is variable depending on its contents. In the example as shown in FIGS. 16 and 17, the length in the tag display direction divided by the total page number is equal to a tag length. However, as the total page number increases, the tag length is too short to effect a simple uniform allocation. In an example as shown in FIG. 19, solving means for favorably effecting the tag display when the total page number is large is shown.

Figure 20:
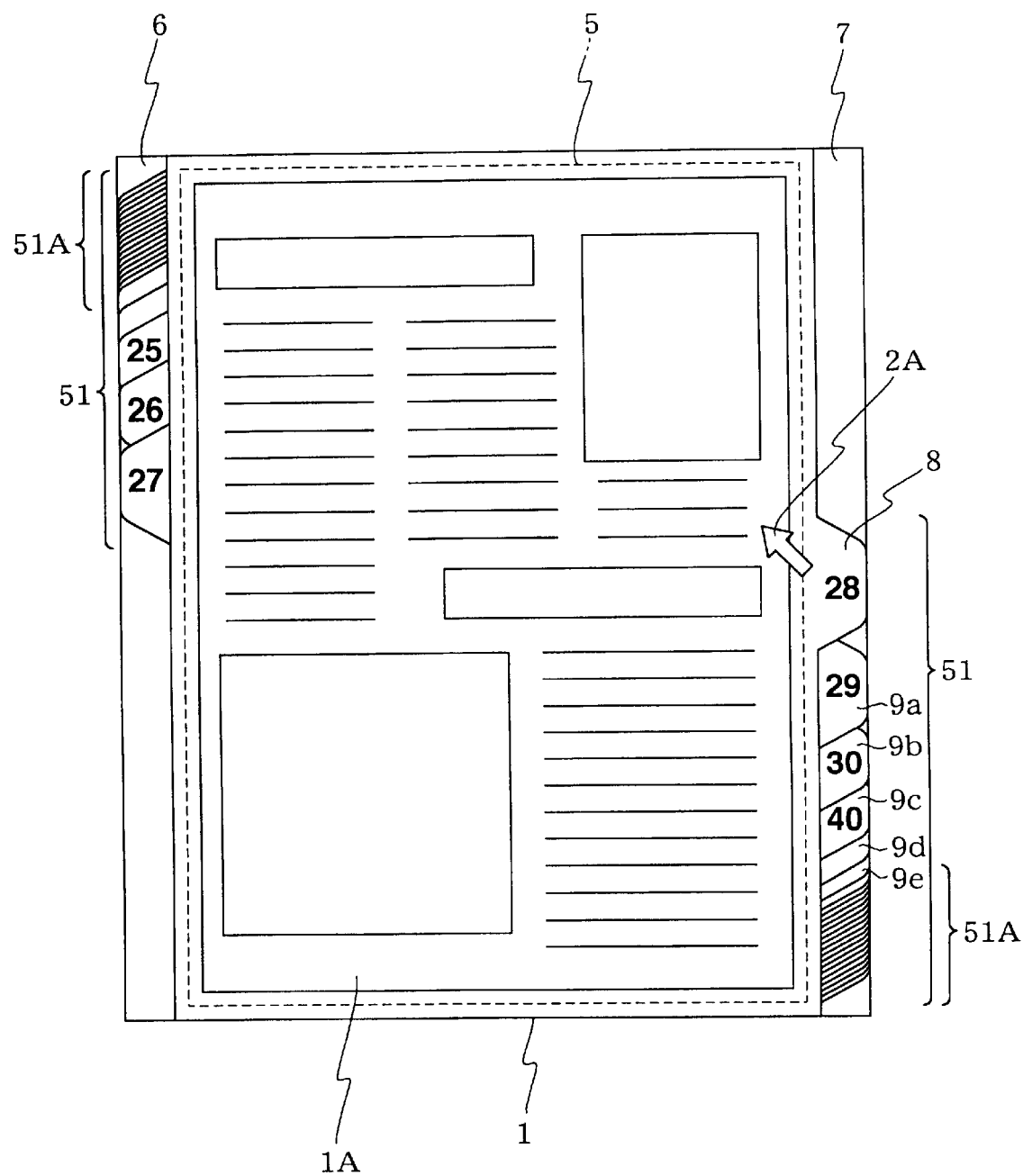
FIG. 20 is an explanatory view illustrating an example of a semantic display in the configuration as shown in FIG. 19.

When there are so many number of pages that it is difficult to draw the tags in the operation area with sufficient tag interval, the tag is drawn by gradually narrowing the interval between adjacent tags up to a certain page at the height proportional to the absolute value of a difference in the page number between the tag associated with the access area and other tags as shown in FIG. 20 (semantic display). The tags beyond the certain page range are superposed and drawn densely with a fixed tag interval.

Since in the semantic display the tag length is shorter successively for every tag, the tags for the current page and its neighboring pages can excellently have the tag content such as page number, and the position of the current page relative to the total page number is clear. Further, an interface which enables the user to detect the total page number at a glance can be constructed.

Figure 19:
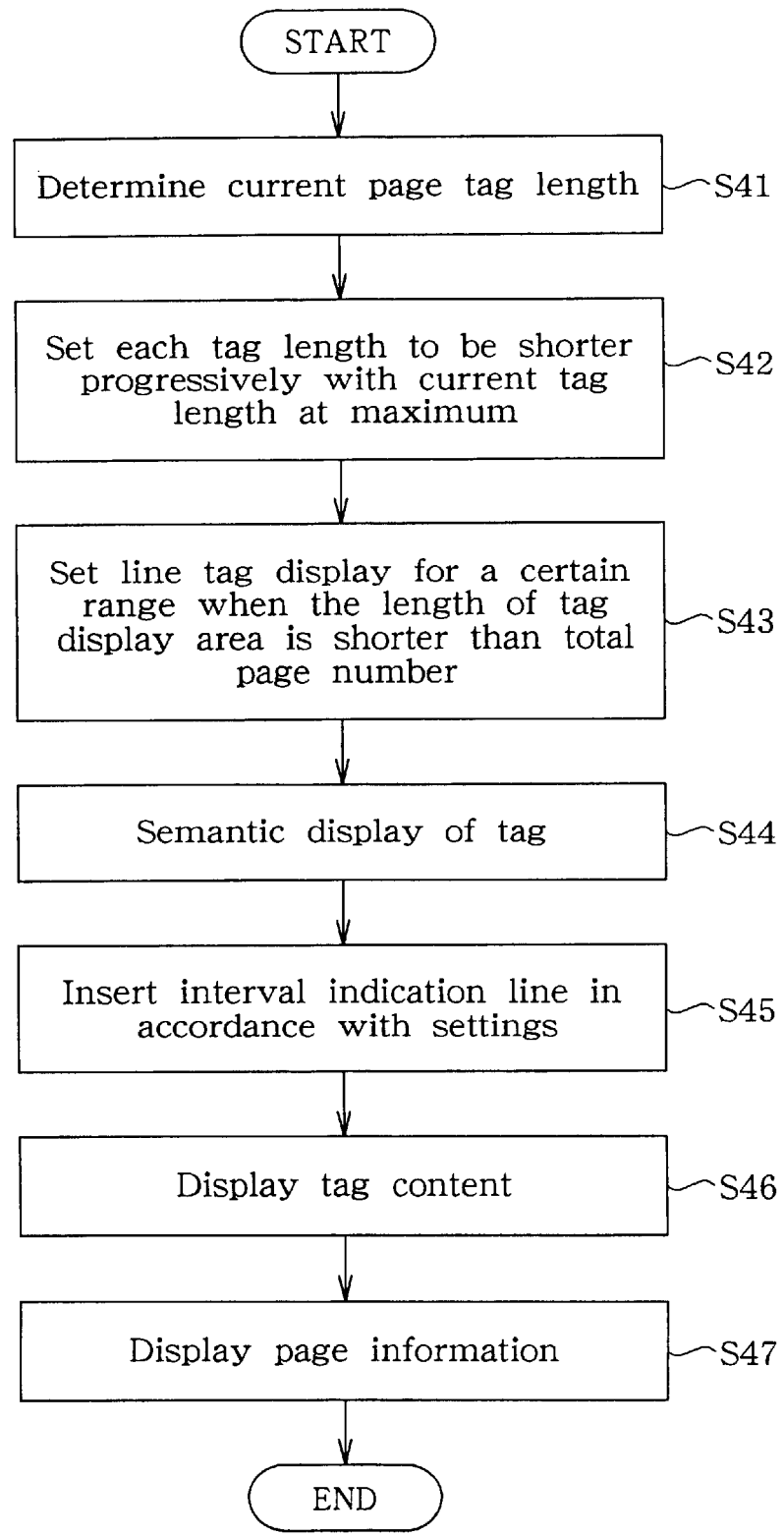
FIG. 19 is a flowchart showing the configuration of a semantic display process in which the tag length is changed continuously in the fourth embodiment of the present invention.

Referring to FIG. 19, first, the length of a current page tag 8 appendant to the current page is determined by referring to the tag length as the reference (step S41, a step of calculating the tag length). Subsequently, the length of each tag is set to be shorter at lower hierarchical level, with the tag length of the current page tag 8 as the maximum value (step S41, a step of creating the semantic display). And when the length of tag display area is too insufficient for the total page number, a line tag display 51A is set for a certain range (step S43, a step of setting the line tag). And the tags are displayed semantically (step S44). Depending on the content of page information, an interval display line for changing the thickness of tag contour line may be inserted at every page intervals (a step of inserting the interval display line). And the tag content such as page number is displayed for the tag capable of indicating the tag content in accordance with the tag length and the font size for display (step S46). Further, the page information of current page is displayed in the information access area.

Referring to FIG. 20, the current page is the 28th page. With the tag length of this current page tag 8 as the maximum value, the tag length is shorter in the order of tags 9a, 9b, . . . , 9e. In this example, the tag length is 0.8 times the previous one for each tag from the current page to effect the semantic display. Among the tag shapes indicated by reference sign 51A, the line tags which have only lower lines displayed are also implemented by this multiplier of 0.8. If the resolution of the display can not follow the line interval of tag, the tags are continuously displayed by the line. In the example of FIG. 20, the previous and next tag lengths are 0.8 times the current tag length, with the tag length of the current page tag 8 in the other tag display area 7 as the reference. As a result, the tag length which is displayed at the uppermost level (tag for 27th page) in the one tag display area is equal to the tag length indicating the 29th page. In this way, by making the tag length of the previous page shorter than the tag length of the current page, the current page tag is highlighted, with more deepness.

The semantic display as shown in FIG. 20 may be made at any time, irrespective of the total page number of page information. But in the case where the total page number is small, the semantic display may impede the effective use of the tag display area. Therefore, it is desirable to switch between the normal display as shown in FIGS. 16 and 17 and the semantic display as shown in FIG. 20 in accordance with the total page number of page information. This switching of display mode can be made based on the minimum reference length of the current page tag. That is, when all the tags are allocated over the entire length of the tag display area in the tag display direction, as shown in FIG. 16, the semantic display may be effected, as far as the tag length per tag is below the reference length.

FIG. 21 is a table showing a data structure of the page information display data required to switch between these display modes. The minimum reference length is simply determined by the number of dots, as shown in FIG. 21A, when the physical length and resolution of the display are predetermined. On the other hand, to provide a data structure not dependent on the actual display, an input of the physical length and the number of dots for display may be accepted at the time of execution, and the minimum reference length may be determined by the physical length in meter or the like. In this way, the user can use uniformly various apparatuses in respect of different page turning operations or different displays of deepness using the tag. When the semantic display is made, the sense of deepness can be represented corresponding to the total number of pages, even if the tag display area is not necessarily provided on the left and right sides. However, from the aspect of recognizing the current page position promptly, the tag display area is desirably provided on the left and right sides.

In the example of FIG. 21A, the page information display data includes the display dot number data of the display unit in each of the page turning direction and the tag display direction, the total page number data of electronic information stored in the storage unit, the dot number data per unit tag which is equal to the number of dots in the dot number data divided by the total page number in the total page number data, and the minimum reference data having the minimum reference width of tag which is predetermined for the tag length in the page turning direction and the minimum reference length of tag which is predetermined for the tag length in the tag display area, which are in comparison with the number of dots per unit tag. In the example of FIG. 21A, the length of unit tag is selected to a larger value between 80 dots which is the minimum reference length and the value of 1600 dots divided by the total page number ap. Using this data, it is possible to determine the tag length of current page tag, and switch between the normal display and the semantic display.

In the example of FIG. 21B, the minimum reference length is selected to a larger value between 2 cm or the value of the tag display area length divided by the total number page ap. The page information manager 43 can obtain the physical length per dot from the relation between the display dot number data and the tag display area length, and thereby the number of dots per unit tag length.

The page information display data may have the tag ratio data which is referred to when the dot number data per unit tag is shorter than the minimum reference data. This tag ratio data is a ratio of the tag length varied successively from the current page of electronic information to the end page or start page relative to the tag length of the minimum reference data. And the tag length is calculated successively from higher to lower hierarchy by referring to this tag ratio data. Then, the tag is overwritten in the tag display area from lower to higher hierarchy. In this way, the tags can be overlapped well. When the total page number is large, the line tag is automatically produced in accordance with the resolution. Consequently, a consistent interface can be constructed.

Figure 22:
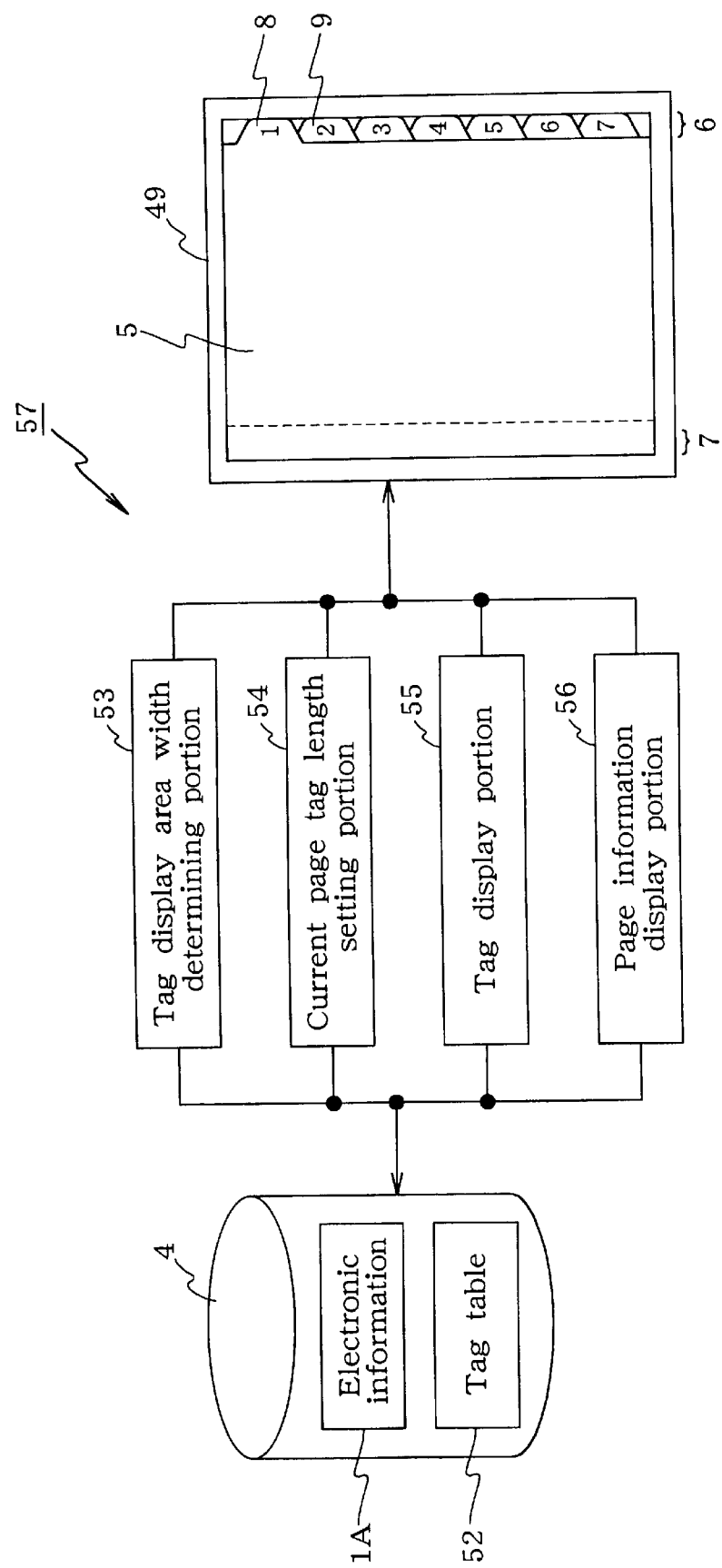
FIG. 22 is a block diagram illustrating a configuration of a page data display device in the fourth embodiment.

FIG. 22 is a functional block diagram showing the configuration for designating the tag shape using the page information display data as shown in FIG. 21. In an example of FIG. 22, there are provided a storage unit 4 for storing the electronic information having a plurality of pages in a unit of page of predetermined size, a display 49 having an information access area 5 for displaying the electronic information stored in the storage unit 4 in a unit of the page, and a page information display portion 56 for enabling the electronic information stored in the storage unit 4 to be read on the basis of the page specifying information externally input, and displayed in the information access area.

The display 49 has a tag display area 6 provided along with the information access area on one end or both ends in the page turning direction to turn the page of page information in the information access area 5. Further, it comprises a tag shape calculating portion for calculating the length of tag appendant to each page in the tag display direction on the basis of the length of tag display area in the tag display direction which is orthogonal to the page turning direction, and the total page number ap of electronic information stored in the storage unit 4, and a tag display portion 55 for displaying the tag in the tag display area on the basis of the length of tag which is calculated by this tag shape calculating portion.

The tag shape calculating portion comprises a tag display area width determining portion 53 for determining the width of the tag display area, on the basis of the minimum reference width of tag and the size of electronic information in the page turning direction, for example. For example, if the residual length of the page turning area when the longitudinal length of page information is enlarged or reduced to the longitudinal length of the display is below the minimum reference width, the enlargement or reduction ratio of page information may be changed. Also, the tag shape calculating portion comprises a current page tag length setting portion 54 for setting the tag length of current page to the tag length per unit tag which is the length of the display 49 in the tag display direction, divided by the total page number ap of electronic information, and setting the length of current page tag appendant to the page being currently displayed to the minimum reference length, when the tag length is shorter than the minimum reference length of tag. When the tag length of current page is set to the minimum reference length, the semantic display is made in this example. Or otherwise, the normal display is made.

To display the tags on the basis of the minimum reference length, a tag table (or the page information display data as shown in FIG. 21) containing the minimum reference width of tag in the page turning direction and the minimum reference length of tag in the tag display direction which are predetermined on the basis of the size of the display 49 is stored in the storage unit 4. The tag display portion 55 may display the tag having a width determined by the tag display area width determining portion 53 and a length determined by the current page tag length setting portion 54 in the tag display area.

With the configuration as shown in FIG. 22, the operation of each portion can be realized by the CPU and the program, in the same way as shown in FIG. 15. For example, a program for calculating the tag length, using the page display information of the data structure as shown in FIG. 21, has a tag length calculation command for calculating the length of each tag appendant to each page in the tag display direction on the basis of the length of tag display area in the tag display direction and the total page number ap of electronic information stored in the storage unit 4, and a tag display command for displaying the tag in the tag display area on the basis of the length of each tag calculated in accordance with the tag length calculation command. The tag length calculation command contains a subcommand for effecting translation between the physical length and the number of dots, if the minimum reference length of FIG. 21B is the physical length.

Figure 23:
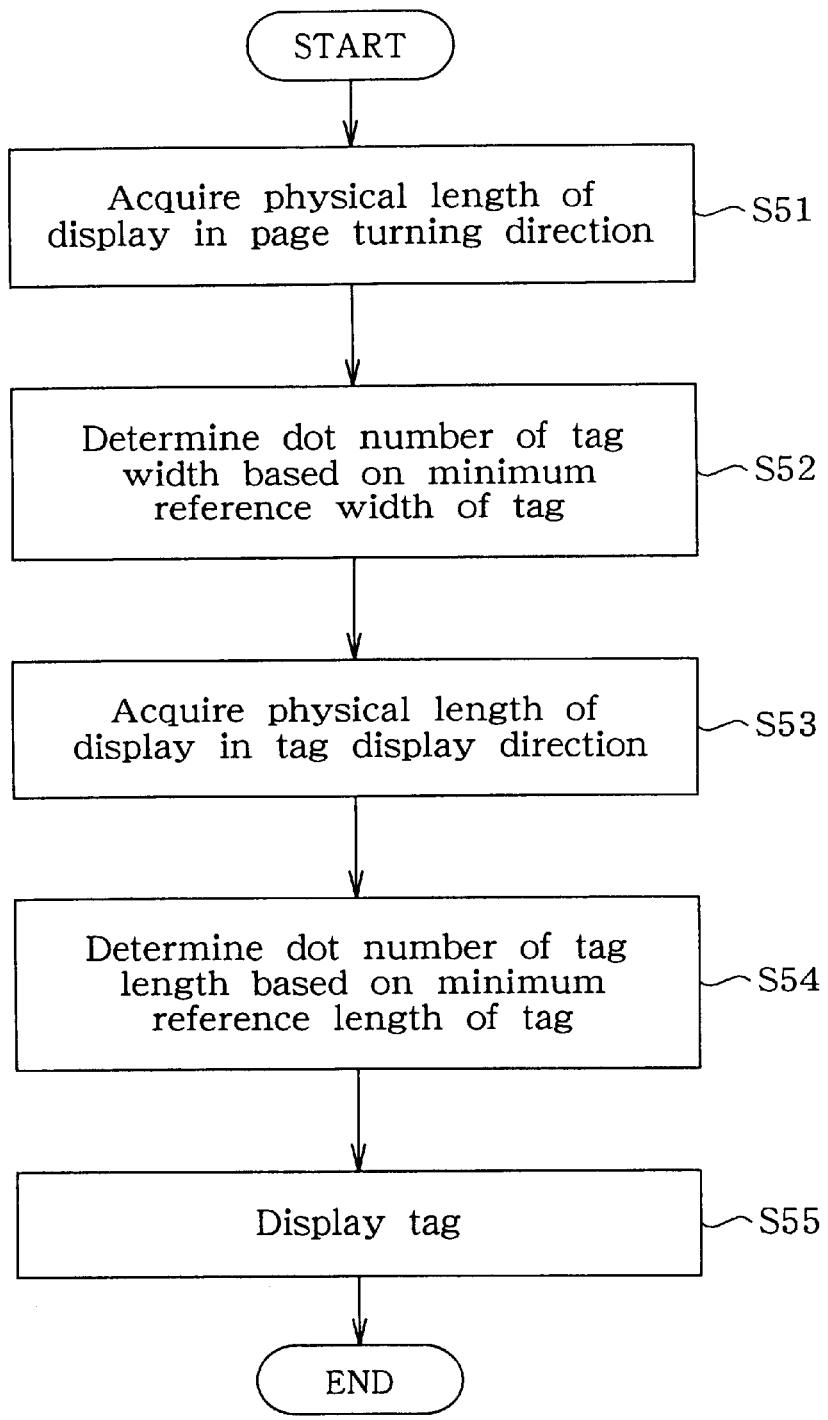
FIG. 23 is a flowchart illustrating one example of a process for determining the tag width and the tag length using the data of data structure as shown in FIG. 21.

FIG. 23 is s flowchart showing a process of determining the tag width and the tag length using the data of the data structure as shown in FIG. 21B. Firstly, the physical length information of the display 49 in the page turning direction is acquired (step S51, a step of acquiring the physical length). Subsequently, the minimum reference width of tag at the resolution of the display is calculated on the basis of the physical length information acquired at step S51 of acquiring the physical length and the minimum reference width of tag in the page turning direction which is predetermined by the physical length (minimum tag width calculation step). And the width of the tag display area is determined on the basis of the minimum reference width dependent on the display 49 calculated at step S52 of calculating the minimum tag width and the size of electronic information (step S52 of determining the tag display area width).

Subsequently, the physical length information of the display in the tag display direction which is orthogonal to the page turning direction is acquired (step S53, a step of acquiring the physical length). Then, the minimum reference length of tag at the resolution of the display is calculated on the basis of the physical length information acquired at step S53 of acquiring the physical length and the minimum reference length of tag in the tag display direction which is predetermined by the physical length (minimum tag length calculation step). When the tag length per unit tag which is equal to the length of the display in the tag display direction divided by the total page number of electronic information is shorter than the minimum reference length, the length of current page tag appendant to the page being currently displayed is set to the minimum reference length (step S54, a step of setting the current page tag length).

And the tag having a width determined at step S52 of determining the tag display area width and a length determined at step S54 of setting the current page tag length is displayed in the tag display area (step S55, tag display step). Thereby, the tag having an excellent shape can be displayed without being dependent on the resolution.

Figure 24:
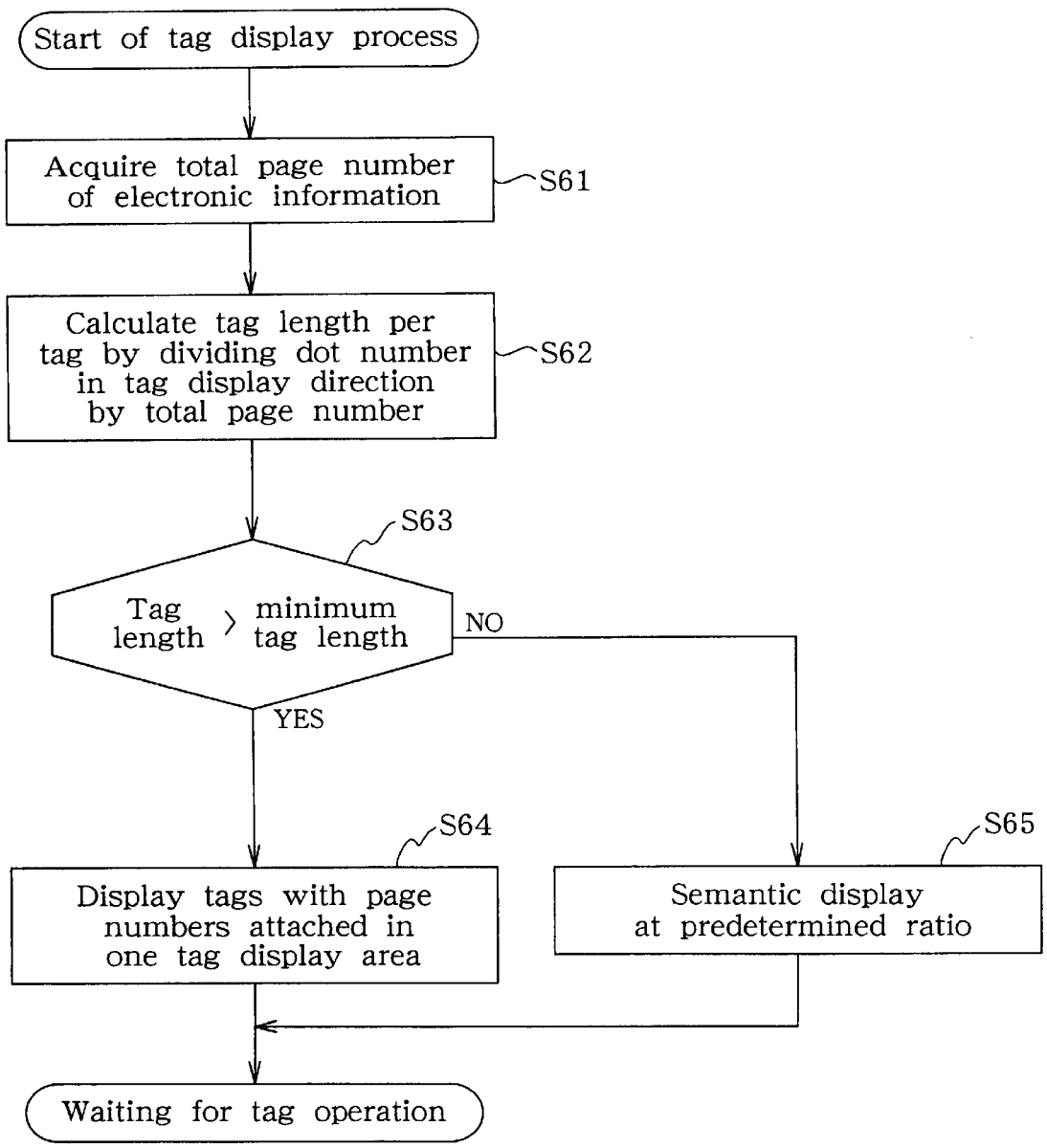
FIG. 24 is a flowchart illustrating one example of a process for switching between a normal display and a semantic display.

FIG. 24 is a flowchart showing a process of switching between the normal display and the semantic display. As shown in FIG. 24, the total page number of electronic information is acquired in starting the display of page information (step S61). And the tag length per tag is calculated by dividing the number of dots in the tag display direction by the total page number (step S62). Then, a comparison is made between the calculated tag length and the minimum reference tag length as shown in FIG. 21 for example. If the calculated tag length is longer, the normal display is effected (step S64). On the other hand, if the calculated tag length is shorter than the minimum tag length, the semantic display with a multiplier of 0.8 is effected (step S65).

The page information display device for enabling the selection of the display mode may comprise, in addition to the configuration of FIG. 22, a tag display mode selecting portion for selecting the normal display in which the length of tag to be displayed in the tag display area is a fixed length, when the total page number of electronic information is a predetermined number or less, or selecting the semantic display in which the tag length is reduced stepwise from the current page tag, when the total page number exceeds the predetermined number.

Adjusting the Tag Length After Turning the Page

A specific example will be described below in which the tag is redisplayed, after some operation is applied to the page information and tag on the display, and a different page is displayed. As to how to display the tag after turning the page, the adjustment of the tag height is required. In the example of FIGS. 16 and 17, the normal display is effected. The current page tag is moved from the other tag display area 6 to the one tag display area 7 while maintaining the tag height constant. In the semantic display as shown in FIG. 20, the tag can not be continuously moved with the constant tag height maintained. In the present example, the measures for this point are disclosed.

Figure 25:
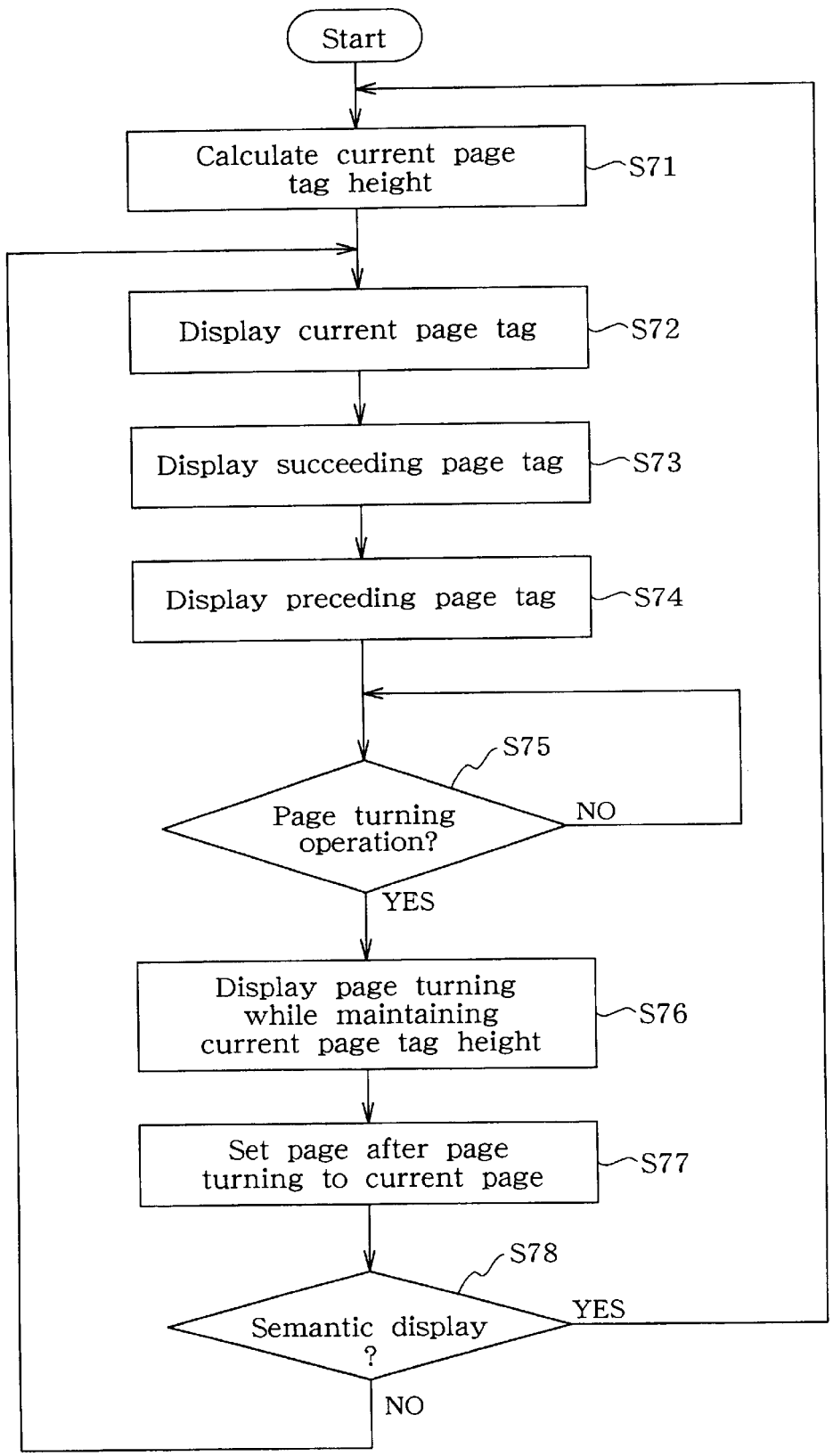
FIG. 25 is a flowchart illustrating an example of a process for displaying a tag again after turning a page.

FIG. 25 is a flowchart showing a process for redisplaying the tag after turning the page. In an example of FIG. 25, firstly, the tag height of current page is calculated (step S71). This step S71 of calculating the current page tag height calculates the height of current page tag appendant to the current page number of current display object, on the basis of the ratio of the current page to the total page number of electronic information. In the normal display, the height of tag once displayed is not changed. On the other hand, in the semantic display, the height of current page tag is changed in accordance with the page number of current page to be displayed.

Subsequently, the current page read from the storage unit 4 is displayed in the information access area. The tag appendant to the current page is displayed in the one or other tag display area 6, 7 at a current page tag height calculated at step S71 of calculating the current page tag height (step S72 of displaying the current page tag). Before or after this step S72 of displaying the current page, the tag 9 appendant to each page succeeding the current page is displayed in the one tag display area 9 at a smaller height than the current page tag height (step S73 of displaying the succeeding page tag). On the other hand, the tag appendant to each page preceding the page number of current page is displayed in the other tag display area 10 at a larger height than the height of current page tag (step S74 of displaying the preceding page tag).

Figure 26:
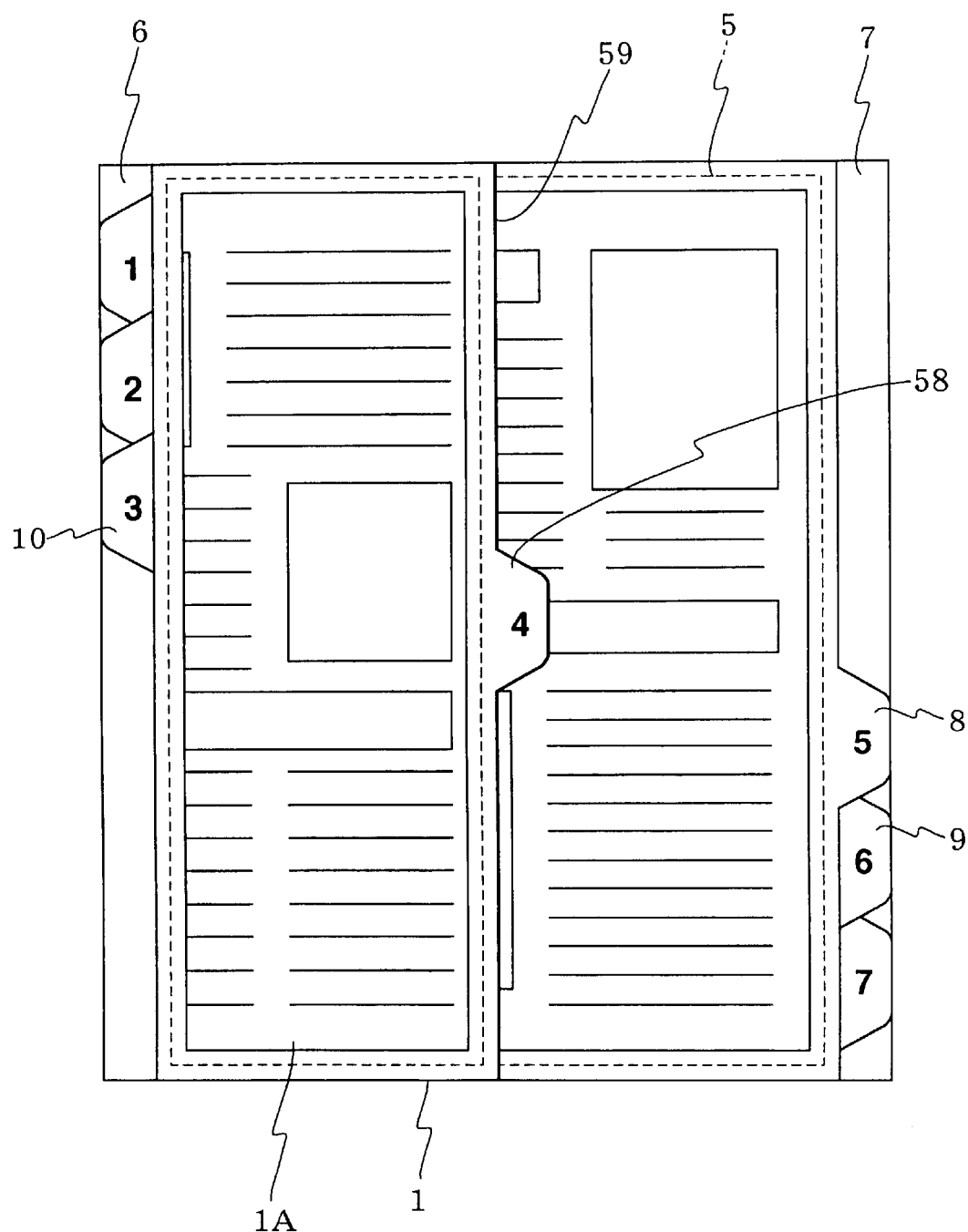
FIG. 26 is an explanatory view illustrating a display example while turning a page with the configuration as shown.

Subsequently, the procedure waits for an operation of turning the page (step S75). Further, when there is the operation of turning the page, the page turning is displayed like animation with the tag appended to the page being turned, while maintaining the tag height of current page tag, as shown in FIG. 26 (step S76). Then, the page after being turned is set as the current page (step S77).

In this example, a process after resetting the current page is different between the normal display and the semantic display. That is, in the semantic display (step S78), the tag height of current page is recalculated on the basis of the ratio of the current page to the total page number (step S71 of redisplaying the same ratio height tag). On the other hand, in the normal display, the current page tag is displayed while maintaining the height of each tag (step S72 of redisplaying the same height tag). Thereafter, this process is repeated.

A page display program for implementing this process may have, for example, a tag length calculation command, a normal display command, a semantic display command, and a tag height control command. Specifically, the tab length calculation command calculates the tag length per tag on the basis of the total page number information of electronic information and the length of the tag display area. The normal display command sets the calculated tag length to a display tag length when the calculated tag length is above a predetermined tag length. The semantic display command sets the predetermined tag length to the tag length of current page when the calculated tag length is below the predetermined tag length and sets the length of tag appended to each page preceding and succeeding the current page to a shorter length stepwise, with the tag length of current page at the uppermost level. The tag height control command redisplays the tag at the constant height of each tag during the normal display or by calculating the tag height on the basis of the page number of a new current page during the semantic display when there is an operation of turning the current page displayed in the information access area. The semantic display command may be initiated when the normal display command can not be executed. Since the tag height control command requires the information of whether the normal display or the semantic display is made, a flag indicating the current display mode may be stored in the page table 41.

Referring to FIG. 26, the current page that is the fourth page is turned when the fourth page is displayed. Then, the fifth page is displayed. To provide the user with an impression like turning pages of the book, the display area of the page being turned is reduced gradually and the display area of a new page to be displayed next is increased gradually in the example of FIG. 26. This display example involves various patterns, which may be selected in accordance with the display processing ability of the controller for use. For example, if the controller can perform a high speed 3D processing (with the CPU and operating system), the state of turning the paper may be displayed in the three dimensions. Also, the page may be revolved around the tag display area 6 in the tag display direction as a central axis while the data being displayed is transformed in accordance with the turning movement.

In the example of FIG. 26, the motion of turned page is followed by the motion of tag, as indicated by reference numeral 58. That is, the page information display method of this example includes a page turning step of moving the current page in the page turning direction, and displaying a page to be displayed by a tag operation in the information access area, when the tag operation is applied to a tag displayed in the tag display area, and a tag moving step of moving the tag appended to the current page between the one and other tag display areas in the page turning direction along with the movement of the current page, when the current page is moved at the page turning step. Thereby the position of page being moved becomes clear. Also, in the example of displaying the page turning in the three dimensions, the tag shape may be deformed and moved while following the page. For example, if the tag width is made gradually slender, the behavior of the page moving upward with the rotation can be represented.

Figure 27:
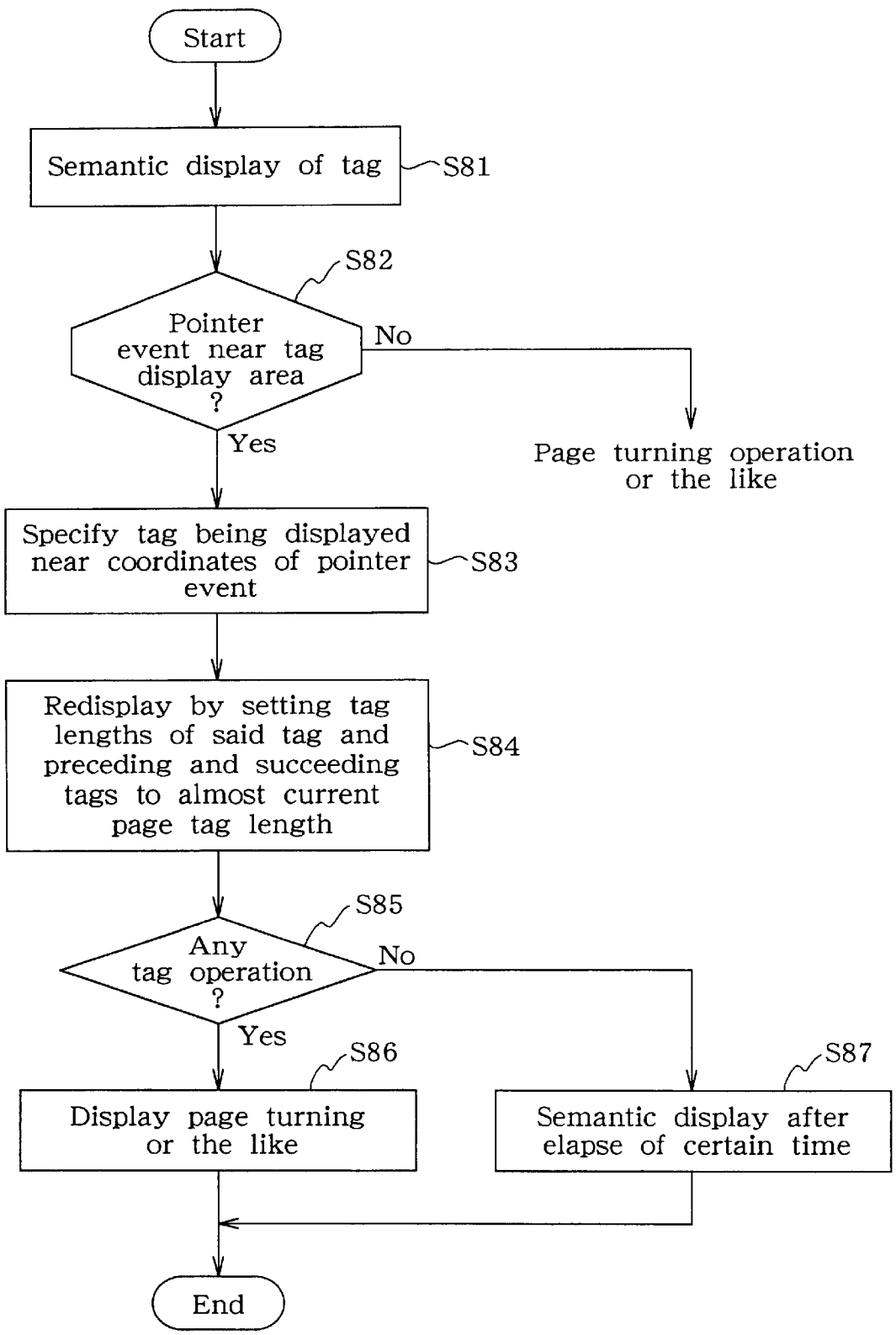
FIG. 27 is a flowchart illustrating one example of a process for expanding the tag during the semantic display.

FIG. 27 is a flowchart showing a process of expanding the tag during the semantic display. First of all, the tag is on the semantic display (step S81). And if there is a pointer event near the tag display area, a tag being displayed is designated near the coordinate at which the pointer event occurs, for example, when a pointer 2A comes closer to the tag display area which is selectively displayed. In an example of FIG. 28, the pointer indicated by reference sign 2A comes closer to a line tag indicating the 48th page among the line tags displayed and designates it. In this case, the lengths of the tag indicating the 48th page and its preceding or succeeding three or five tags are reset to substantially as long as the tag length of current page and displayed (step S84 of expanding the tag). Then, the page information of the 48th page may be stored in the cache memory.

If there is no tag operation (step S85), the tag display is restored after the elapse of a certain time (step S87). On the other hand, if there is any operation on the expanded tag displayed, the processing such as turning the page is performed (step S86). A program for executing the processing as shown in FIG. 27 may have a tag expanding command for resetting the tag length displayed on the basis of the relation between the tag displayed in the tag display area and the coordinate or pressure of the pointer, and a tag length return command for returning the tag length resets to its original length after the elapse of a certain time since the coordinate or pressure of the pointer returns to the steady state.

Figure 28:
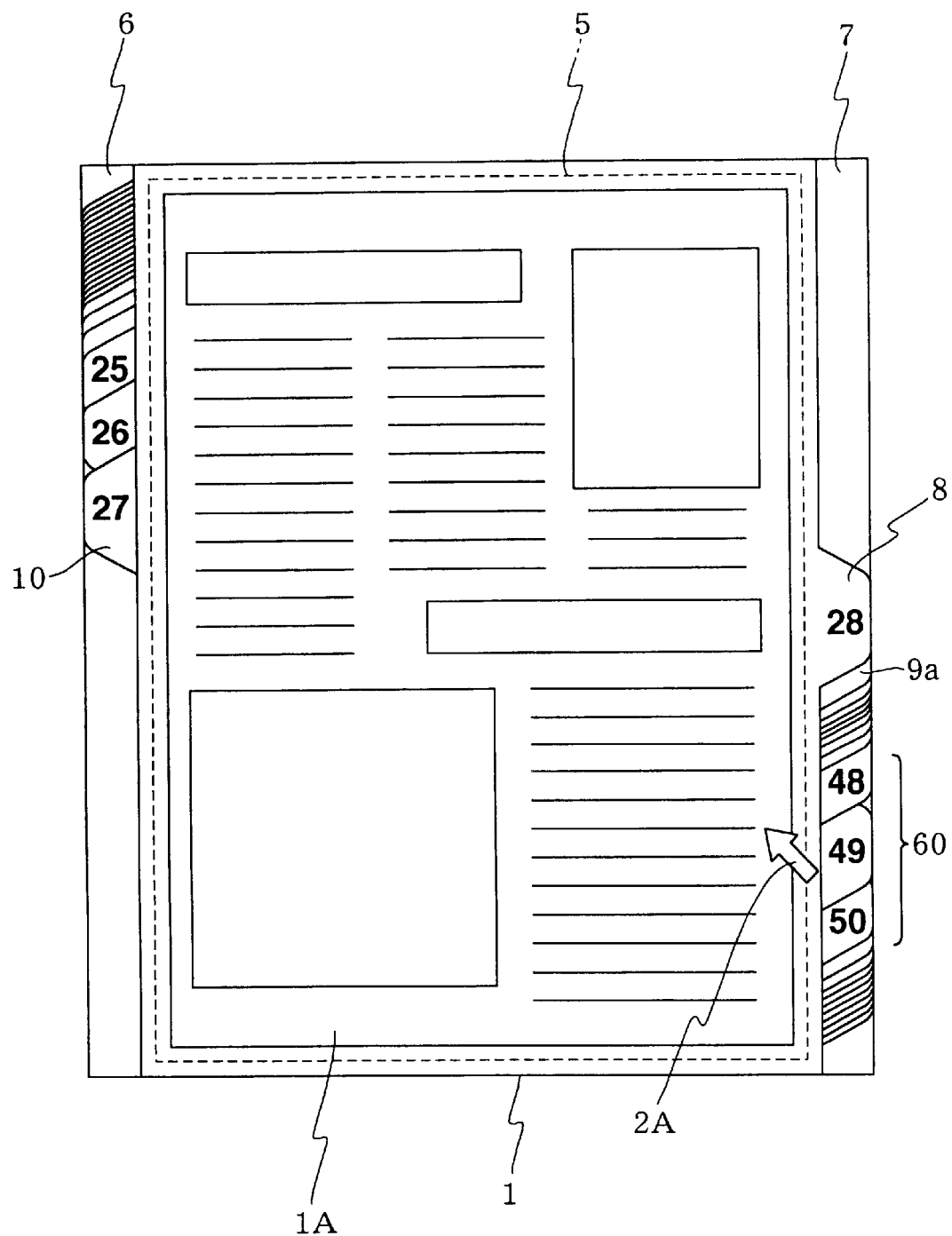
FIG. 28 is an explanatory view illustrating a display example with the tags near a pointer expanded in the process for expanding the tag as shown in FIG. 27.

Referring to FIG. 28, the tag expanding process will be described again. A tag which is located closest to the pointer 2A (tag of the 49th page in FIG. 28) when the distance h between the tag and the input cursor is below a certain distance H1, is drawn at a height inversely proportional to the distance h with a gradually wider interval between tags as the coordinate of an input cursor comes closer to the tag (tag of the 49th page). When the distance between the fingertip coordinate and the tag (tag at the 49th page) is greater than a predetermined distance H2, the change of the interval between tags as shown in FIG. 28 gradually returns to a display state of FIG. 20, after the elapse of a fixed time from exceeding it.

Holding Plural Pages and Tag Display

Figure 29:
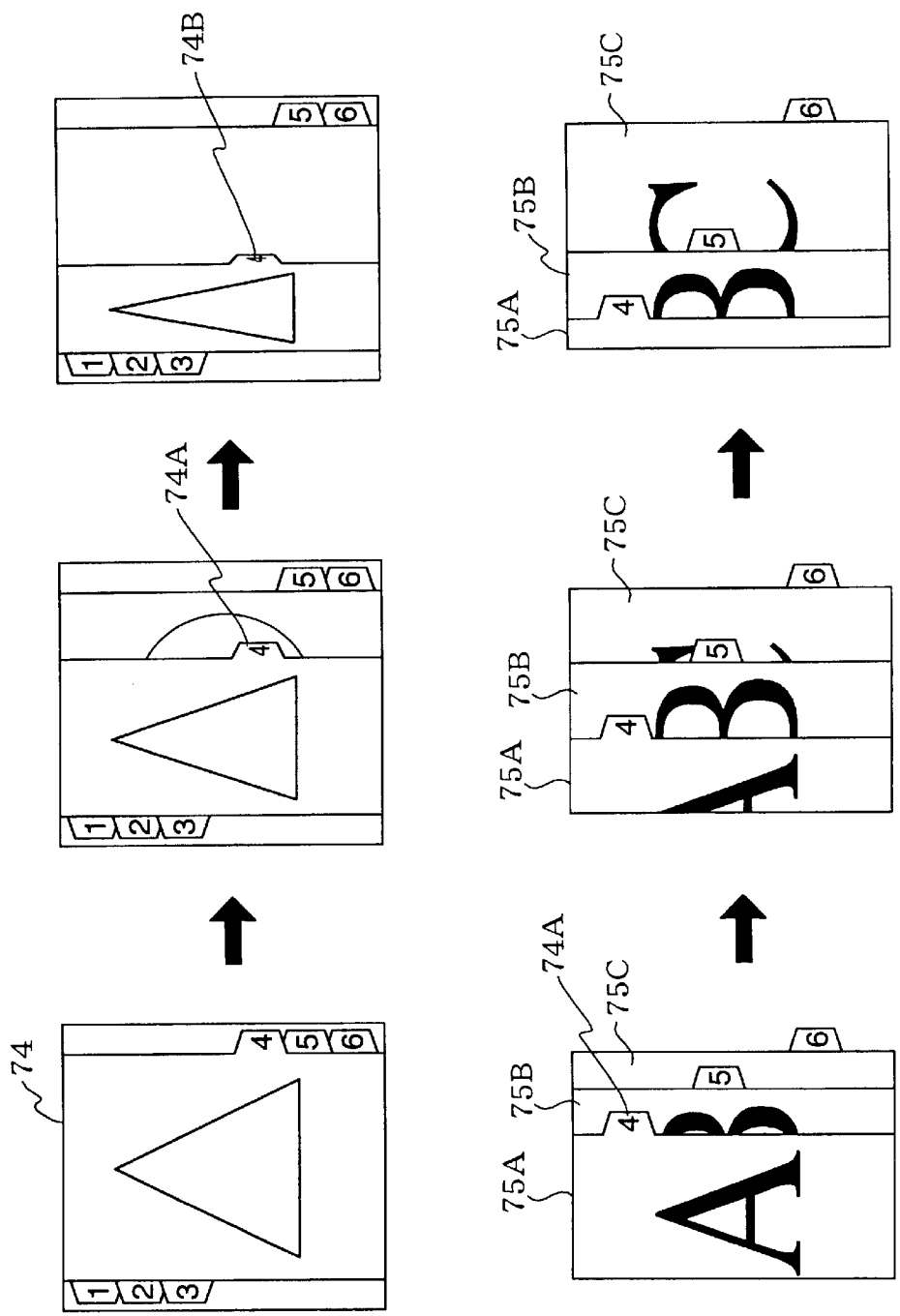

FIG. 29A is a view illustrating one example of the display format of tag integral type. In the example as shown in FIG. 29A, the turning state display data creating step as designated at step A24 in FIG. 10 comprises a substep of creating the turning state display data having a tag portion along with the current page in the case where the tag is appended to the current page. In the example as shown in FIG. 29A, the display of compression type as shown in FIG. 13A is effected along with a tag 74A appended to the current page. Because of the compression type, the tag width of the tag 74B in which the page is more compressed is narrower than the tag width of the tag 74A.

FIG. 29B is a view illustrating one example of the display format of plural pages integral type. In the example as shown in FIG. 29B, the turning state display data creating step A24 as shown in FIG. 10 comprises a substep of deferring the transformation of each held page until transformation of the current page for each of the pages held in the case where the number of holding pages detected in the page turning operation detecting step is two or greater. In the example as shown in FIG. 29B, the display format of slide type as shown in FIG. 12B is applied for three consecutive pages consisting of a current page 75A displaying the character "A", a next page 75B of the current page displaying the character "B", and a next display page 75C displaying the character "C", wherein the current page 75A and the next page 75B are transformed with a time difference. Thereby, the next page 75B is displayed while the page is being turned, whereby the state of turning plural pages is seen more intuitively by the user. As shown in FIG. 29B, in the case where a tag is appended to each page, the tag may be moved along with each page.

Figure 30:
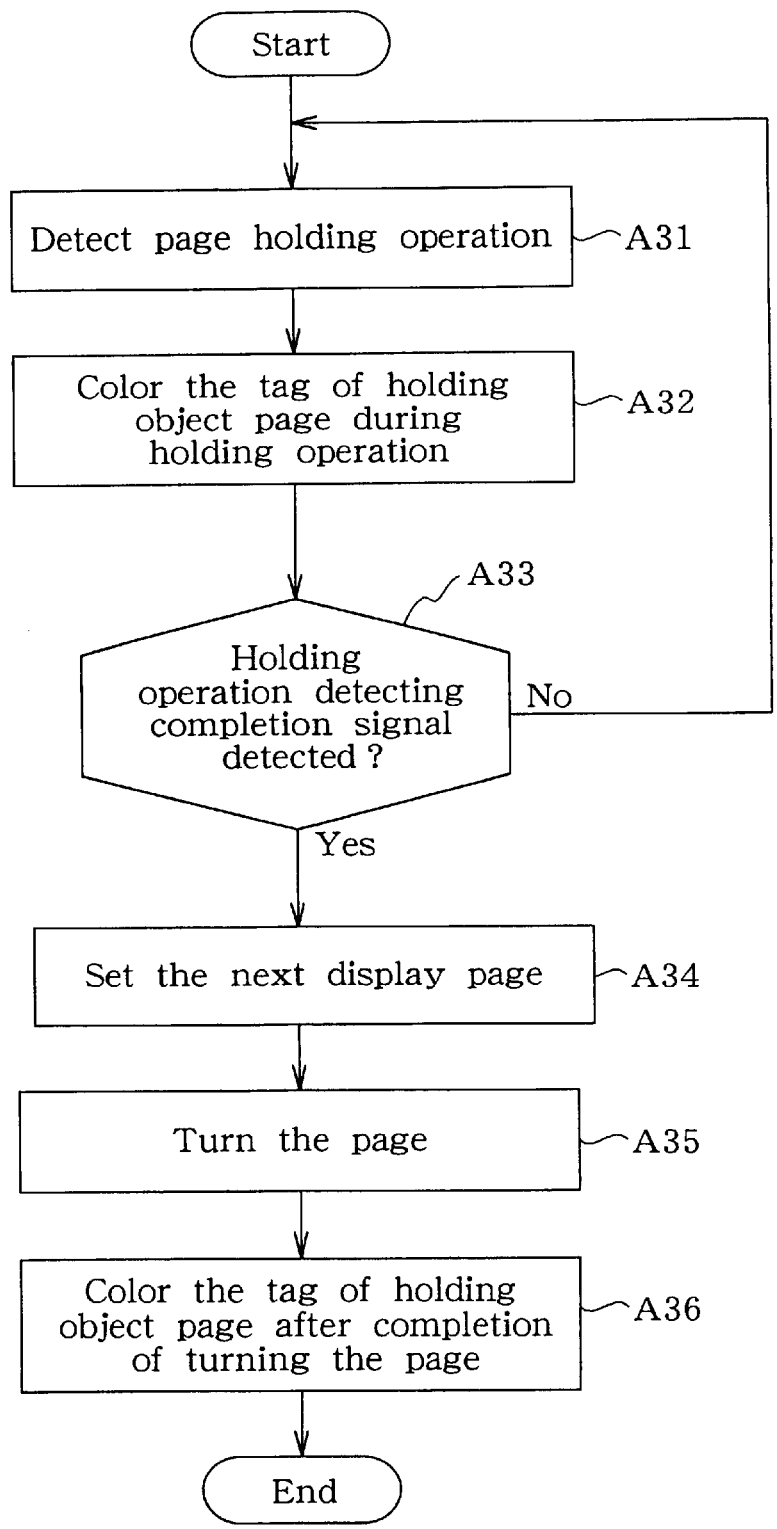
FIG. 30 is a flowchart illustrating one example of a tag display control with a holding operation in the fourth embodiment.

FIG. 30 is a flowchart illustrating one example of a tag display control in accordance with a holding operation according to the fourth embodiment of the invention. Referring to FIG. 30, the page information display method comprises a page holding operation detecting step A31 of outputting a page holding operation detecting signal, when a predetermined page holding operation is performed at a current page read from the electronic information memory 4 that is to be displayed at present, and a before-turning holding object page tag coloring step A42 of coloring a tag for a holding object page that is held by the page holding operation with a different color from other tags in one tag display area that is displaying a tag appended to the current page, when the page holding operation is initially detected in the page holding operation detecting step A31. At this step A42, the tag of the page actually held by the page holding operation is colored, whereby the user can confirm the effect on the number of holding pages by the holding operation due to the pressure or time at a glance. In particular, if the position of the page of interest is roughly grasped from the position of page tag, the coloring of the tag is confirmed while the pressure is being changed minutely, thereby making the operation more correct and simpler.

And the page information display method further comprises a next display page setting step A34 of setting a page having a page number that is equal to the current page added or subtracted by the amount of holding operation to a next display page to be displayed at the next time, when the page holding operation detecting signal is output in the page holding operation detecting step A31, and a page turning process step A35 of displaying the next display page set in this next display page setting step A34 in place of the current page on the display unit.

In the example as shown in FIG. 30, the page information display method further comprises, following the page turning process step A35, an after-turning holding object page tag coloring step A36 of coloring a page tag for the holding object page, for which the page turning process is completed, in the other tag display area where a tag appended to a current page that has become the new current page after the page turning process is not displayed, with a different color from other tags.

Figure 31:
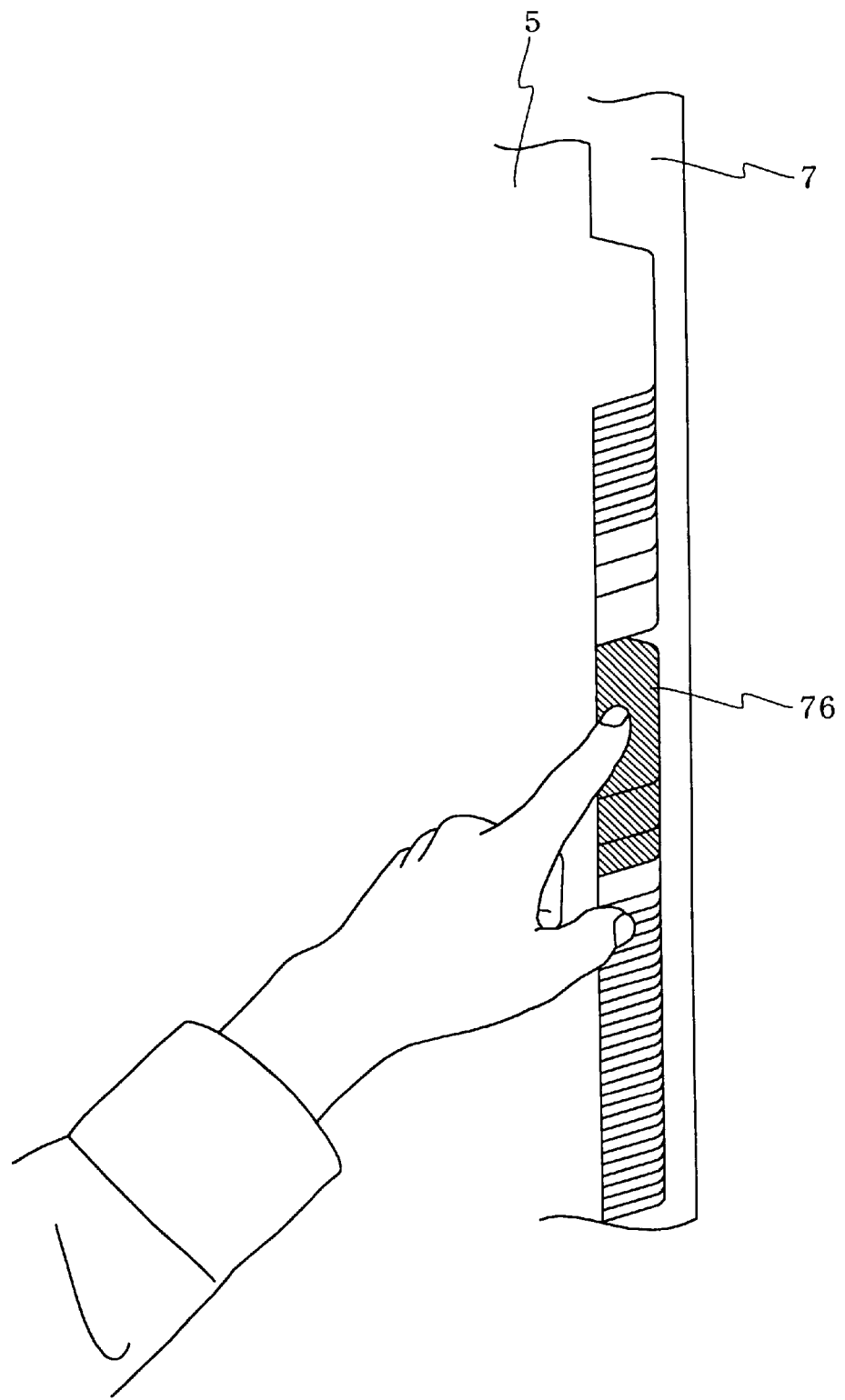
FIG. 31 is an explanatory view illustrating one example of the tag display control as shown in FIG. 30.

The holding operation may be performed not only in the information access area but also on the tag. FIG. 31 is an explanatory view illustrating one example of the holding operation on the tag. As shown in FIG. 31, holding plural pages is effected by applying a predetermined pressure on a tag 76 that has been expanded.

Figure 32:
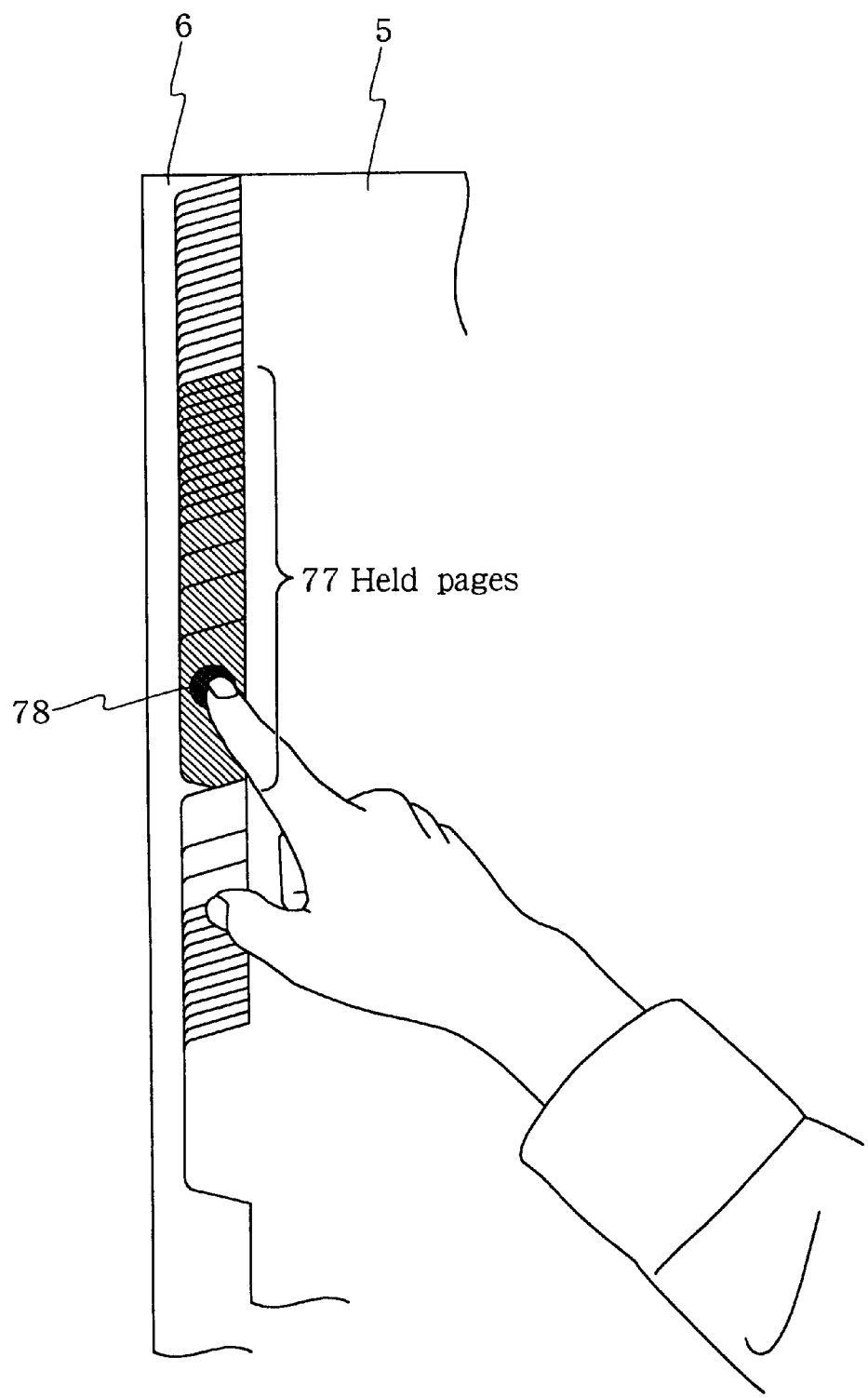
FIG. 32 is an explanatory view illustrating one example of a tag coloring process under the tag display control as shown in FIG. 30.
Figure 33:
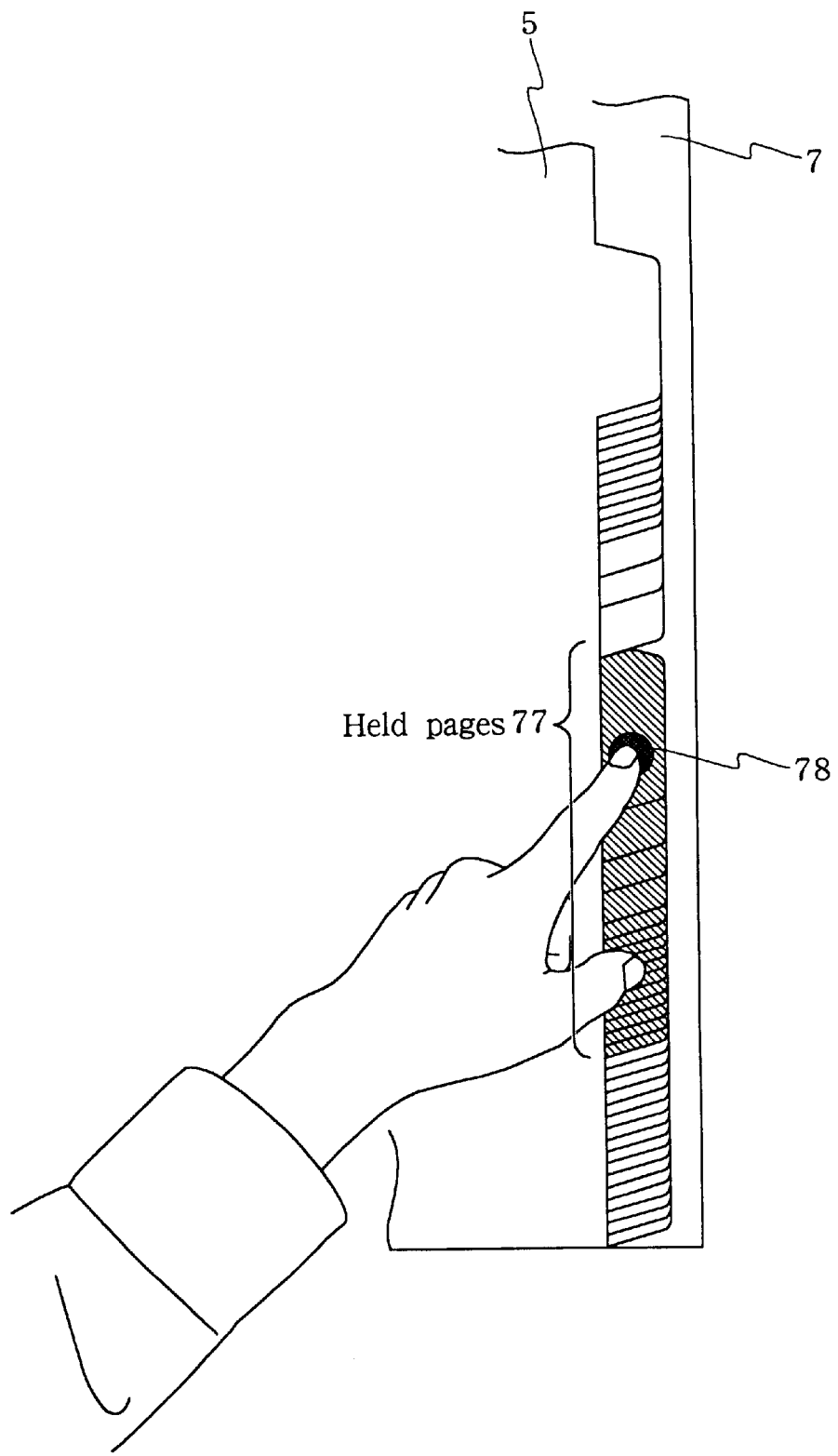
FIG. 33 is an explanatory view illustrating one example of the tag coloring process in an opposite tag display area to that of FIG. 32.

A holding display circle may be displayed on the tag. In the examples as shown in FIGS. 32 and 33, the coloring of tag by the holding operation and the display of the holding display circle on the tag are employed at the same time. Though in the example as shown in FIG. 31, the succeeding pages of the current page, or the pages after the expanded tag are only held, the preceding page can be held if the same operation is performed in the tag display area 6 at the preceding page. That is, the pages 77 held in FIG. 32 are pages before the tag being operated currently. On the other hand, in an example as shown in FIG. 33, the pages 77 held are the pages after the tag being operated currently.

Figure 34:
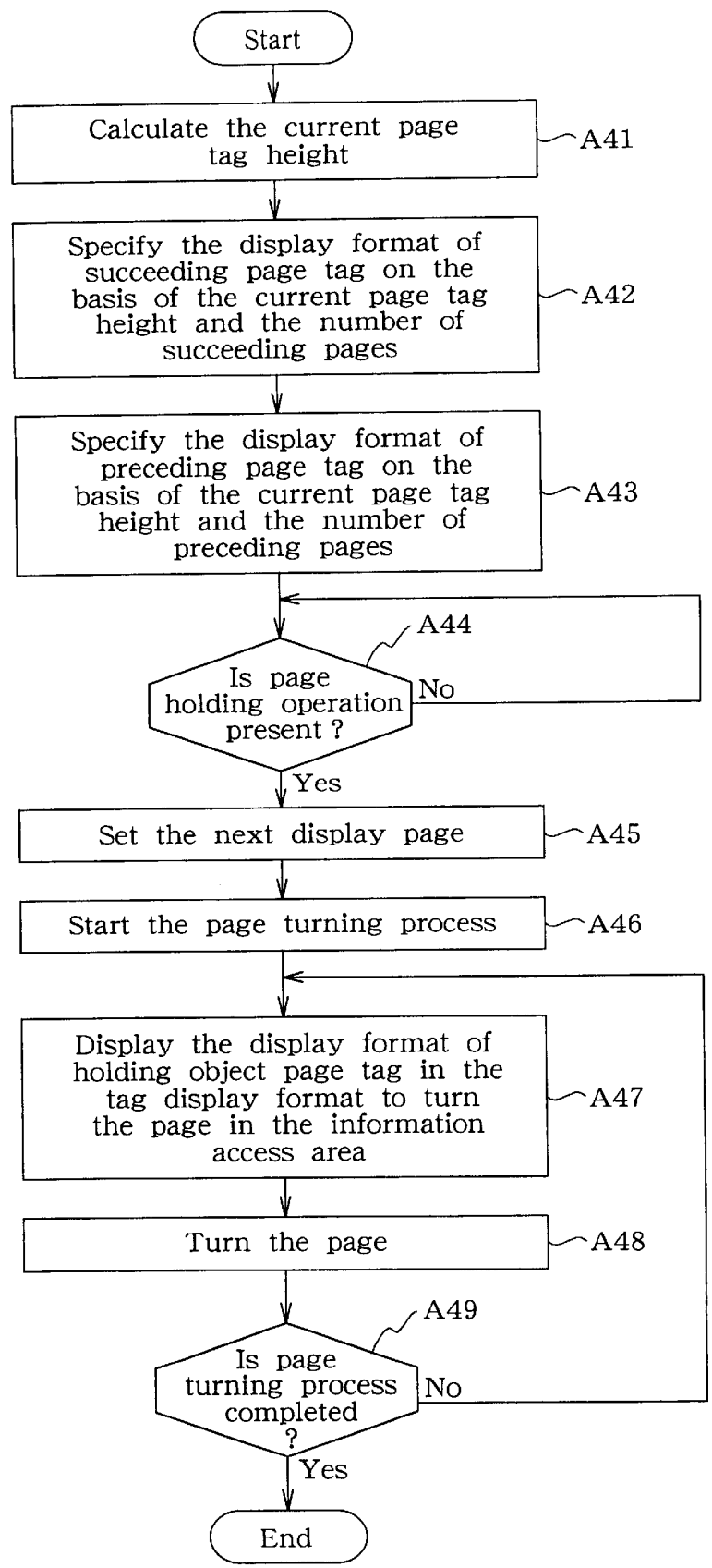
FIG. 34 is a flowchart illustrating one example of the tag display in a process of turning plural pages collectively.

FIG. 34 is a flowchart illustrating one example of the tag display when an operation of turning plural pages collectively is performed. In the example as shown in FIG. 34, the page information display method comprises a current page tag height calculating step A41 of calculating a display height of the current page tag on the basis of the position of the current page with respect to the total number of pages for the electronic information stored in the storage unit 4, a succeeding page tag display format designating step A42 of designating a display format of the succeeding page tags on the basis of the tag height of the current page tag calculated in the current page tag height calculating step and the total number of succeeding pages, and a preceding page tag display format designating step A43 of designating a display format of the preceding page tags on the basis of the tag height of the current page tag and the total number of preceding pages before or after the succeeding page tag display format designating step.

Each of the display format designating steps A42, A43 may designate the display format in accordance with the tag display method as described in the fourth embodiment. That is, giving the highest priority to a position of the current page tag height, the display format is determined depending on the number of residual pages at this position.

And the page information display method further comprises a page holding operation detecting step A44 of outputting a page holding operation detecting signal, when a predetermined page holding operation is performed at the current page, a next display page setting step A45 of setting a page having a page number that is equal to the current page added or subtracted by the amount of holding operation to a next display page to be displayed at the next time, when the page holding operation detecting signal is output in the page holding operation detecting step A44, and page turning process steps A46 to A49 of displaying the next display page set in the next display page setting step in place of the current page on the display unit.

And in this page turning process step, first of all, a page turning process is started (step S46). Subsequently, the display control of the holding object page tag is made (step A47). This display control step of the holding object page tag comprises displaying the tags appended to the current page that is to be turned and the holding object pages that are held by the holding operation in the display format in accordance with the page turning direction specified in the preceding page tag display format designating step A42 or the succeeding page tag display format designating step A43 in the information access area, while following the transformation or movement of the current page in the current page turning step. Subsequently, the page turning step is made (step A48). Further, the display control step A47 of the holding object page tag is repeated until the page turning process is completed (step A49).

As shown in FIG. 35A, if the turning of plural pages is executed in a state where the page tag is expanded, a part for holding plural pages and the previous page indicated by the fingertip involving the current page (i.e., the paper face) are turned collectively. At this time, in a process example as shown in FIG. 34, the tag display of a part indicated by reference numeral 79 in FIG. 35 is effected in accordance with the display format in the tag display area 6 for displaying the tag of the previous page in a state where the drawing is inverted in a tag width direction. That is, when the execution of the page turning process is started, the next display page is treated as the current page, and the tag height is recalculated to redisplay the tag in the tag display area for the succeeding page. And the tags appended to the pages from the current page being moved by the page turning process to the last page of the holding object pages are displayed in accordance with the display format for the previous page, while following the movement of the page turning process.

Also, in the example as shown in FIG. 35, the page information display method further comprises, following the page holding operation detecting step A44, a before-turning holding object page tag coloring step of coloring a tag for a holding object page that is held by the page holding operation with a different color from other tags in one tag display area that is displaying a tag appended to the current page, when the page holding operation is initially detected in the page holding operation detecting step A44. For example, in the case where a pressure circle according to the third embodiment is displayed within the access area 5, the coloring of tags for the held pages are changed, because it is considered that the number of holding pages may not be grasped by simply referring to the pressure circle.

FIG. 36 is an explanatory view for highlighting the tag display in the information access area in the process of turning plural pages collectively as shown in FIG. 34. In an example as shown in FIG. 36, the holding object page tag display control step A47 comprises a substep of setting the tags appended to the current page that becomes the turning process object and the holding object pages held in the holding operation in a display format of equal and close interval between tags. As indicated by reference numeral 79B in FIG. 36, the tags are set in the display format in which the interval between tags is close and equal, the position of the current page after being turned can be clarified promptly while the state of turning plural pages collectively is displayed excellently.

Figure 37:
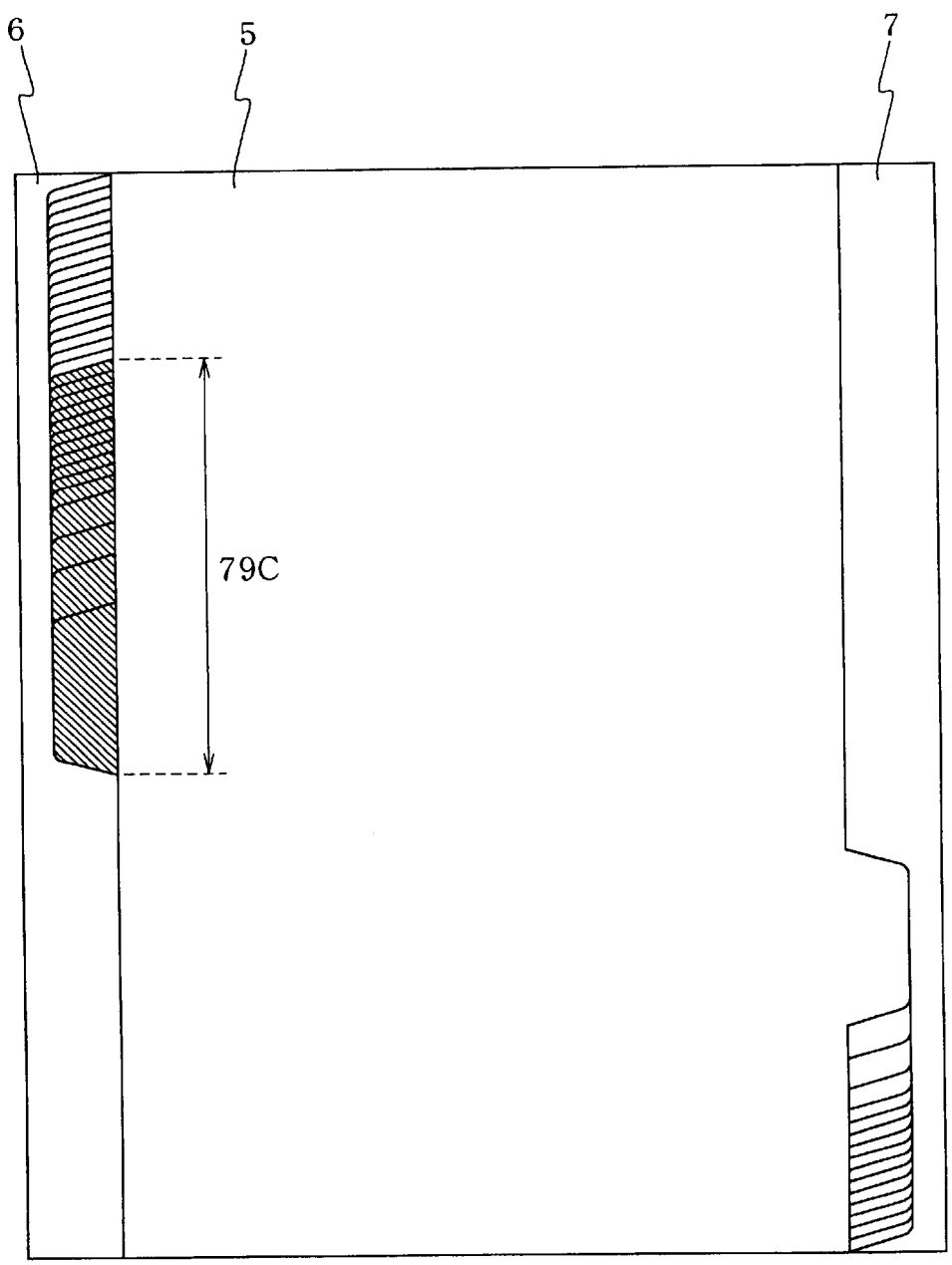
FIG. 37 is an explanatory view illustrating a tag display example after completing the process of turning plural pages collectively.

FIG. 37 is an explanatory view illustrating a tag display example after completion of turning plural page collectively.

In this example as shown in FIG. 37, the page information display method further comprises, following the page turning process step A49, an after-turning holding object page tag coloring step of coloring a page tag for the holding object page, for which the page turning process is completed, in the other tag display area where a tag appended to a current page that has become the new current page after the page turning process is not displayed, with a different color from other tags. Owing to the provision of this after-turning holding object page tag coloring step, the original position of page is apparently seen in the case where plural pages are turned collectively, and particularly as the position is visually memorized, the original page is easily restored after turning pages with the holding operation.

FIG. 38 is an explanatory view illustrating an example in which a pressure circle is displayed over a tag, wherein FIG. 38A is a view illustrating an example of a left page tag, FIG. 38B is a view illustrating an example of a right page tag, and FIG. 38C is a view illustrating an example in which the tag coloring and the tag pressure circle are employed at the same time. In the examples as shown in FIG. 38, the page information display method further comprises, following the page holding operation detecting step A44, a tag holding circle display step of displaying a circle 78 corresponding to the number of holding object pages in the page holding operation over a tag for which the page holding operation is detected, when the page holding operation is initially detected in the page holding operation detecting step A44. By displaying the holding circle over the tag, it is possible to visually display a difference from turning pages with a simple click.

FIG. 39 is an explanatory view illustrating an example in which a holding object page is changed depending on an operation direction upon the tag, wherein FIG. 39A is a view illustrating one example of holding a previous page, and FIG. 39B is a view illustrating one example of holding a succeeding page. In the examples as shown in FIG. 39, it is determined whether to hold the preceding page or the succeeding page, depending on whether the fingertip is moved upward or downward with reference to the time when the plural pages turning operation is made effective by the fingertip pointing to the page tag. The range for moving the fingertip upward or downward is within one tag. Hence, it is possible to distinguish this operation from the continuous page turning by dragging the tag. And the number of holding pages is determined in accordance with the magnitude of pressure to execute the plural pages turning operation.

EXAMPLES

Figure 40:
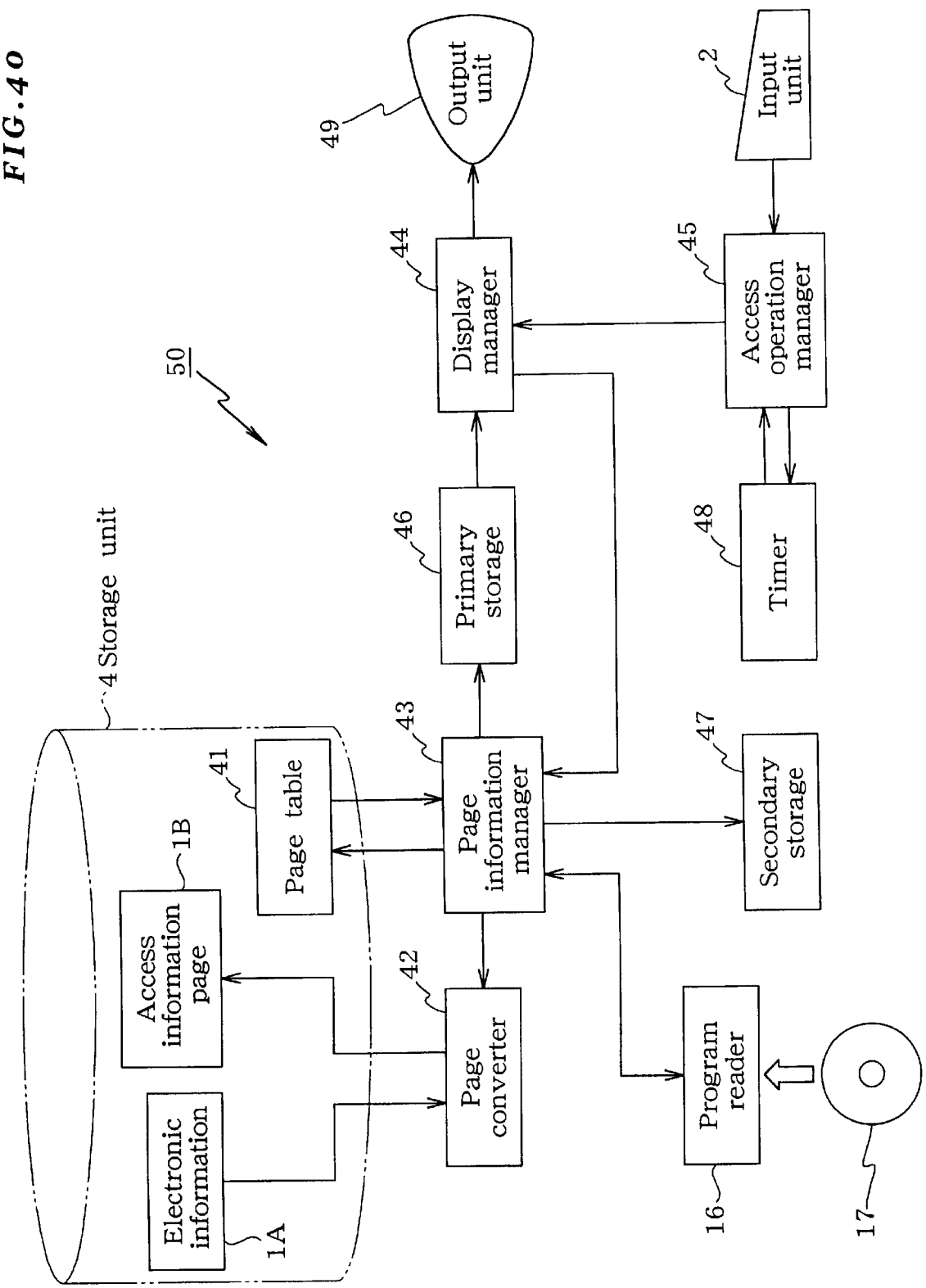
FIG. 40 is a block diagram showing the configuration of this example.

The examples of this invention will be described below with reference to the drawings. FIG. 40 is a block diagram showing the configuration of hardware resources of this example, which is common to the following examples. A page information display device of this example comprises an input unit 2 for inputting a pointer event and a storage unit 4 for storing a variety of sorts of information, as shown in FIG. 40. An output unit 49 is provided along with a display manager 44 which is a display driver for controlling this output unit 49 and a primary storage unit 46 for storing the image data of one screen or two screens on the display unit. Also, the input unit 2 is provided along with an access operation manager 45 for issuing an access operation command to the display manager, on the basis of a pointer event which has occurred in the input unit 2, and a timer 48 for clocking the elapsed time during this access operation.

The storage unit 4 stores the page information and the tag displayed on a display 1, the electronic information 1A which is the page information of plural pages, the page information 1B having the amount of information by which the electronic information 1A can be displayed in the information access area 5 in a unit of page, and a page table 41 containing the configuration of this access information 1B. The storage unit 4 has the electronic information 1A stored in a universal file format such as a text format, a word processor document format, an image format, an HTML format, an XML format, a PDF format, or a scanned image format. Of course, the electronic information 1A described herein is available, even when it is stored in a storage device at the remote location which is connected via the telephone line or a network such as LAN. Such electronic information 1A is converted into a liner image file by a page converter 42 in this example. For example, if the image data is one file for each page, the display process can be facilitated. In this case, the page information is in the image format which is a bit map format, a TIFF format, a PICT format, a JPEG format, or a GIF format. The page table 41 has index information in which the tag content 18 such as page number corresponds to the page information one to one. Since the page information involves image information, the access information is passed through the page converter 42 having a copyright protection feature to embed an electronic openwork. This process can be easily implemented on the configuration of the page information display device. Also, a page information manager 43 manages the data structure or order of the access information 1B which is then converted by the page converter 42 with reference to the page table 41. In the example of displaying the newspaper, more articles of information may be possibly defined within one page of page information.

The page information display device in this example comprises a high speed primary storage 46 for display, a secondary storage 47 which functions as a prefetch cache for display, and the page information manager 43 for managing the predetermined page information to be read from the storage unit 4 in accordance with the page being displayed at present or the access operation and stored in the secondary storage 47 These can improve the responsibility to the access operation.

Figure 65:
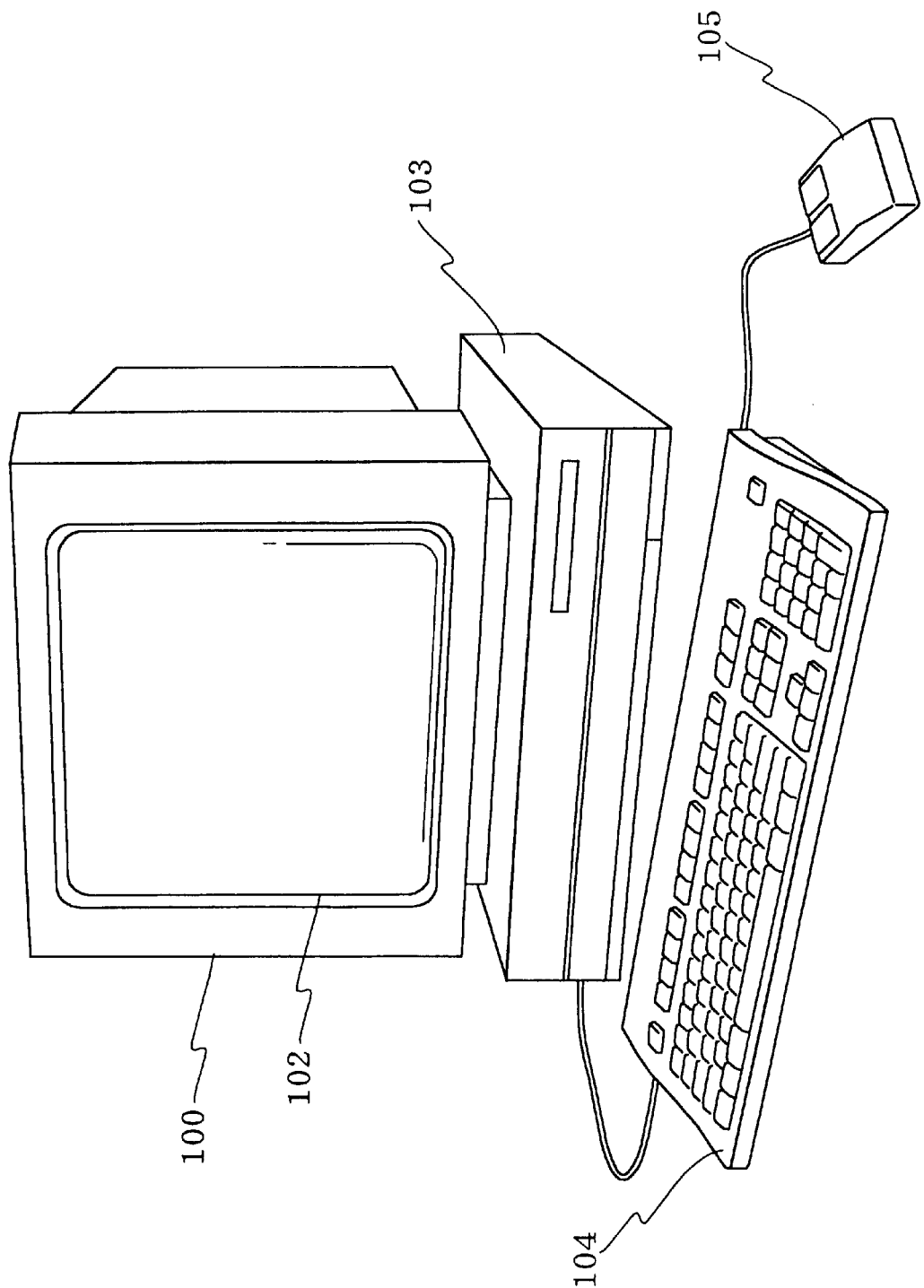
FIG. 65 is a perspective view illustrating a computer that is employed in this example.

In order to transform into electronic data the information which is conventionally printed on the paper to enable access to the information intuitively, the input unit 2 may be a device which enables the input operation to be made, while simulating the sense of turning the page of a book with a fingertip as faithfully as possible, such as a touch panel, in this example. And the display 1 may be a device enabling the display of high-resolution. It is preferable that an input area of the input unit 2 covers the tag display area 6, 7 of the display 1, thereby providing the input area and the tag display area 6, 7 integrally. Of course, with a computer configuration as shown in FIG. 65, the access of electronic information is enabled sufficiently. This does not necessarily mean that the touch panel or the high resolution output device must be used.

Figure 41:
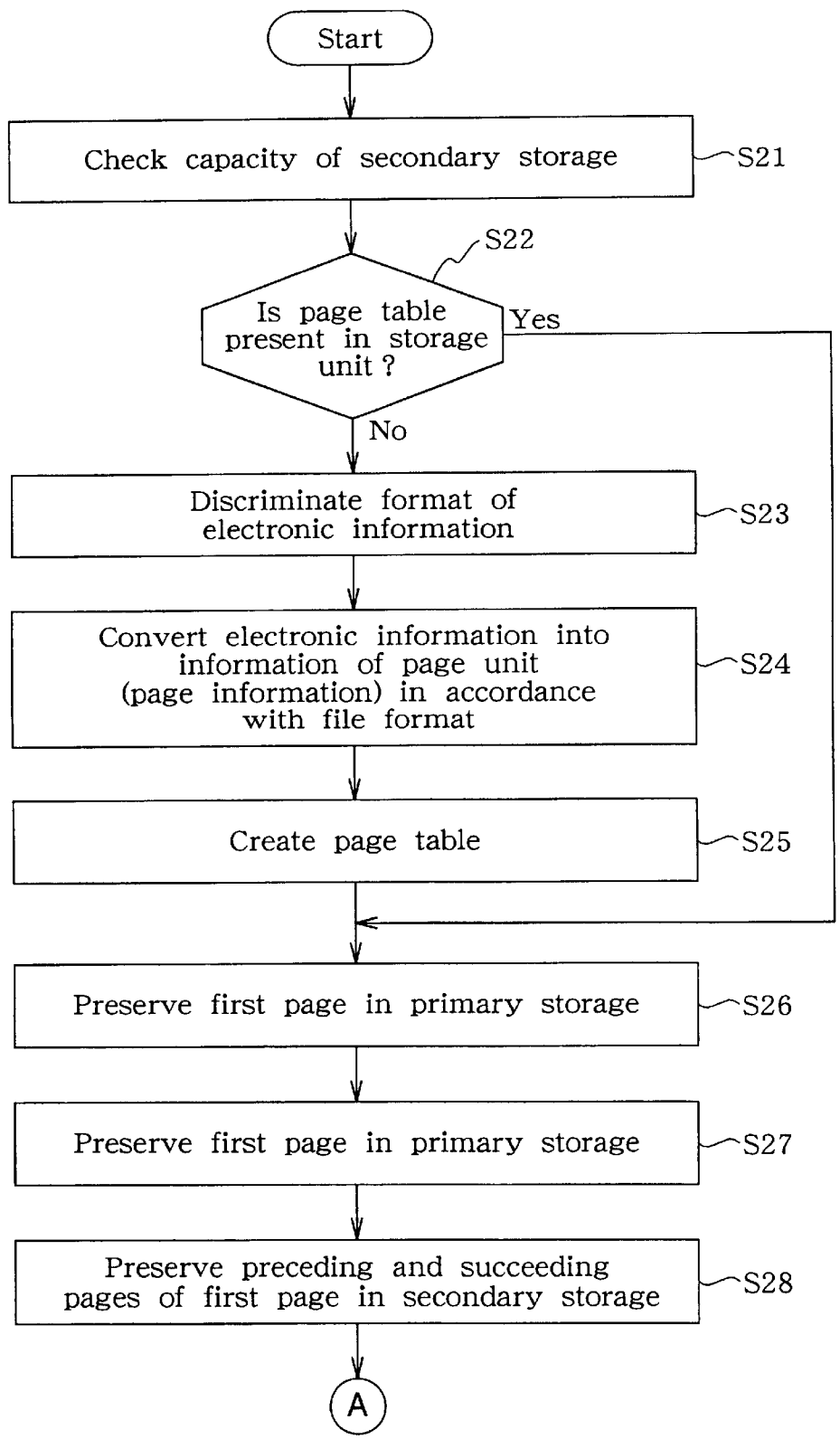
FIG. 41 is a flowchart showing the former part of a page information display process in the configuration as shown in FIG. 40.

FIGS. 40 and 41 are flowcharts showing the outline of the operation in this example. Firstly, to check the cache capacity, the page information manager 43 confirms the capacity of the secondary storage 47 (step S21). Subsequently, the page information manager 43 confirms the presence or absence of the electronic information 1A and the page table 41 (step S22). The page information manager 43 manages the page converter to convert the electronic information 1A into the page information 1B, when the electronic information 1A exists in the storage unit 4 and the page table 41 does not exist in the storage 4. In this case, the page converter 42 firstly checks the file format of the electronic information 1A (step S23). The amount of information which can be displayed in the information access area 5 is automatically converted into the page information in a unit of page (step S24). This conversion process will be described later in detail as the related art. Then, the page information manager 43 determines the tag content 18 such as page number for the page information in the order of creating the page information, and registers the electronic information 1A as the page information in the page table 41 (step S25).

At step S24, the electronic information 1A in different file formats is made accessible as one book having a linear information structure. The page table 41 can be rewritten and changed without departing from the linear information structure accessible in this example.

In this example, the access information to be displayed on the display 1 is stored in the primary storage 46 which has the highest speed in reading or writing the information. Also, the secondary storage 47 having a higher speed in reading and writing the information than the storage unit 4 has stored the access information for the user to access at the next time. Therefore, if the page to be displayed by the access operation is determined, the page table 41 is referred to (step S26). A page to be displayed is stored in the primary storage 46 (step S27) The previous and next pages are stored in the secondary storage 47 (step S28) This is to enable the high-speed display by transferring the page information from the secondary storage 47 to the primary storage 46, when the page information requested by the display manager 44 is in the secondary storage 47. If the page information requested by the display manager 44 is not present in the secondary storage 47, the page information is taken from the access information in the storage unit 4 and stored in the primary storage 46.

Figure 42:
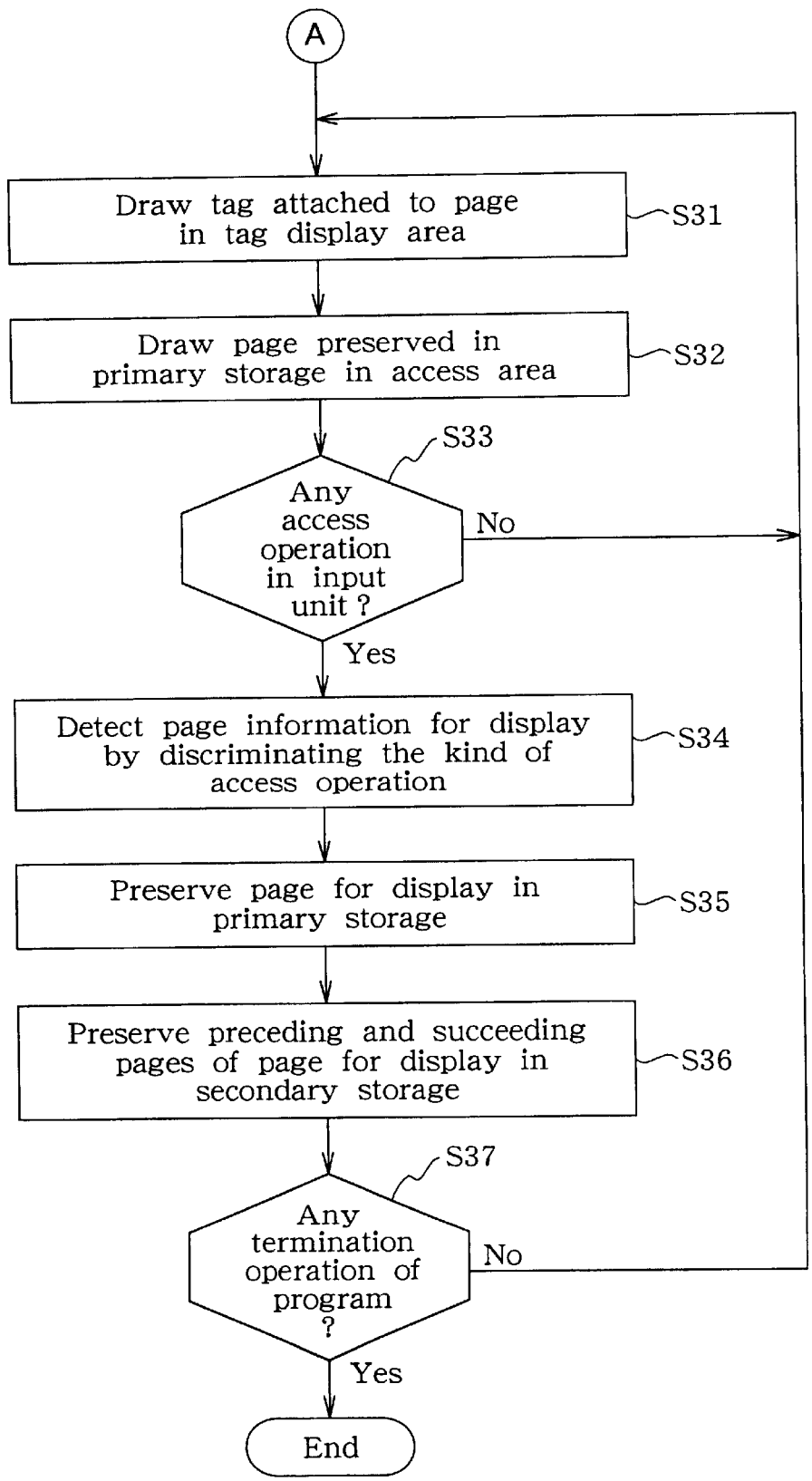
FIG. 42 is a flowchart showing the latter part of the page information display process continued from the process of FIG. 41.

As shown in FIG. 42, the tag 8, 9, 10 appendant to the page is drawn in the tag display area (step S31). And the page information stored in the primary storage 46 is displayed in the information access area 5. Subsequently, the procedure waits for an input into the input unit 3 such as a touch panel (step S33).

If an access operation such as turning the page is applied to the input unit 3, the access operation manager 45 judges the content of operation to pass the sort of access to the display manager 44 (step S34). The sorts of access may include, for example, turning the page one after another, switching promptly from the accessed page to another page, turning the pages in a certain range roughly, and displaying only the desired article contained in the electronic information over the entire access area in full.

If the sort of access is passed to the display manager 44, the page information to be displayed in the information access area 5 is determined from the sort of access. For example, when there is a request to the page information manager 43 of storing the access information to be displayed in the primary storage 46, another page information for the user to access newly at the next time is retrieved from the storage unit 4 and stored in the secondary storage 47, if the access information stored in the primary storage 46 can be passed from the secondary storage 47 (step S35).

The secondary storage 47 should store more succeeding pages of the currently displayed page, thereby resulting in higher hit rate because the access is typically made in an ascending direction of page number. When there is a pointer event such as expanding the tag, as will be described later, the page subjected to tag expansion may be read beforehand, and stored in the secondary storage 47.

First Example

In the above example, the page information having a size of one page is a minimum unit of data. On the contrary, in the case where an entire paper face of the newspaper is displayed, or where a magazine article is displayed, each article may be displayed in enlargement. This may be done by enlarging the information of a book or the like, or the illustration in the book. Such enlargement may be performed in such a way as to create beforehand the page information itself at high resolution and enlarge the page information that is the image data, or create and enlarge for displaying the page information in the vector data of a text or diagram. In the case where the enlarged display of the article is made, the length of the current page tag should be set to several times the normal length. Thus, it is possible to recognize intuitively any article in the electronic information being enlarged, for example, with reference to the shape of tag.

In the case where the article information is provided, the page information may have the article information expressly defined with the scope of coordinates for the article information in the page information. In the case where the user points to the page information with the fingertip, using the operation unit (input unit) 2, if the coordinate values indicated by the fingertip are contained within the scope of coordinates, the article information corresponding to the scope of coordinates is displayed on the display 1. Also, the scope of coordinates for this article information becomes data which does not depend on the device, if it is defined in terms of the ratio of the article information relative to the length of the page information.

Figure 43:
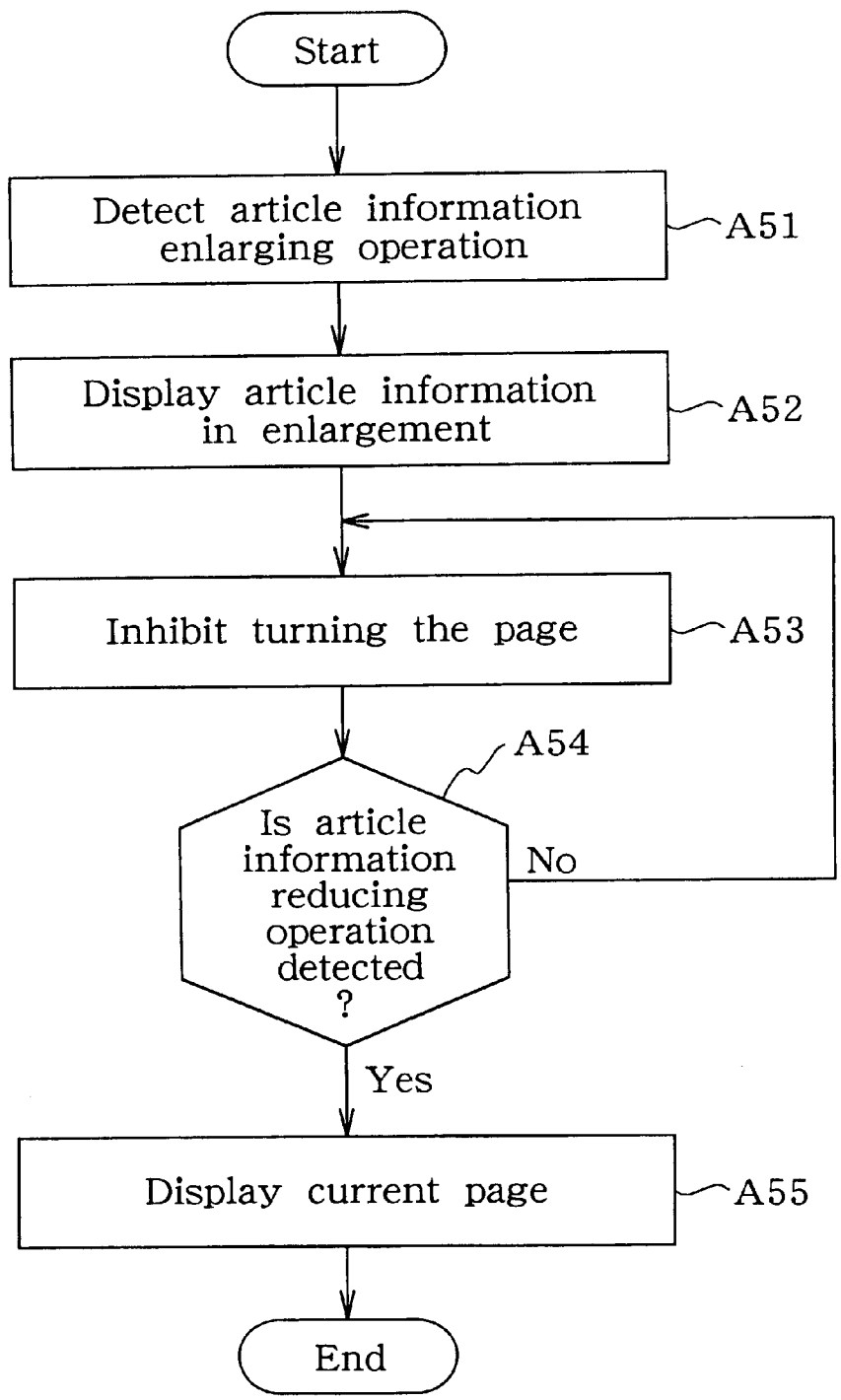
FIG. 43 is a flowchart illustrating a process for displaying in enlargement the article information in a first example of this invention.

FIG. 43 is a flowchart illustrating a process example for displaying in enlargement the article information in the first example. As shown in FIG. 43, the page information display method of this example comprises an article information enlarging operation detecting step A51 of outputting an article information enlarging operation detecting signal having the positional information as to an article information enlarging operation, when the article information enlarging operation is detected on the operation unit, in the case where plural articles of information making up a current page are defined in the current page read from the storage unit 4 that is to be displayed at present, and an article information enlarging display step A52 of displaying in enlargement the article information at a position indicated by the positional information on the display unit, in the case where the article information enlarging operation detecting signal is output in the article information enlarging operation detecting step A51. By allowing for the enlargement of the article information, the article information can be accessed or read more clearly, for example, in the case where the newspaper information is involved in the electronic information. The article information enlarging operation detecting step A51 further comprises a substep of outputting an article information enlarging operation detecting signal including a click position as the positional information, for example, when a click is made on the operation unit 1C. That is, by clicking on the article information to be read, that article information can be enlarged.

In the example as shown in FIG. 43, the page information display method further comprises, following the article information enlarging display step A52, an article display page turning inhibit control step A53 of inhibiting a normal page turning operation while the article information is being displayed in enlargement. If the page turning operation is enabled while the article information is displayed in enlargement, a linear structure of the page information in which the page number is incremented one by one is broken, and it is apprehended that the user is confused. That is, if the access is permitted by turning pages while the article information is being displayed, the page information gets rid of the linear information structure, because the information structure is branched at that time. As a result, it is difficult for the user to reconstruct the information structure easily. Therefore, in a preferred embodiment, the page turning process during the display of article is inhibited. Accordingly, all the operations that are performed during the display of article are interpreted as the operation of restoring the page information having that article information to the original state.

Figure 44:
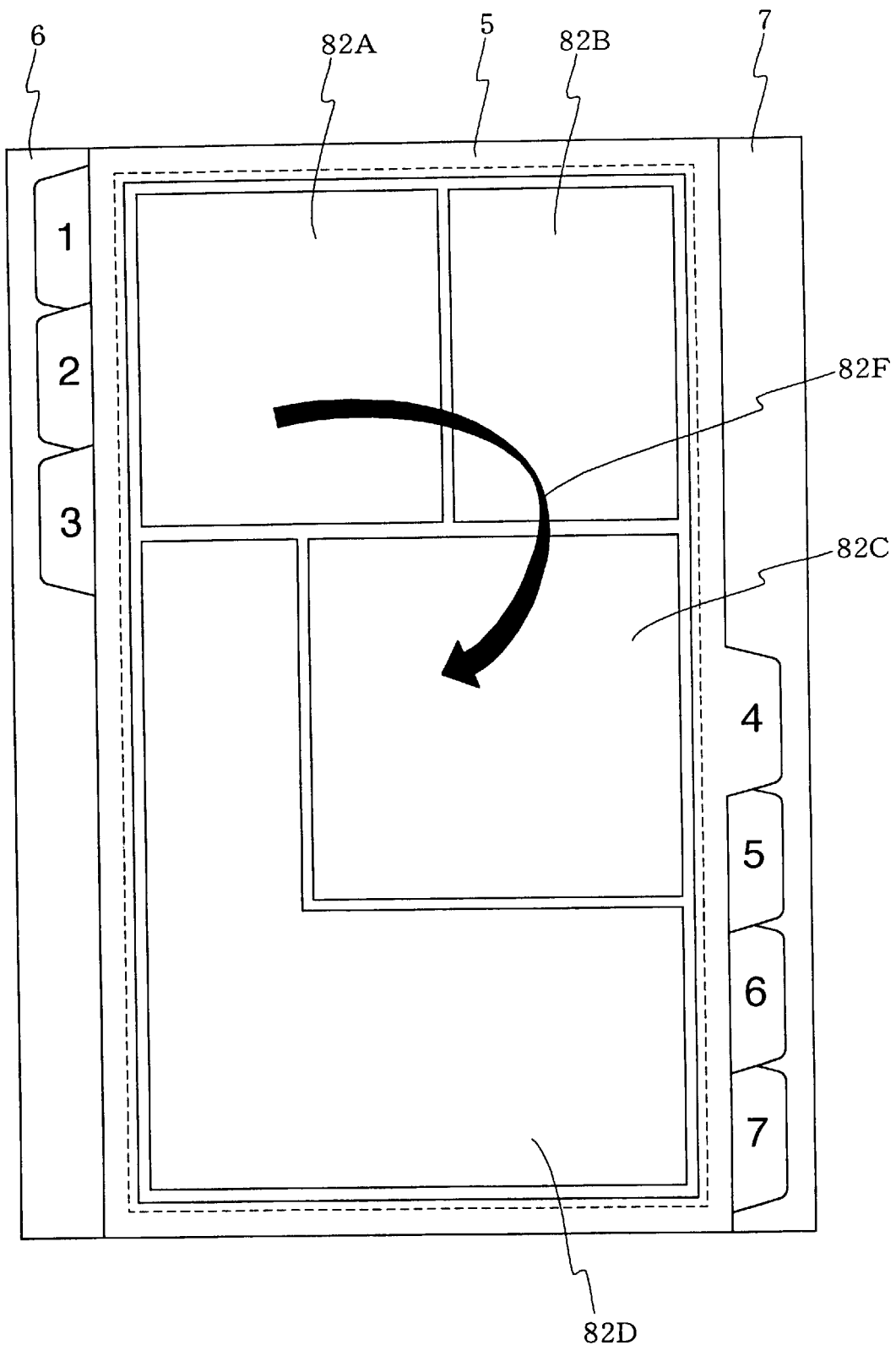
FIG. 44 is an explanatory view illustrating a continuous enlargement operation by dragging plural articles.

FIG. 44 is an explanatory view illustrating an example of effecting the continuous enlargement operation by dragging plural articles. In this example of continuously enlarging plural articles, the article information enlarging operation detecting step A51 further comprises an article information continuous enlarging operation detecting substep of outputting an article information continuous enlarging operation detecting signal in the case where two or more articles of information is contained in a locus of dragging, when a dragging is made on the operation unit. And the article information enlarging display step A52 may comprise a continuous enlarging display substep of displaying in enlargement the article information individually in time series at every predetermined time interval in the order of the dragging, in the case where the article information continuous enlarging operation detecting signal is output. The continuous enlarging display step may comprise a substep of displaying in enlargement the two or more articles of information in time series continuously at a time interval in accordance with a rate of the dragging, for example.

As shown in FIG. 44, the page information (fourth page) having articles of information 82A, 82B, 82C, 82D is displayed as the current page. At this time, when a dragging is made along an arrow indicated by reference numeral 82F, this operation is judged as the article information continuous enlarging operation. In this case, the continuous enlarging display step involves first displaying the article information as indicated by reference numeral 82A, and after the elapse of a certain access time, or upon an article information reduction instruction (e.g., a click on the enlarged article information of the touch panel), displaying the next article information 82B and then the article information 82C. By enabling this article information continuous enlarging operation, the article information can be steadily perused consecutively after the operation. Therefore, the operability can be enhanced without making the interface complex.

Figure 45A:
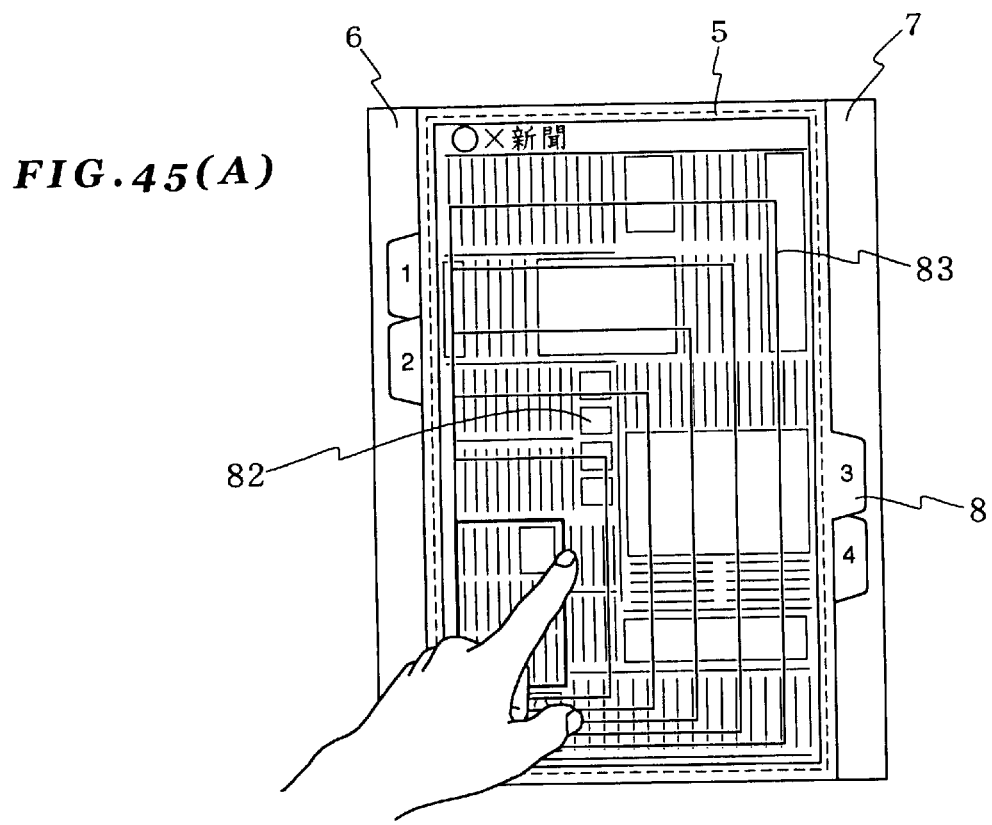
Figure 45B:
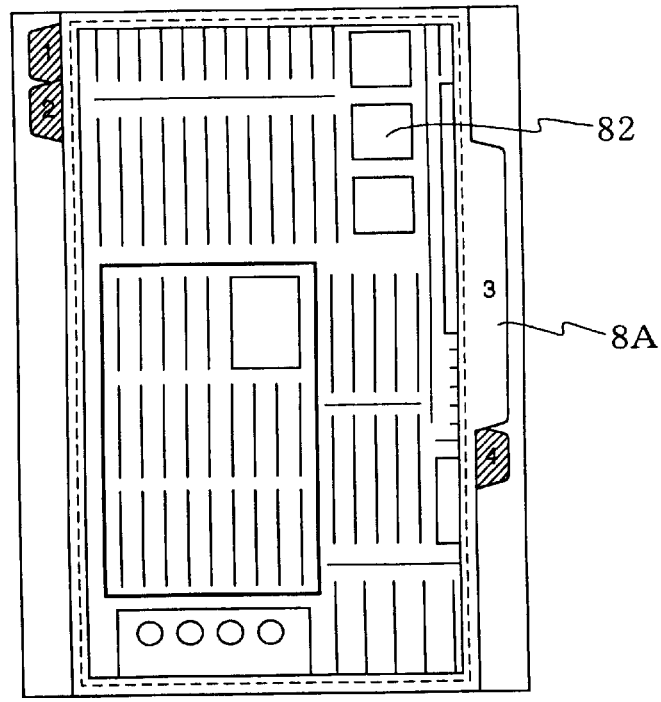

FIG. 45 is an explanatory view illustrating one example of displaying in enlargement the article with a wire frame. In the example as shown in FIG. 45, the article information enlarging display step A52 comprises an enlarging time wire frame display substep of enabling a wire frame, with a start region at an outside periphery of the article information to be enlarged, to be displayed at multiple stages of varying sizes up to an outside periphery of the display unit. In the example as shown in FIG. 45, when the wire frame display is made, a wire frame as large as surrounding the article information is displayed. Subsequently, a plurality of wire frames are created at the same aspect ratio for the outside periphery of this wire frame and the outside periphery of the information access area 5. And the wire frames are displayed in succession from the wire frame surrounding the article information to the outside periphery of the information access area 5. By displaying the wire frames, the enlargement of the article information is made apparent, and the user can recognize visually in which region the article information is located before enlargement.

The page information display method may further comprises, following the article information enlarging display step A52, a reducing time wire frame display step of enabling a wire frame, with a start region at an outside periphery of the display unit, to be displayed at multiple stages of varying sizes up to an outside peripheral position of the article information at the current page, when an enlargement completing operation for completing the enlargement of the article information is performed. Then, where the article information enlarged currently was located in the page information can be displayed excellently.

To enlarging the article information more clearly, the article information maybe once embossed, and then enlarged. Also, the article information itself may be drawn while being enlarged physically, instead of the wire frame display. FIG. 46 is an explanatory view illustrating one example of enlarging the article information after embossing it. In the example as shown in FIG. 46, the article information enlarging display step comprises a substep of embossing an article chosen from the current page.

Figure 46C:
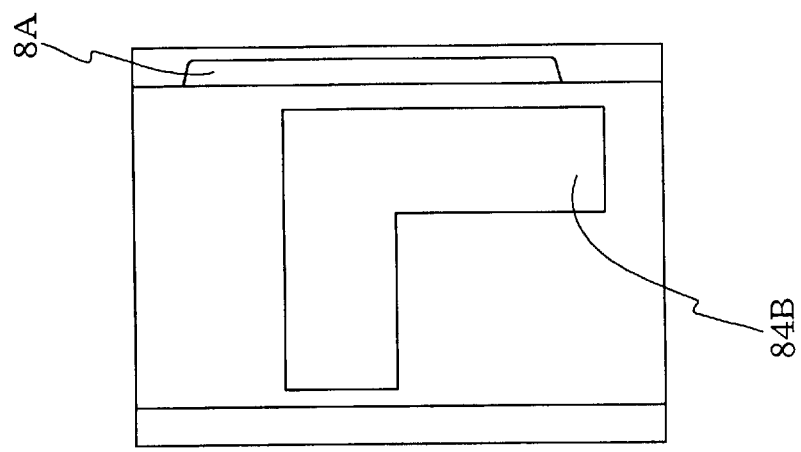
Figure 46B:
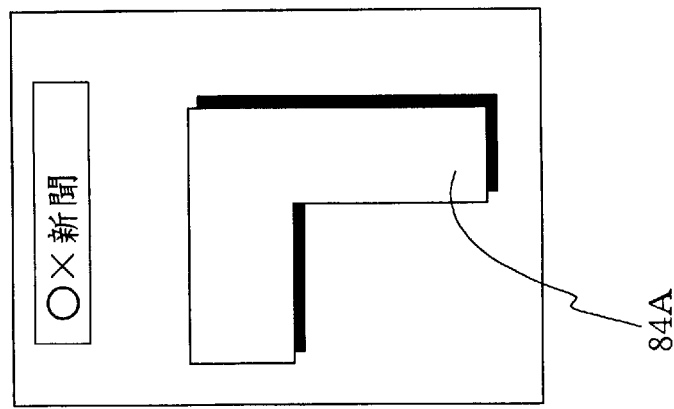
Figure 46A:
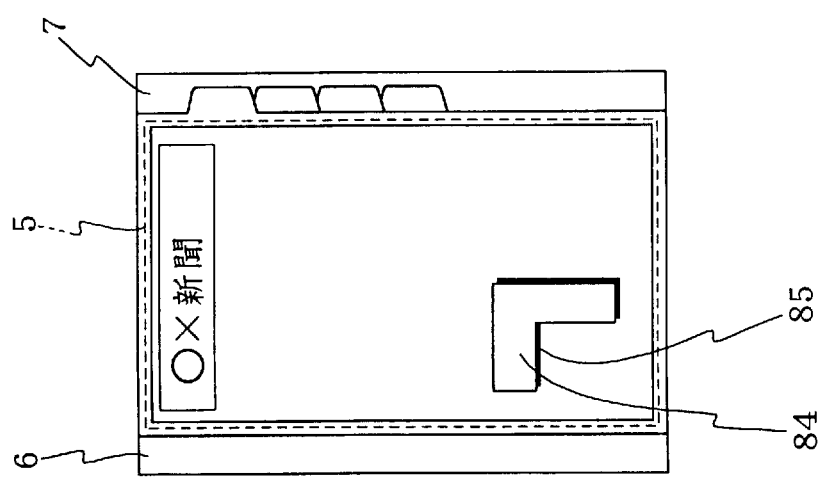

FIG. 46A is a view illustrating a state in which an article is shaded for embossing, FIG. 46B is a view illustrating a state in which a selected article is being enlarged, and FIG. 46C is a view illustrating a state after the enlargement process is completed. Herein, an embossing process is implemented by applying the article information 84 with a shade 85. Also, the reduced article data to be embossed may be superposed on the page information. By cutting and displaying an image of the article data from the paper face data, an embossed portion may be replaced with the article data, when the enlargement of the article is ended.

Figure 47:
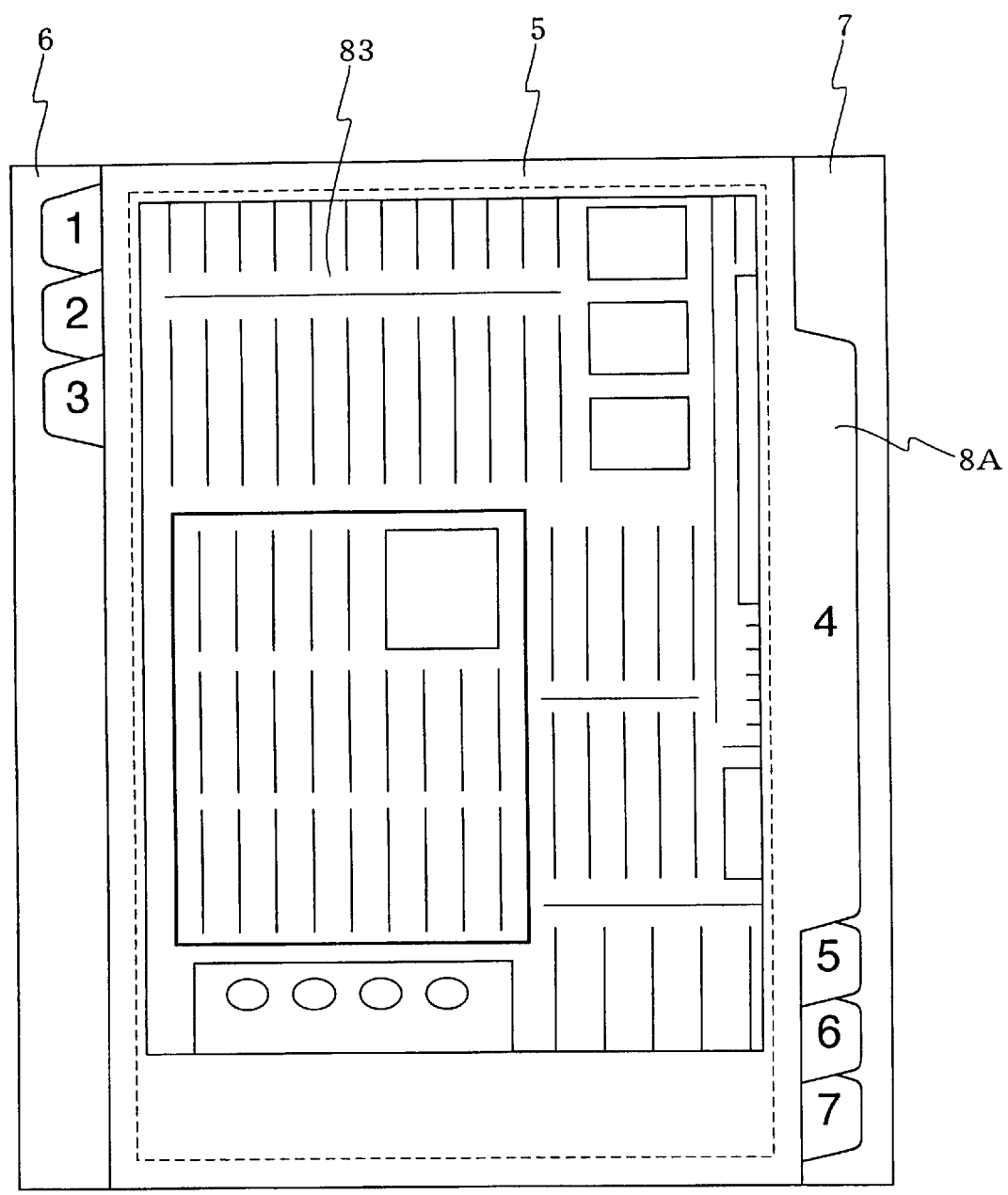
FIG. 47 is an explanatory view illustrating one example of a tag display when the article information is enlarged.

FIG. 47 is an explanatory view illustrating one example of a tag display when the article information is enlarged. In the example as shown in FIG. 47, the article information enlarging display step A52 comprises an enlarged tag appending step of enlarging a tag as well as appending the enlarged tag to the enlarged article information, in the case where the current page has the tag. In the example as shown in FIG. 47, to make clear whether the page information is displayed over the paper face, or the article information is displayed in detail, the appearance of the tag is changed. Thereby, the transfer of the access state by the access operation can be presented to the user. For example, when the article information is displayed in enlargement, a tag 8A appendant to the page information containing that article information is enlarged. In this way, the tag is displayed in enlargement along with the article information to clarify that the article information is being access in enlargement.

FIG. 48 is a diagram illustrating one example of an article information table which lists in correspondence the page information and the article information. A way of storing the article information may include enlarging part of the page information by having the page information of high resolution and referring to the range of coordinates for the article information. In this case, the presence or absence of the article information and the designation are defined in each page information, and the range of coordinates is determined for each article information, as shown in FIG. 48. This article information table is stored in the storage unit 4 to enlarge the article information.

Second Example

In a second example, a process of turning pages for the page information upon a pointer event will be described below. This second example involves an even driven type page turning process. And various kinds of the page turning process are realized employing an operation on the tag and an operation on the page information (information access area).

Page-Turning Operation with Tag

The tag display as shown in FIG. 16 or 20 is through an interface which is not only superior in the respect of allowing the user to intuitively know the total page number of electronic information or the position of current page relative to the total page number of electronic information, but also favorable as a tool to allow the user to display a desired page from among a plurality of pages defined linearly. In this example, there is provided an interface in which an operation of turning the page for a book is a metaphor, and using a tag which is considered to be an artificial presence, the operation can be intuitively understood, irrespective of the computer experiences.

In this example, a pointer driven interface is adopted. The pointer may be a fingertip or a pen-type pointer, for the use of a touch panel display 49, or a mouse 105 or an arrow operated by the arrow key of a keyboard 104 and displayed on the screed, for the use of a CRT connected to a computer 100. To prompt the user for intuitive understanding, the touch panel is desirable.

There are roughly four ways of turning the page for a book, including turning one page after another to read, turning the pages quickly while searching for a key word, opening a predetermined page by referring to the page number, and turning plural pages at once forcefully. When turning the pages quickly, the pages may be turned by the use of elasticity of paper, with the end portion of pages pressed, without displaying the entire page. To make these operations metaphoric, various pointer events to the tag are used.

One access means of switching promptly from one page being accessed to another page to access is a click of tag. The sheets may be brushed at the side edge in turning the page for the book. The similar operation is conducted by the click of tag. The user directly touches the tag 8, 9, 10 of the page which the user wants to access, so that the page information corresponding to the tag content 18 such as page number of the designated tag 8, 9, 10 is displayed in the information access area 5, as desired, while the behavior of turning the page is displayed visually. In a case where there occurs a pointer down within the tag, and a pointer up within the same tag, the page with the tag appended may be turned.

One access means of turning the pages sporadically in a certain range of pages roughly involves touching the tag with a fingertip and keeping the fingertip away from the tag consecutively, while tracing with the fingertip plural tags appendant to the page information desired to read by turning the pages, so that each page information is displayed in the order of touching the tag in the information access area 5, with a constant display interval and consecutively. Then, the timer 48 measures the time until plural tags have been touched. At a display rate proportional to the measuring time, the page information can be displayed in succession. In practice, when turning the pages sporadically, the sheets to be turned are turned over, with the side edge of the sheets pressed. In the same way, the tags are consecutively pointed down, to effect the turning of the pages in succession.

Figure 49:
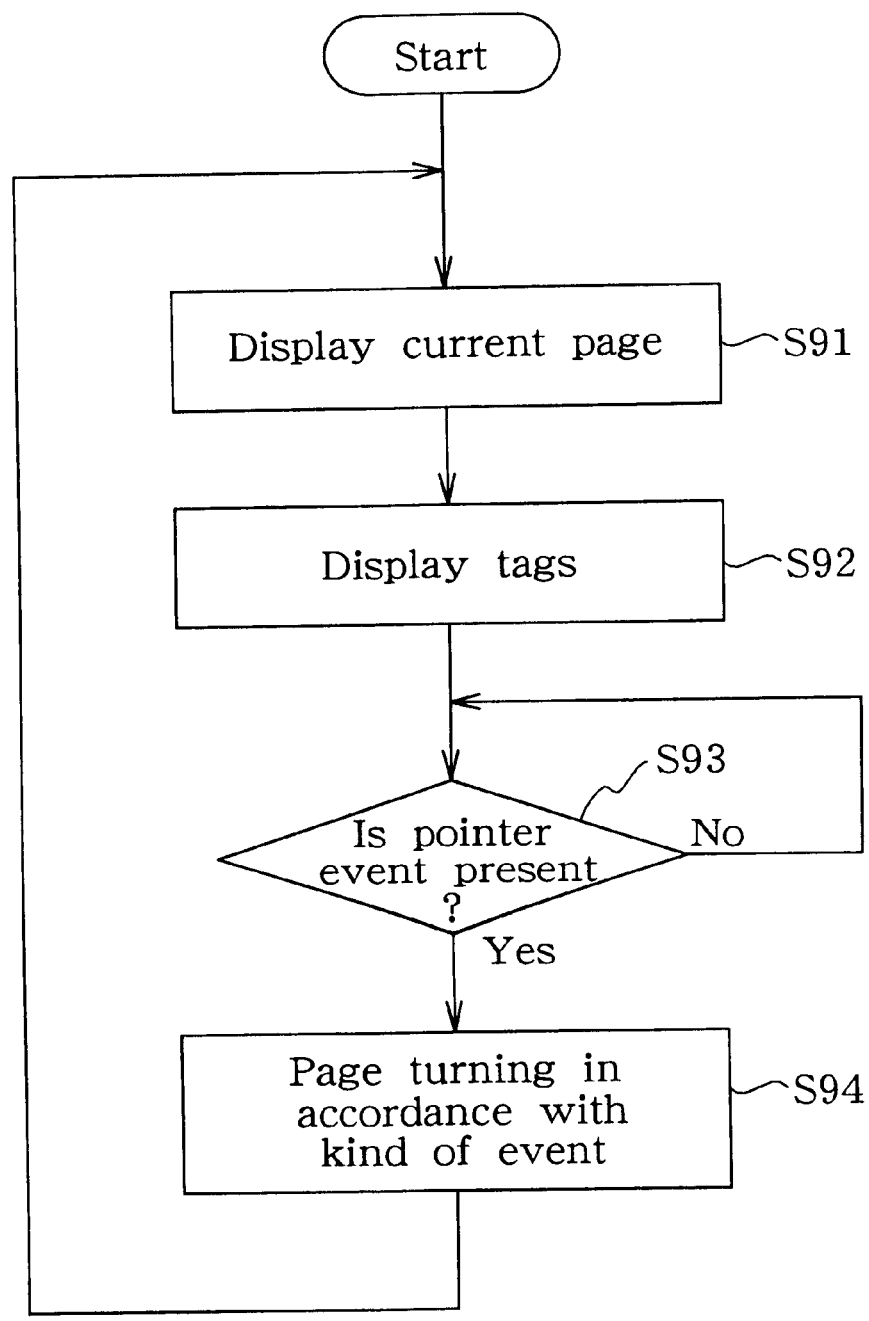
FIG. 49 is a flowchart illustrating a process in a second example of the invention.

Referring to FIGS. 49 and 50, a pointer event driven interface will be described below in detail. FIG. 49 is a flowchart showing a process in the second example of the present invention. First, a current page is displayed (step S91). Each tag is also displayed in the normal display mode or the semantic display mode (step S92 of displaying the tag). Then, the procedure waits for a pointer event (step S93). If there occurs a pointer event, a page turning operation is performed in accordance with the sort of event (step S94 of controlling the even driven display).

FIG. 50 shows the relation between the pointer event and the page turning process. First, when a certain tag is dragged, a dragged page is moved gradually as shown in FIG. 26, and the next page of that tag is displayed (page turning step). Then, the page may be moved along with the tag appended. Also, when a certain tag is clicked, a page indicated by the clicked tag is displayed. If there is a difference between the pointer down position and the pointer up position within the same tag, that difference being above a predetermined threshold in the page turning direction, the next page of that tag may be displayed.

In a case where a tag is dragged over plural tags, that is, there occurs a pointer down at a certain tag and then a pointer is moved in the tag display direction without pointer up, then the pointer is up at another tag, the pages indicated by the dragged tag are displayed successively in the order of being dragged. If the pointer down time or pressure is beyond a predetermined threshold in the tag or the information access area near the tag, a plurality of pages may be moved at a time, supposing that the number of sheets in accordance with the time or pressure are seized. Then, the tag being seized may be moved dynamically to the neighborhood of the pointer in accordance with the variation in time or pressure.

In the page information display device for performing such page turning operation, the access operation manager 45 may be provided with an event driven display controller. Each operation as shown in FIG. 50 can be also implemented by the CPU which executes the program. In this case, a method for each pointer event may rely on the use of a program which defines each operation.

Event in the Information Access Area

Referring to FIG. 50 again, in the case where the time or pressure of pointer down is equal to or greater than a certain value, the process of holding plural pages is common on the tag and the page information. The process of turning the page by dragging in the direction of turning the page is a pointer event for the page information. Also, the operation for the page information may involve clicking on the article information or dragging plural articles.

A drag to turn the page and a drag to effect the continuous enlargement of the article can be discriminated in accordance with the locus of dragging. FIG. 51 is an explanatory view illustrating one example of a process for selecting one of the page turning and the continuous display of article information in a locus of dragging. In the example as shown in FIG. 51, an event driven display control portion comprises a page selection function for each locus direction for selecting a page having a smaller page number or a larger page number than that of a page being displayed at present on the basis of the locus of pointer from the pointer down to up. Also, the event driven display control portion may have an article continuous display function of continuously displaying in enlargement the article information overlapped on a path of the locus on the basis of the path of the locus.

Figure 51A:
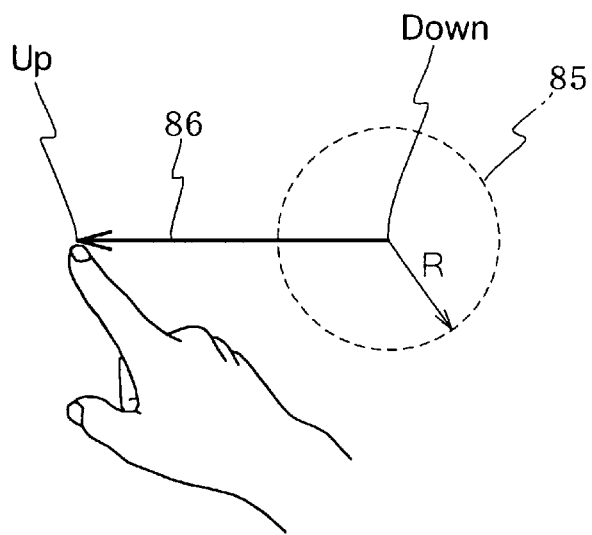
Figure 51B:
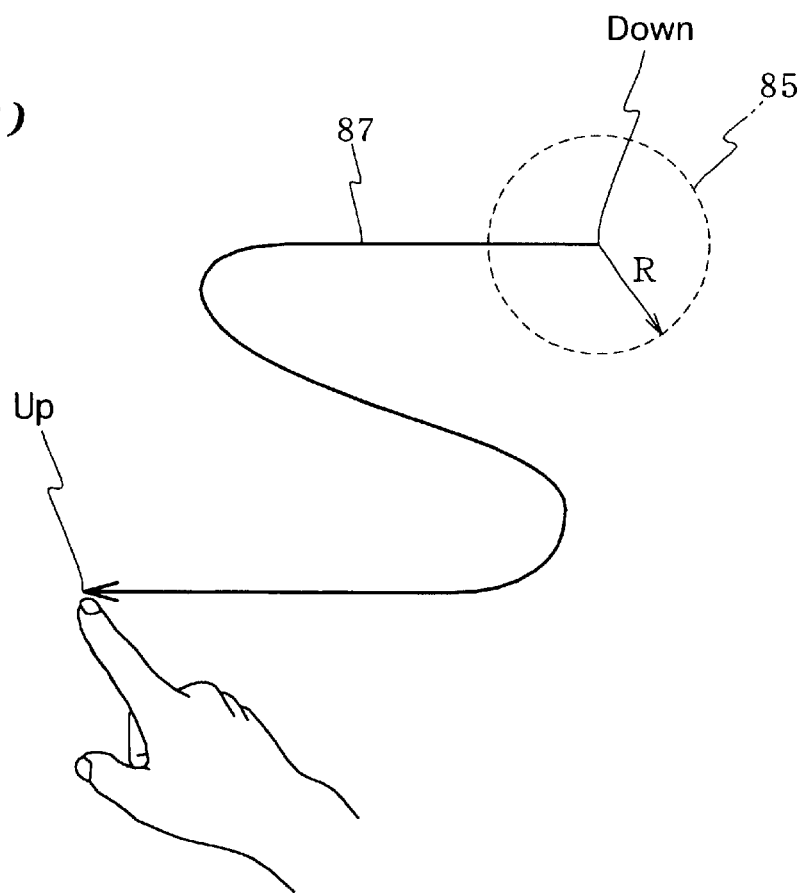

FIG. 51A is a view illustrating the locus on the straight line, and FIG. 51B is a view illustrating the locus having a curve. As shown in FIG. 51A, for a locus 86 of the straight line extending beyond a predetermined area R, the page turning process is determined. On the other hand, for a locus 87 that is curved, the selection of the article information is determined, as shown in FIG. 51B.

In this way, the tag is designated, or an operation is performed on the page information in this example, whereby it is possible to access the electronic information at any page by changing the display rapidly from the page being accessed to the electronic information at that page. Hence, the user can switch the page information in an easy manner.

Third Example

In a third example, a process of prefetching the page information will be disclosed below. Typically, the page information may be read sequentially one page after another with high possibility. Therefore, it is conceived that plural pages following the current page are prefetched and stored in a VRAM (primary storage) 46 or a cache memory (secondary storage) 27. However, since plural pages are turned in the embodiment, the measures taken will be described below.

Figure 52:
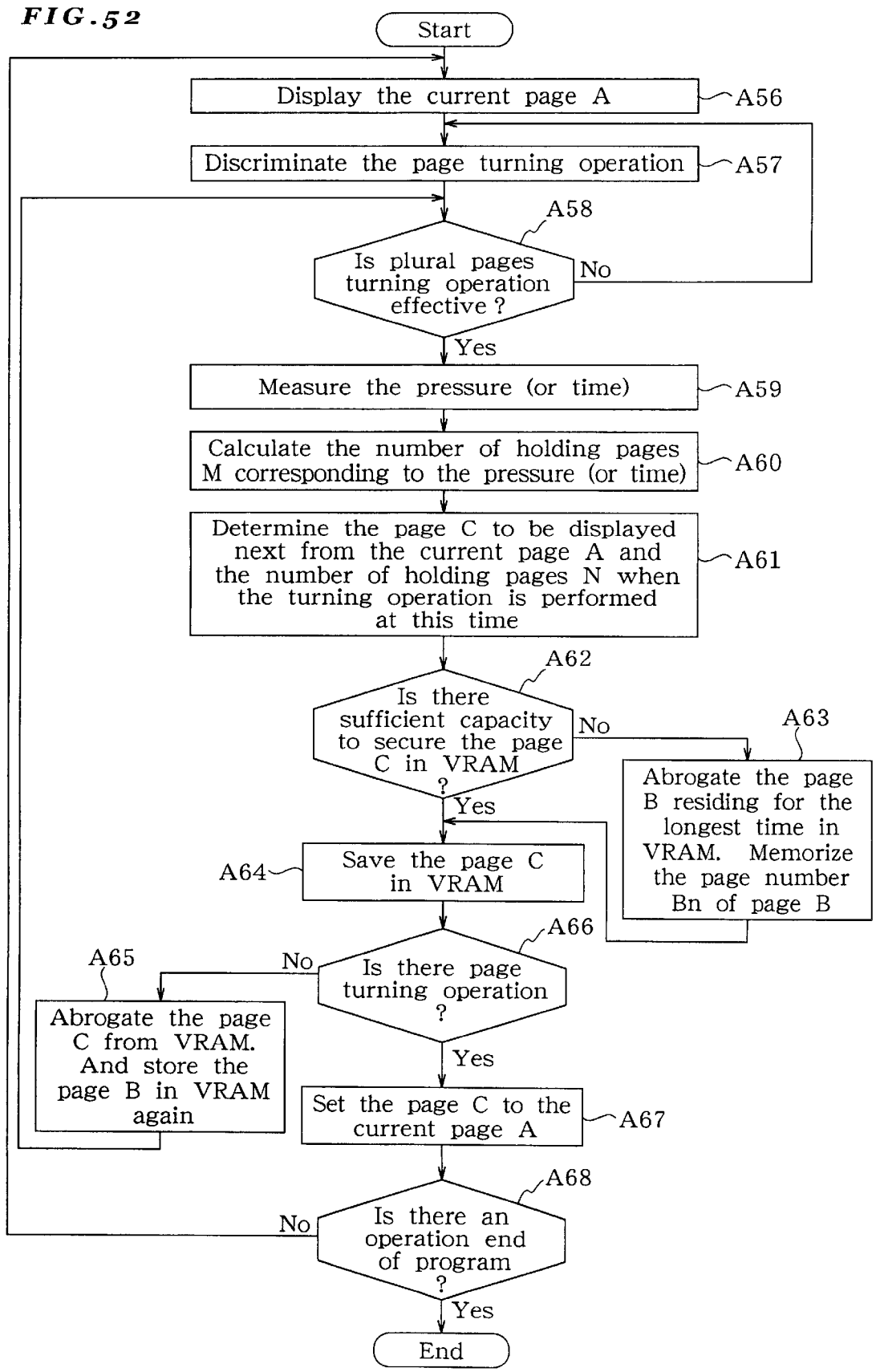
FIG. 52 is a flowchart illustrating an example of a prefetch process in a third example of the invention.

FIG. 52 is a flowchart illustrating an operation of this example. In the example as shown in FIG. 52, a current page A is displayed (step A56). And a page turning operation is identified (step A57). Then it is confirmed whether or not turning plural pages is valid (step A58) In the case of turning plural pages, the pressure is measured (step A59), and the number of pages corresponding to the pressure is calculated (step S60). And from the current page A and the number of holding pages N, a next page C to be displayed at the next time is determined if the turning operation is made at this time (step A61).

And it is checked to see whether or not there is a sufficient capacity to secure the page C in the VRAM (step A62). IF there is less sufficient capacity in the VRAM, the page B which has resided in the VRAM for the longest time is abrogated (step A63). At this time, the page number Bn of the abrogated page B is memorized. On the other hand, if the VRAM has a sufficient capacity to memorize the page C, the page C is stored in the VRAM (step A64).

If the page turning operation is actually performed, the page C is set to the current page (step A67), and the following step is performed (step A68). On the other hand, if there is no page turning operation, turning plural pages has been cancelled, whereby the page C is deleted from the VRAM, and the page B is stored again in the VRAM (step A65).

Figure 53:
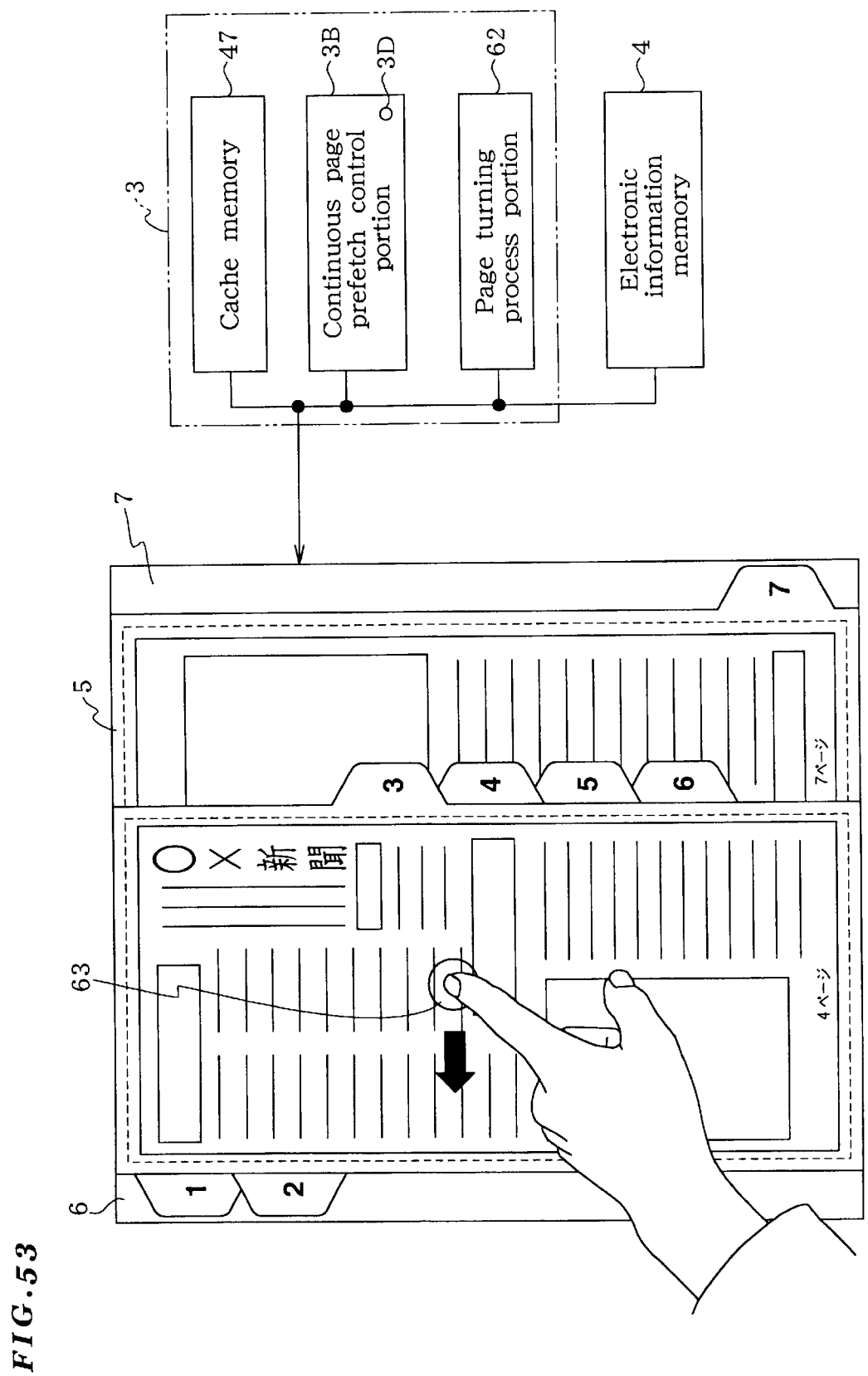
FIG. 53 is an explanatory view illustrating one example of turning plural pages collectively.

FIG. 53 is an explanatory view illustrating one example of a state of turning plural pages collectively. As shown in FIG. 53, in the page information display device of this example, the display controller 3 comprises a cache memory (secondary storage) 47 for memorizing temporarily the page information that is judged to be displayed on the touch panel among the electronic information stored in the electronic information memory 4, a continuous page prefetch control portion 3B for storing in advance the page information having a page number following the page number of the current page being displayed at present on the touch panel in the cache memory, and a page turning process control portion 62 for effecting a page turning process by selecting one or more pages in accordance with an operation on the touch panel 1. And the continuous page prefetch control portion 3B has a plural pages-turning time deleting function 3D of deleting the page data in the plural pages from the cache memory 47, in the case where a page turning operation of plural pages is detected by the page turning process control portion 62.

The continuous prefetch control portion 3B prefetches plural pages following the current page from the storage unit 4 and stores them in the secondary storage 47. On the other hand, the plural pages turning time deleting function 3D is to delete the page data in plural pages from the cache memory 47, if the operation of turning plural pages is detected by the page turning process control portion 62. The data skipped by turning plural pages is deleted from the cache memory 47 to make effective use of the capacity of the cache memory.

Figure 54:
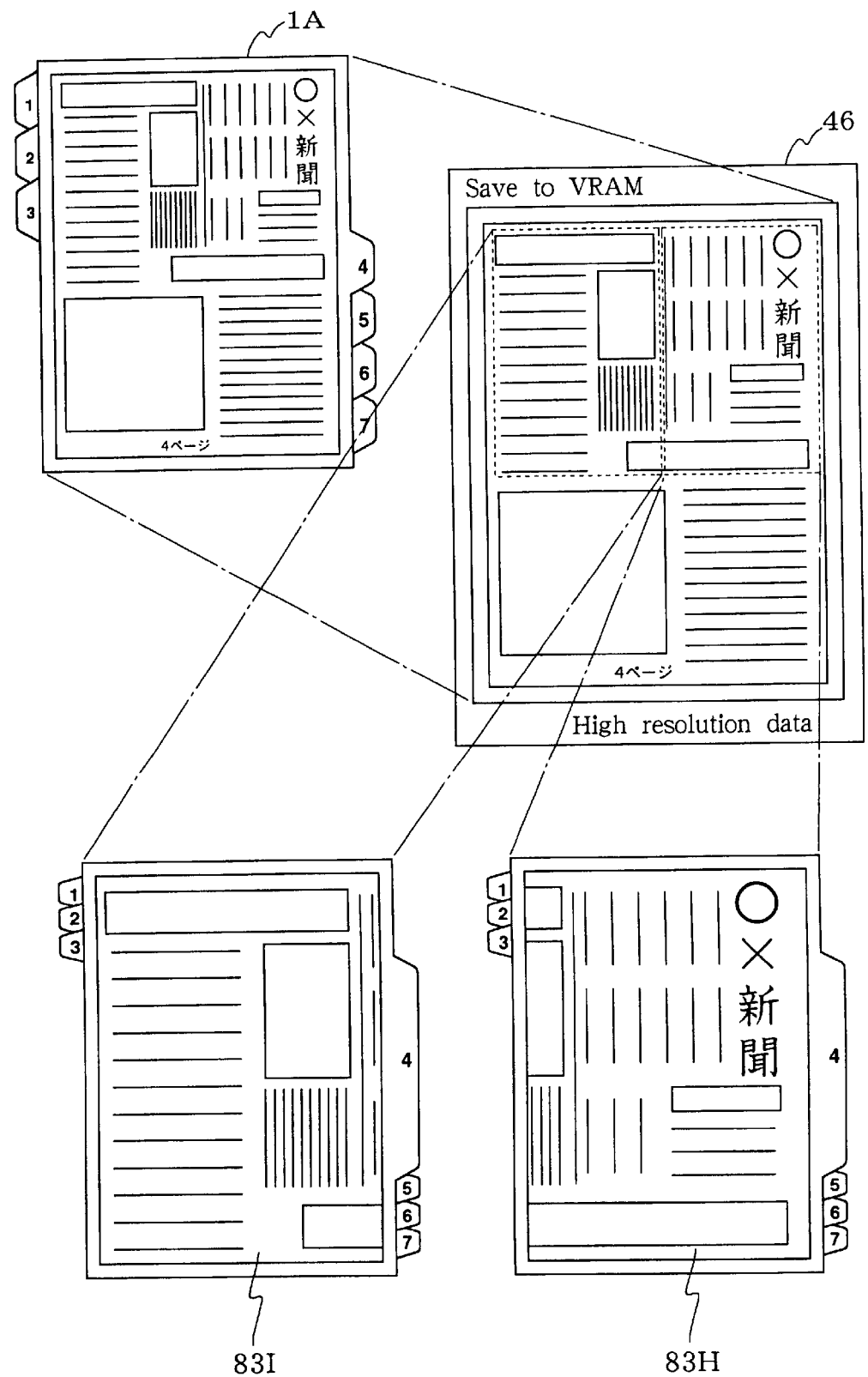
FIG. 54 is an explanatory view illustrating an example in which the page information of high resolution is memorized.
Figure 55:
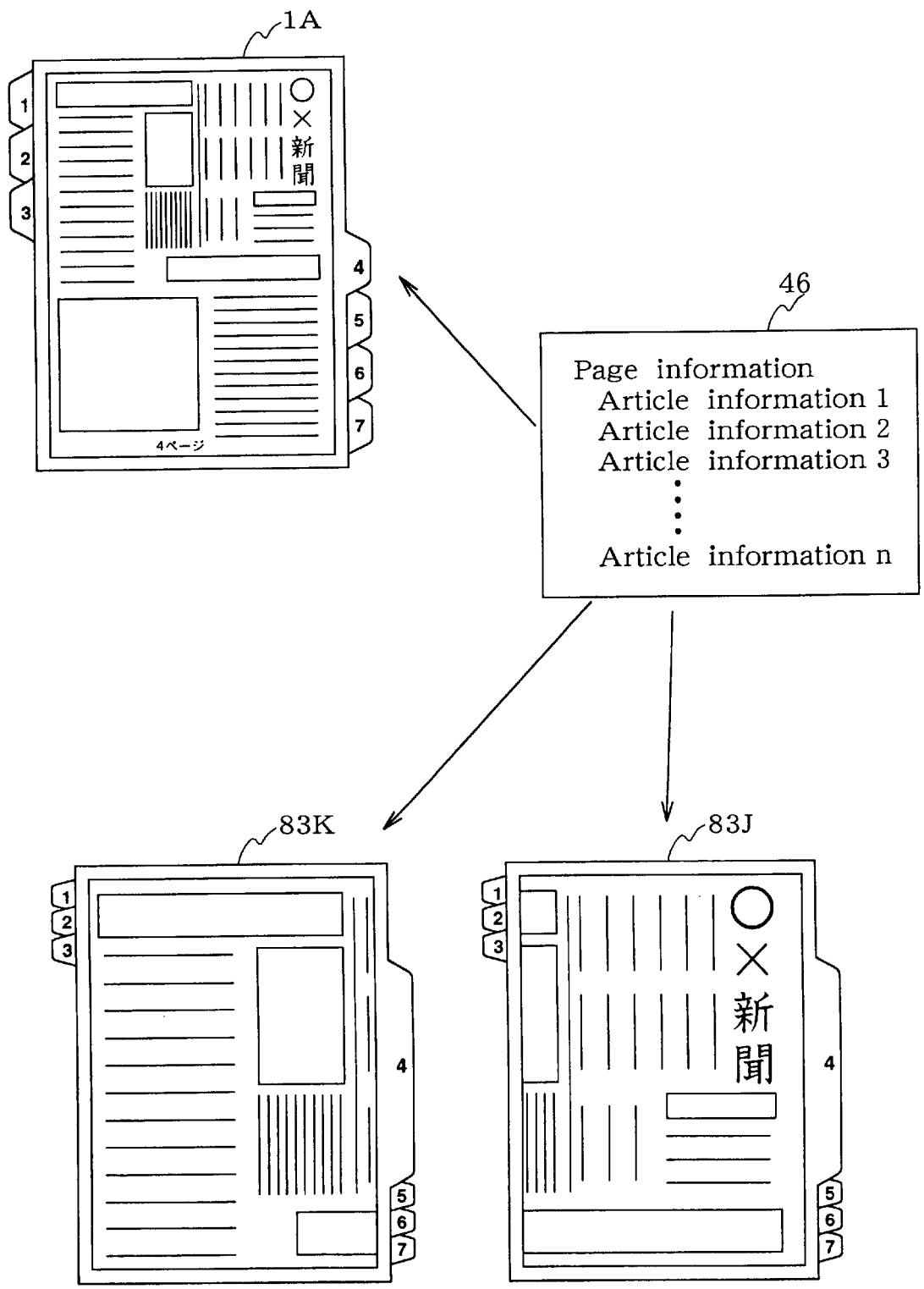
FIG. 55 is an explanatory view illustrating an example in which the page information and the article information are memorized separately.

In the example of dealing with the article information, the display controller 3 may comprise an article information prefetch control portion for storing the article information within the current page in the cache memory if the current page contains the article information. FIG. 54 is an explanatory view illustrating an example for memorizing the page information of high resolution. In the example as shown in FIG. 54, the individual article data is produced from the data of one page. In this example, the article information prefetch control portion creates beforehand the article information while the current page is being displayed, and stores it in the cache memory or VRAM. FIG. 55 is an explanatory view illustrating an example of memorizing the page information and the article information separately. In this case, the article information prefetch control portion reads the individual article information from the storage unit 4, and stores it in the VRAM 46.

Fourth Example

A method of creating the page information accessible by the page information display device from the electronic information 1A stored in the storage unit 4 will be specifically described below. The above page information display device has a capability of access in a universal file format widely used for the electronic information, such as a text format, an image format, an HTML format, an XML format, or a PDF format. Therefore, when the linear information structure of access information is defined, it is desirable that each file format has an information structure in view of the information in a unit of page such as a book. However, as for the specific information structure of each file format, it is presumed that its specific structure can be recognized by the page information display device. The reason is that the page information display device is not intended to analyze the specific structure to each file format as its main purpose, and it is generally considered that the information structure can be easily analyzed from the file format as the conventional art.

The universal file formats widely used as the electronic information can be classified into four categories, depending on the information structure. A first category is typically a text format of information structure. The feature is that the length of one line of sentence, or the size or kind of font, is not defined, and the number of lines is not defined like a rolled book having no unit of page. Therefore, to gain access in a unit of page on the page information display device, the size or kind of font is first defined to determine the amount of information contained in one page. Consequently, the page screen image can be determined, and stored in the storage unit as the access information, which can be accessed on the page information display device.

A second category is an image format of information, such as a bit map format, a TIFF format, a PICT format, a JPEG format, or a GIF format. The page information display device creates the access information having the image size translated so that the image format of information may be fully contained in the access area. Then, the information of the image format is divided by the size of the information access area to create the article information. And the access information and the article information are registered in the page table to enable access with the page information display device.

A third category is typically an HTML format or an XML format of information structure. In order to gain access to these file formats in the page information display device, it is necessary to create a page table corresponding to a hyperlink structure and a frame (means for displaying the electronic information in respective areas of divided display screen). First of all, a conversion method of the hyperlink structure in the page information display device will be described below. The hyperlink structure allows the file on the Internet to be set at the link destination. Therefore, for all the information of HTML format or XML format, it is of no use to define the linear information structure by automatically looping the link destination, because the number of pages is increased without limit. Therefore, the page information display device creates the access information only for the electronic information present within the same domain of electronic information to translate the information in the HTML format or XML format into the linear information structure. If the link destination is outside the same domain, the electronic information is ignored in the process of creating the linear information structure.

A fourth category is a PDF format (manufactured by Adobe: a file format accessible by AcrobatReader) of information structure. Since the electronic information of the PDF format is in a unit of page, the page information display device makes direct use of the electronic information of the PDF format in the given page order. The access information is created by transforming the image information of each page in the electronic information of the PDF format into the size which can be displayed in the access area. When the electronic information of the PDF format has the link structure, the link is ignored to secure the linear information structure, thereby making it possible to gain access to the information structure of the PDF format.

Generally, it is desirable that the data in any of various formats is once transformed into the image data. To handle the access information as the image information, the third party is not allowed to easily alter the content, and the electronic papermark can be readily embedded into the access information according to the conventional art. Also, the access information can be readily applied on the surface of a virtual object as the texture information.

Figure 56:
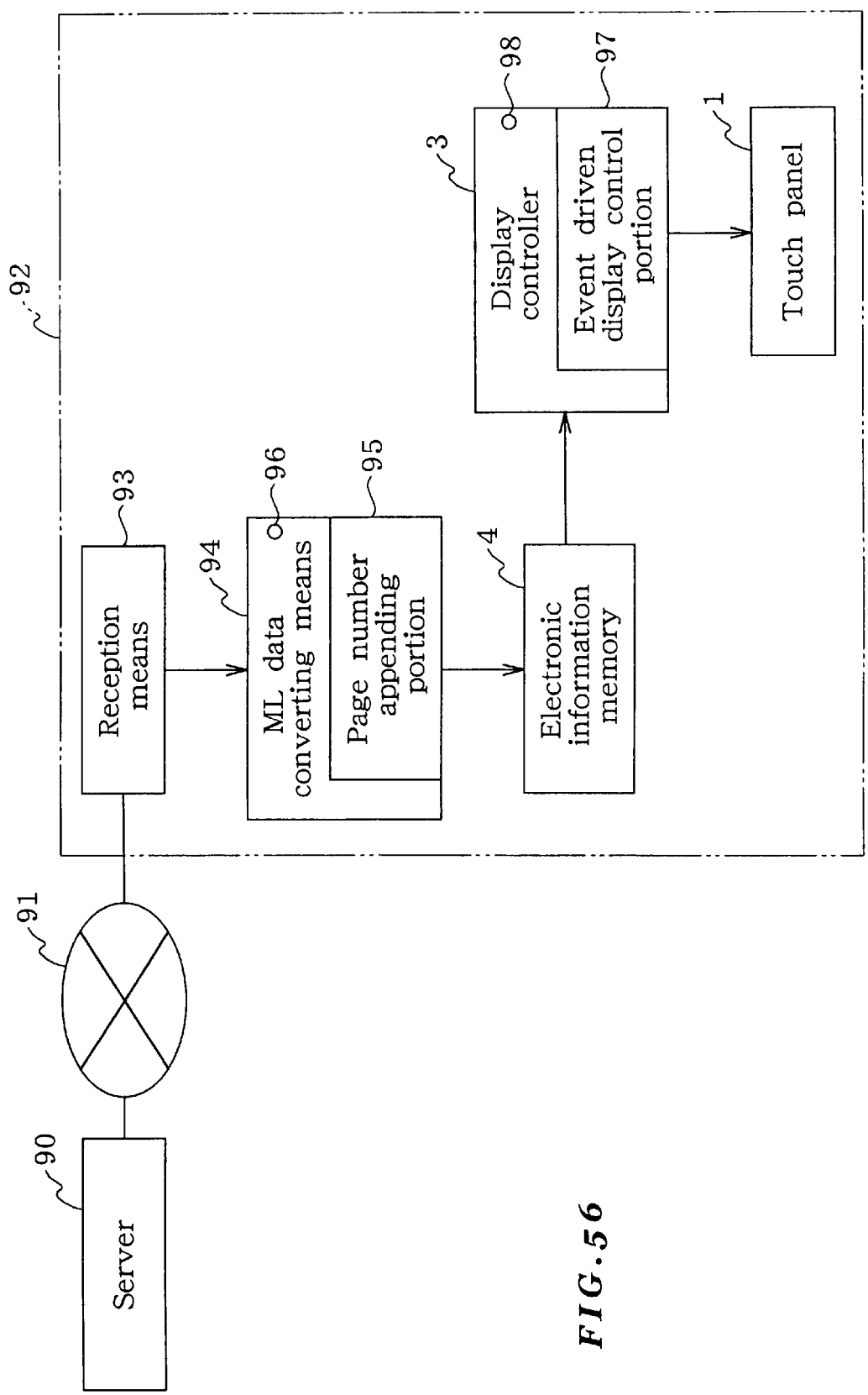
FIG. 56 is a block diagram illustrating a configuration of a page information processing unit that converts the ML data in a fourth example of the invention.

FIG. 56 is a block diagram illustrating a configuration of the page information processing unit that converts the ML data in the fourth example of the invention. In the example as shown in FIG. 56, a page information display device comprises reception means 93 for receiving the ML data described in a make-up language via a communication line from a server, ML data conversion means 94 for converting the ML data received by the reception means 93 into the image data in a unit of page of predetermined size, an electronic information memory 4 for memorizing the page information that is the image data converted by the ML data conversion means 94, a touch panel 1 for displaying the page information stored in this electronic information memory 4 as well as inputting an operation to gain access to the page information, and a display controller 3 for controlling the display of the page information stored in the electronic information memory on the basis of an operation content input into the touch panel 1.

And the ML data conversion means 94 comprises a page number appending portion 95 for converting a link structure of the ML data into one dimensional book structure as well as appending sequentially the page number to the page information after conversion. Further, the display controller 3 comprises an event driven display control portion 97 for selecting the page information of a page having a smaller page number or a larger page number than that of a page being displayed at present on the touch panel as a next page to be displayed at the next time on the basis of a locus from the pointer down to up on the touch panel.

Figure 57A:
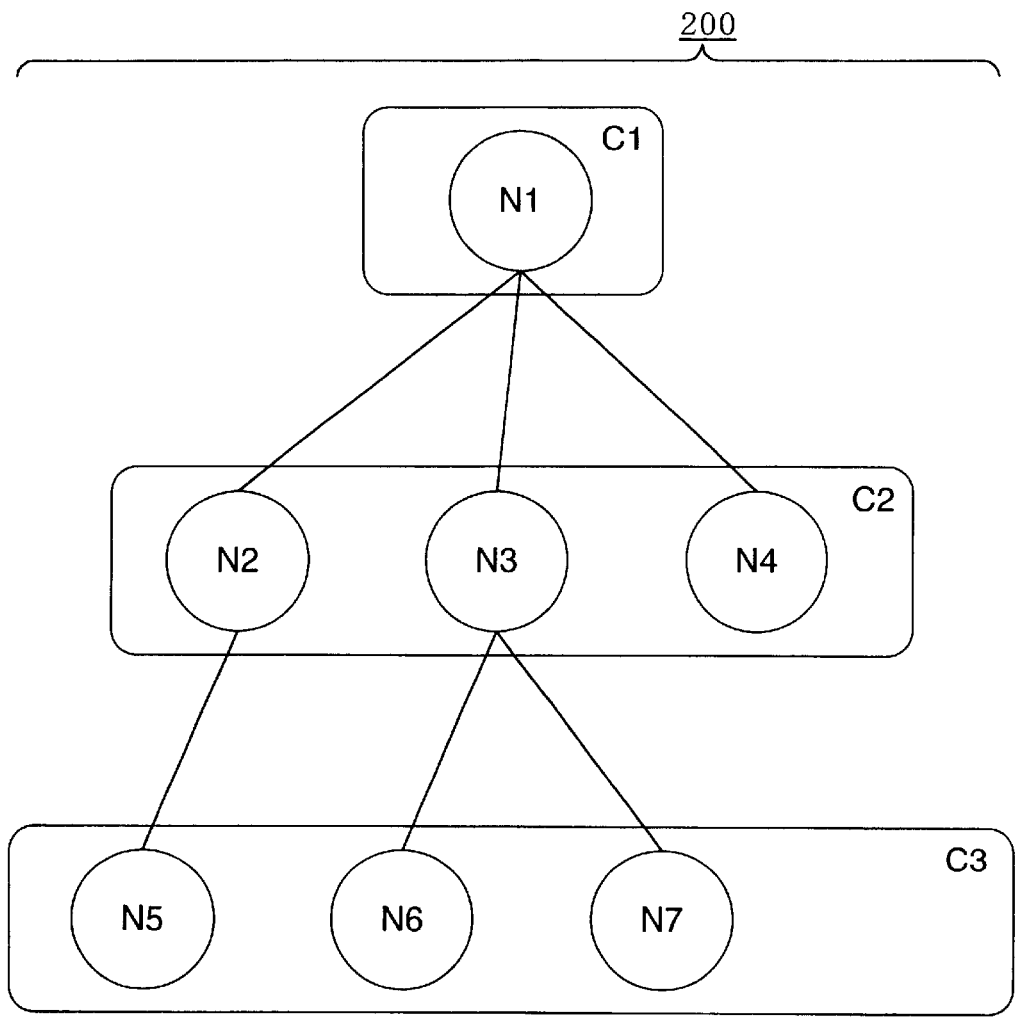
Figure 57B:
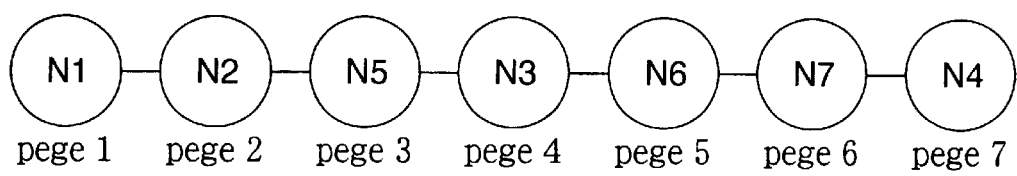

In the example as shown in FIG. 56, the page data described in the make-up language and having the link structure that is the third data format is converted into the linear structure that can be dealt with in this example. FIG. 57 is an explanatory view illustrating one example of the link structure of an ML page, wherein FIG. 57A is a view illustrating one example of the link structure, and FIG. 57B is a view illustrating an example in which the link structure is transformed into the book structure. In the case where the pages N2 to N7 are defined in three hierarchies C1, C2 and C3 from a home page N1 that is a route, these pages can not be directly treated as the page information in this embodiment.

In this example, in the case where the specific ML data is specified in URL, the ML data within its domain is downloaded, and then converted into the book structure. Within a single domain, it is possible to prevent the infinite number of pages from being downloaded by the hyperlink. The page number appending portion 95 converts the link structure of the ML data into the one-dimensional book structure and appends sequentially the page number to the page information after conversion. And the ML data converting means 94 converts the ML data of the structure as shown in FIG. 57 into the image data in the unit of page of predetermined size.

This page number appending portion 95 converts the ML data into the book structure having the linear structure. Because each page is appended with the page number, the operation of turning one page, appending the tag, or holding plural pages is enabled.

In the example as shown in FIG. 57, a link structure 200 as shown in FIG. 57A is translated into the structure as shown in FIG. 57B. Specifically, the ML pages N2, N3, N4 linked under the ML page N1 are arranged in the order of link. Similarly, the ML pages N5, N6, N7 linked under ML the pages N2, N3 are arranged in the order of link under the ML information N2, N3 to be linked. By repeating this scan, the structure as shown in FIG. 57B is produced.

The ML data conversion means may comprise a tree structure converting portion 96 for designating a single tree structure from the link structure 200 of the ML data as well as converting the tree into a one-dimensional book structure by searching the tree in a predetermined search order. This tree structure converting portion 96 searches the link structure of the ML data, giving priority to the depth in the example as shown in FIG. 57. Also, it may search the link structure, giving priority to the width. In the case where the depth is given priority, the preorder scan may be effected outputting from the side closer to the route of tree.

Figure 58:
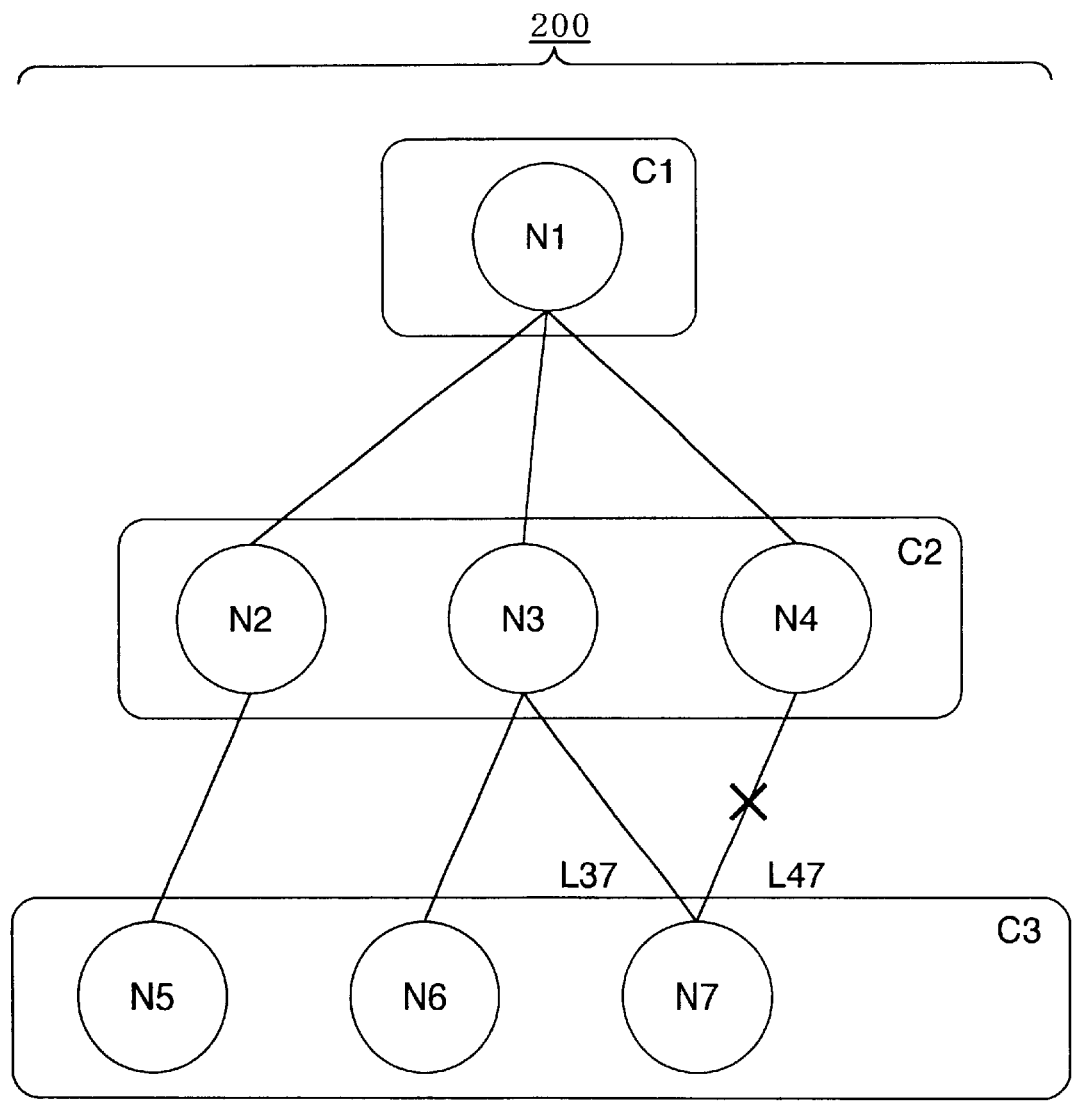
FIG. 58 is an explanatory view illustrating another example of the link structure of the ML page.
Figure 59:
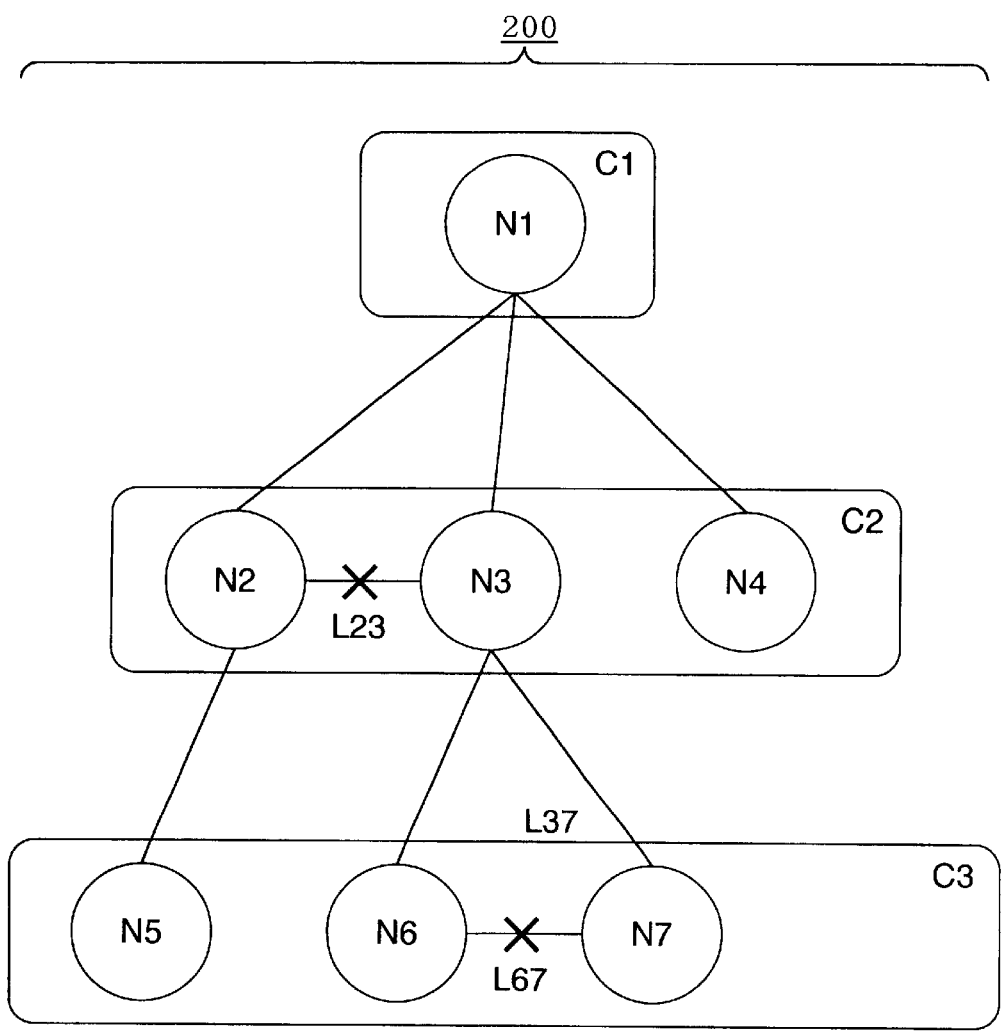
FIG. 59 is an explanatory view illustrating a further example of the link structure of the ML page.

FIG. 58 is an explanatory view illustrating another example of the link structure of the ML page. In this example, in the case where one ML page N7 has links L37 and L47 with two or more ML pages present at an upper hierarchy C2, a link L37 with the ML information N3 having a smaller page number at the hierarchy C2 is made effective, and a link L47 with the page information N4 is ignored. Also, in the case where the link L23, L67 exists at the same hierarchy C2, C3, as shown in FIG. 59, these links are all ignored. In the case where the file of HTML format with a frame defined is the page information, the frame which is a heading for other pages is placed at the upper hierarchy, and the above process is performed.

In the case where the page information is accessed while the ML page is converted, the display controller 3 comprises a tag appending portion 98 for appending a tag indicating a page number of the page information to both end portions of the touch panel 1, the tag appending portion having a converted page tag display function of displaying the tag for the page having the page number appended by the page number appending portion on the touch panel. Then, the position and amount of page information accessible after conversion can be clear.

In the above example, the information provided via the Internet can be accessed with a simple operation.

Fifth Example

Figure 60:
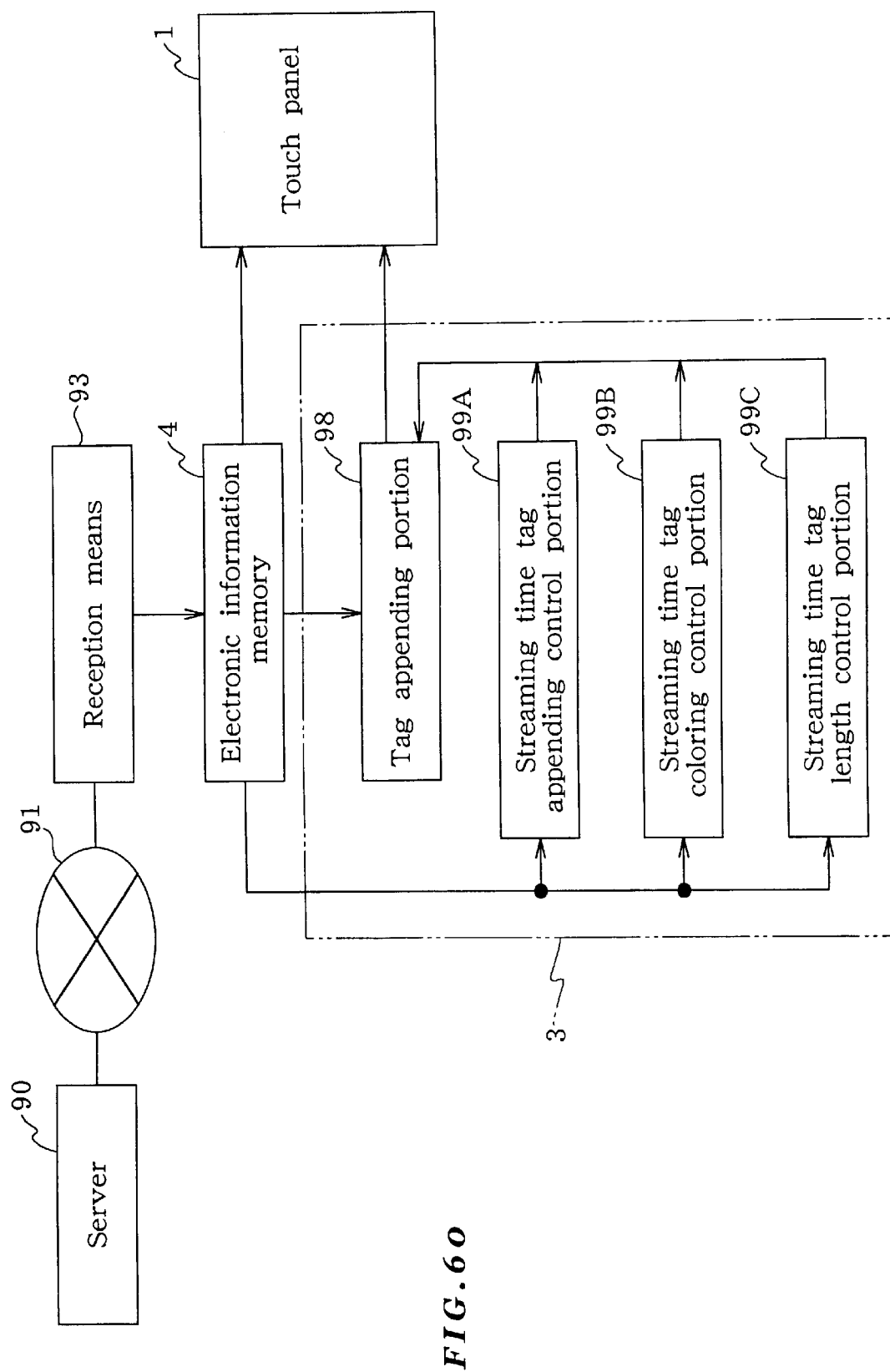
FIG. 60 is a block diagram illustrating a configuration of a page information display device for controlling the tag display at the time of streaming in a fifth example of the invention.

FIG. 60 is a block diagram illustrating a configuration of a page information display device for controlling the tag display at the time of streaming in a fifth example of the invention. As shown in FIG. 60, the page information display device comprises reception means 93 for receiving the page information via a network 91 from a server 90, an electronic information memory 4 for memorizing the page information being received by this reception means 93, a touch panel 1 for displaying the page information stored in the electronic information memory 4 as well as inputting an operation to gain access to the page information, and a display controller 3 for controlling the display of the page information stored in the electronic information memory on the basis of an operation content input into the touch panel 1.

And the display controller 3 comprises a tag appending portion 98 for displaying a tag indicating the content of the page information stored in the electronic information memory on the touch panel, and a streaming time dynamic tag appending control portion 99A for operating the tag appending portion as the page information is being received by the reception means. Since the tag appending control portion 99A appends the tag to the page information downloaded, the user can grasp to which page the page information has been downloaded while perusing the current page.

Also, the display controller 3 may comprise a streaming time dynamic tag coloring control portion 99B for coloring a tag which has been received with a different color from the tags which have not been received, as the page information is being received by the reception means 93, and a streaming time dynamic tag length control portion 99C for enabling the tag appending portion to create a tag having a length corresponding to the amount of information already received in one page of the page information as the page information is being received by the reception means 93.

Figure 61B:
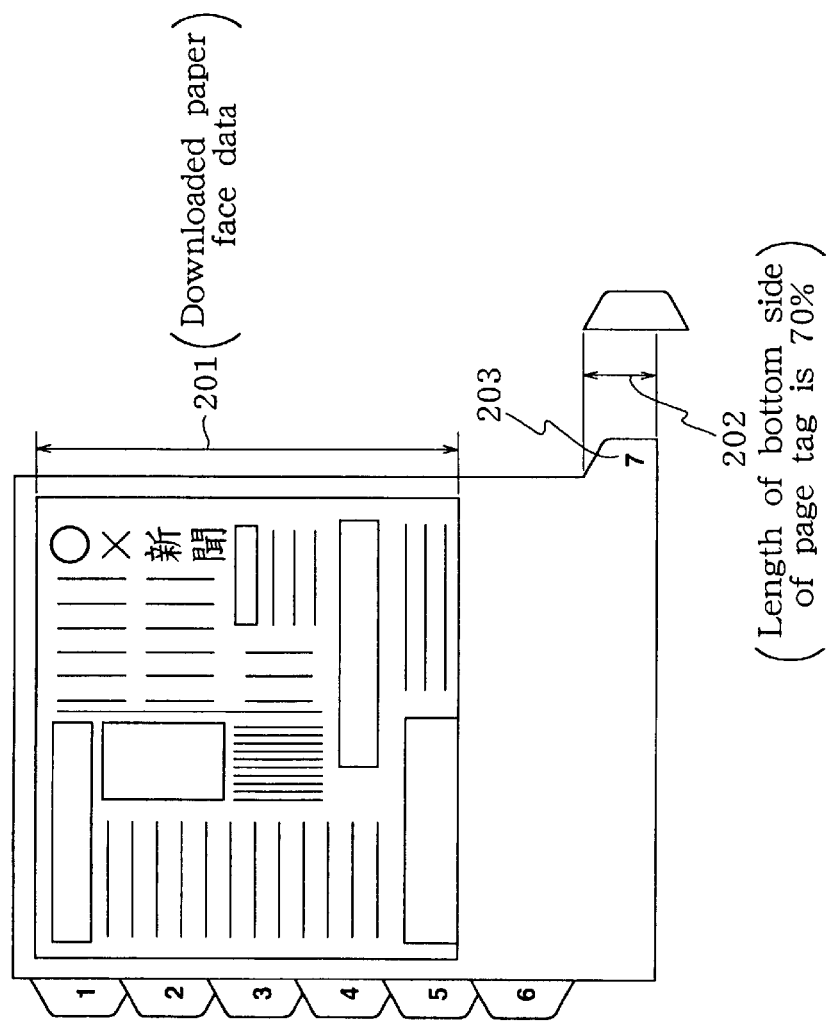
Figure 61A:
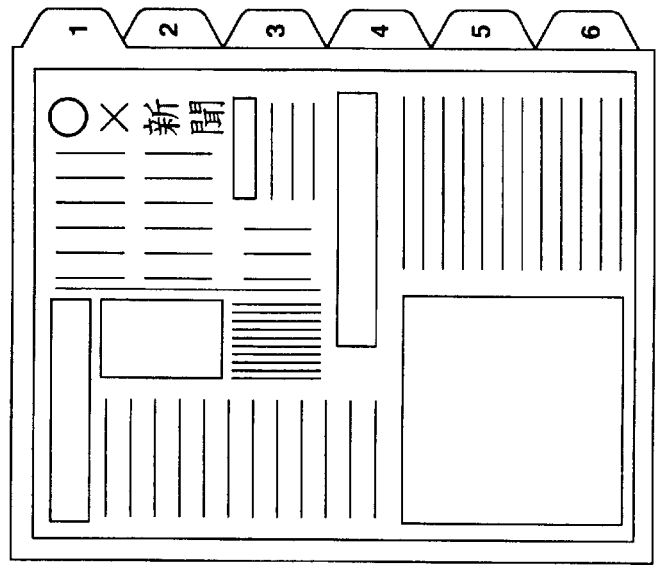

FIG. 61 is a view illustrating an example of controlling the tag display in accordance with the amount of downloaded data in the configuration as shown in FIG. 60, wherein FIG. 61A is a view illustrating an example of displaying the tag for the page which has been completely downloaded, and FIG. 61B is a view illustrating an example of setting the tag for the page being downloaded to the tag length in accordance with the downloaded volume. In this example, when the streaming technique is utilized, the operation is controlled such that in the portion where the display page is not preserved locally, the tag is not displayed. The user is notified that the page can not be accessed by displaying no tag.

In the example as shown in FIG. 61A, the pages up to the sixth page have been downloaded. In the example as shown in FIG. 61B, if the page data has not been downloaded, the length of tag is shortened. To indicate that the enlarging operation is not allowed, the data being downloaded may be interlace displayed.

FIG. 62 is a view illustrating an example of controlling the tag display in accordance with the amount of downloaded data in all pages in the configuration as shown in FIG. 60, wherein FIG. 62A is a view illustrating an example of normally displaying the page tag only, and FIG. 62B is a view illustrating an example of normally displaying the page tag by the length of tag in accordance with the volume of one page that has been downloaded. If the total number of pages in the object (contents) to be downloaded can be first confirmed on the main system side, the page tags corresponding to the total number of pages are drawn, and the page tag of the downloaded page is displayed with the number, as shown in FIG. 62A. For example, for the page data that has not been downloaded, the page number is not displayed so as to clearly distinguish it from the page tag of downloaded page, or the page tag is colored with a different color from the page tag of downloaded page.

In the example as shown in FIG. 62B, in the case where 70% is downloaded, for example, the page tag is displayed 70% in color like a bar graph, whereby a downloaded state of the data by streaming is visualized. As described above, the streaming technique is employed by providing the restriction that the page not downloaded (0%) can not be accessed.

And in the example as shown in FIG. 62B, the seventh page is being downloaded. Since the seventh page has been downloaded by 70%, it is indicated that the bottom side of the page tag (shaped like a trapezoid) is displayed by 70%. Namely, the size of page tag is changed in accordance with the downloaded volume so as to visualize the downloaded volume by streaming clearly.

In this application of the streaming technique, it is presumed that the data of a linear book structure is downloaded. However, the data conversion may be made into the predetermined data format in the same way as in the fourth example. In this case, the display of tag may be made depending on whether the page data is converted or not.

Sixth Example

In a sixth example, various operation contents are stored as a history to make up for a delay of the system response when the user is skilled in the operation. FIG. 63 is an explanatory view illustrating an example of handling the history information in the sixth example of the invention, wherein FIG. 63A is a view illustrating one example of the history information in which the commands for limited operations are memorized, and FIG. 63B is a view illustrating one example of the history information in which the commands for all operations are memorized.

As shown in FIG. 63, the operation history is described in the history information. In the example as shown in FIG. 63A, since the operation history memorized serves as a supplementary function when the drawing method of the system can not be followed, a complex page turning operation (e.g., a direct page turning operation or a continuous page turning operation) wherein the operation and the drawing can not be synchronized well, and an operation (e.g., enlargement or reduction) that is not performed before the drawing is completed may not be described in the history information to avoid the divergence of the operation.

In the example as shown in FIG. 63B, all the operation events are stored in the history information. In a simple page turning operation (sequential page turning operation) if there is a more delay time between the operation and the drawing, the operation is so divergent that the user may be confused. Hence, the number of saving the operation history should be limited to avoid the divergence (i.e., inconsistency behavior between the user's operation image and the system behavior) of the operation. For example, the event description characters of the sequential page turning operation are sequentially described directly from the top on a history file. And an event is processed sequentially from the top, and if processed, its operation event is deleted from the history file.

Figure 64:
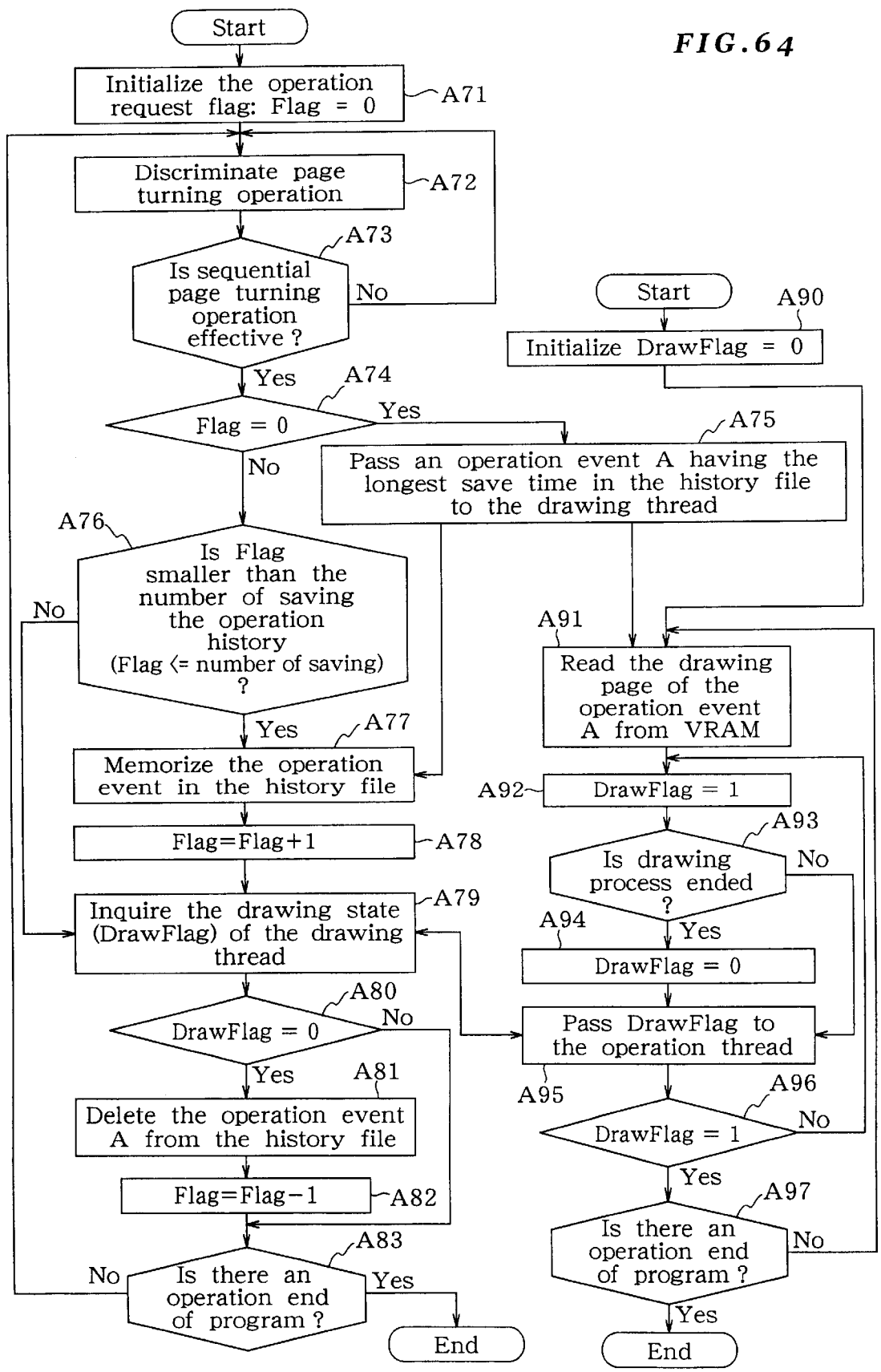
FIG. 64 is a flowchart illustrating a page information display control process using the history information.

FIG. 64 is a flowchart illustrating an example of processing an operation thread and a drawing thread independently. At step A75, the operation and the drawing are connected.

Comparative Example

Some advantages of the embodiments and examples as described above will be described below by comparison with the conventional example. A special display of touch panel type as shown in FIG. 15 is not used, but the computer as shown in FIG. 65 is used to gain access to the page information. However, a computer 100 is a machine having a display unit 102 and a main unit 103. Hence, the user layer who can operate an electronic oven but is not good at reservations of the video program may have an impression of difficulties of operation. In particular, the operation by a keyboard 104 or a mouse 105 is troublesome in the respect of simply accessing the information, as compared with the device as shown in FIG. 15.

Further, when the electronic information provided in the computer is accessed, as opposed to accessing the paper information, the user is required to become skillful in the operations specific to the conventional graphical user interface, using an input unit such as keyboard 104 or mouse 105. Therefore, for example, the user is obliged to perform the operations which is greatly different from a routine work of turning the page such as when the book is read. In particular, it is difficult for the user unfamiliar with the computer to easily gain access to the electronic information.

The operation method specific to the conventional graphical user interface as described herein is to operate a virtual input device which is abstractly displayed on the output unit of the computer, using an input cursor which can be operated by the mouse. The virtual input device means, for example, a scroll bar 303, a pop-up menu 304, and pages 301, 302 or the like of thumbnail representation displayed on the output unit of the computer as shown in FIG. 66.

Figure 66:
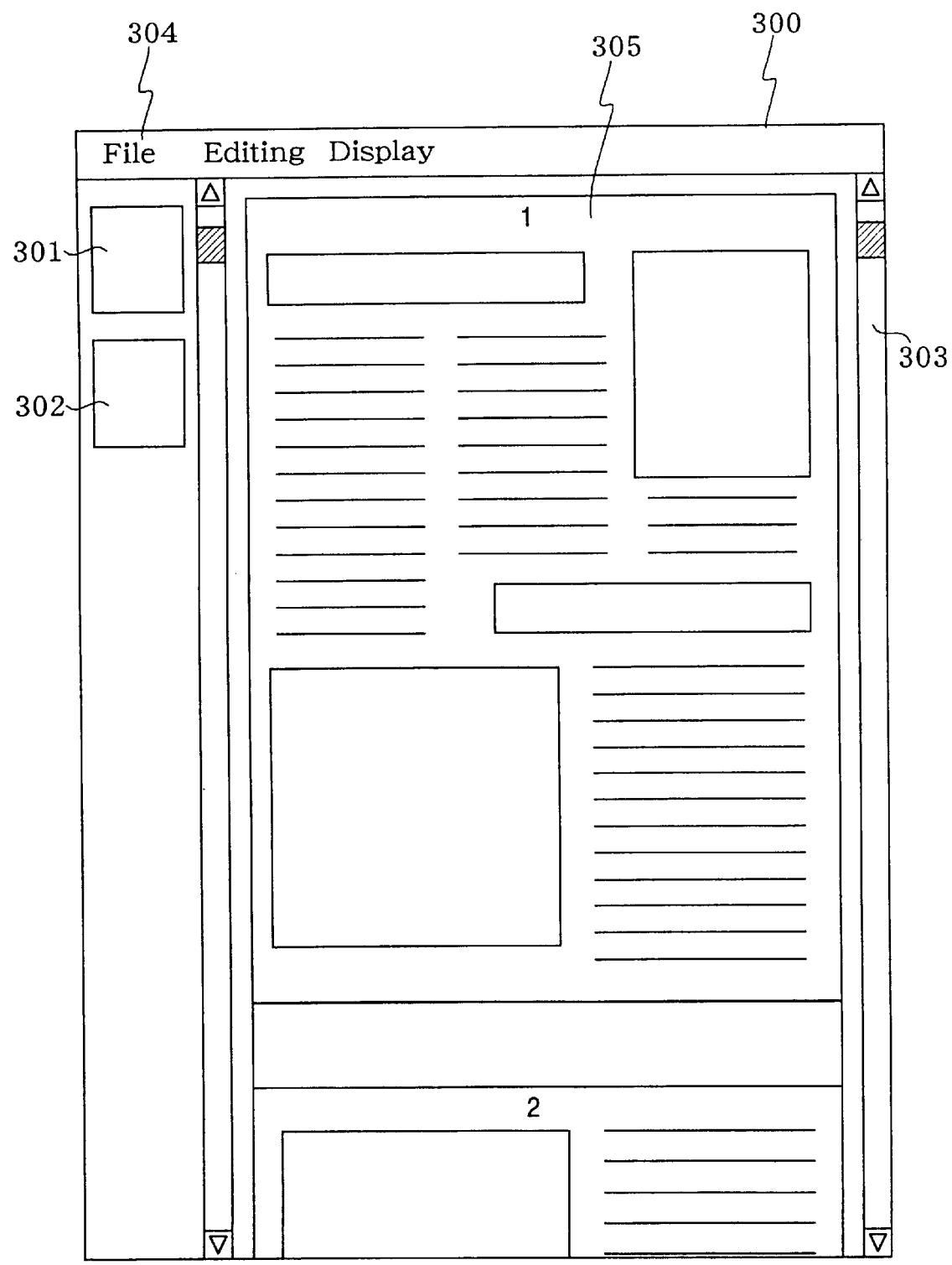
FIG. 66 is an explanatory view illustrating a conventional user interface.

As shown in FIG. 66, the electronic information of one page is displayed on the same screen, including the next page, depending on the size of the display and the amount of electronic information. This is moved by using the scroll bar 303, or the page is moved by using the thumbnail. However, since the scroll bar is artificial and never used in the practical access of books, it is necessary to become skillful in operating appropriately the direction or size.

On the contrary, the present invention makes use of the tag. When the tag is appended to the page of information side by side, most users may recall the label attached to the book. Therefore, it is sufficiently expected that the user is informed to use the tag when the user wants to move the page without any teaching. Further, the total amount of page information can not be known intuitively, depending on the state of the scroll bar. On the other hand, in the above examples, the total amount of page information can be grasped at a glance owing to the tags appended to all the pages. And in the example where the tags are arranged on the left and right sides around the current page, the position of the current page relative to the total pages can be considerably made clearer than the conventional example as shown in FIG. 66.

It is common that the conventional tag for use with the paper or computer has a heading for plainly representing the content of information described in the page. This heading is plainly symbolic of the information extending over plural pages in most cases. Taking a quick look at the tags with the heading, it is not possible to know easily the heading designates the information from what page to what page. Since the heading information is typically composed of words or phrases, the heading information having too great number of characters is difficult to be attached to the tag. In such a case of attaching the heading to the tag with difficulty, the character size of the heading is reduced, or the characters to be written out of the tag are omitted. However, it is considered that the tag to be displayed in this situation does not exactly fulfill duties for the graphical user interface. On the other hand, in the examples of the present invention, since the page number is adopted as the tag content, the page position can be known in small size at a glance. Since the numbers are common throughout the world nations, the interface is consistent without regard to the language.

Figure 67A:
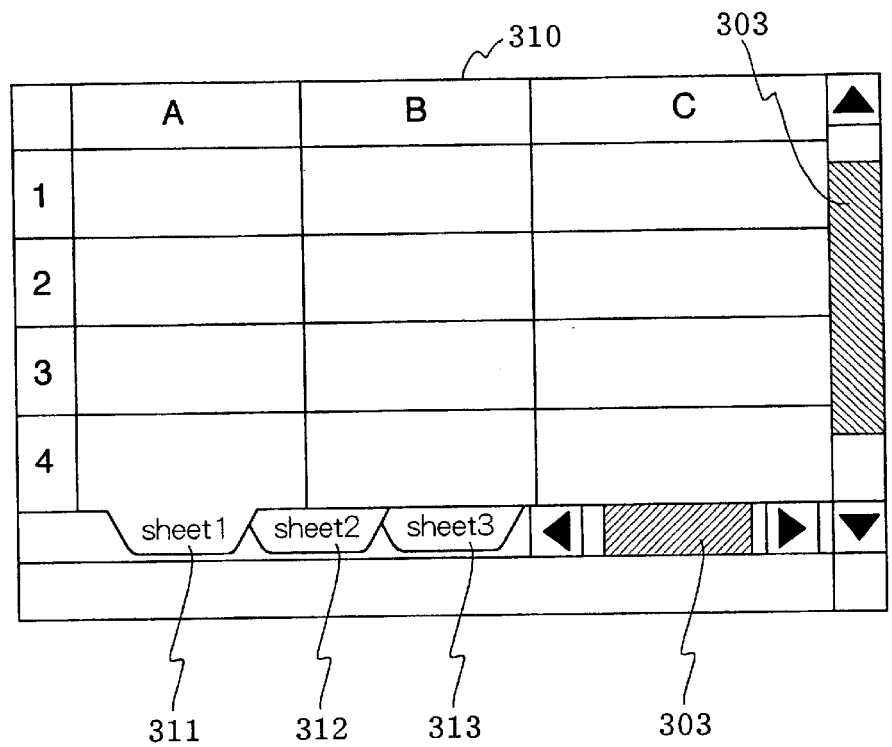
Figure 67B:
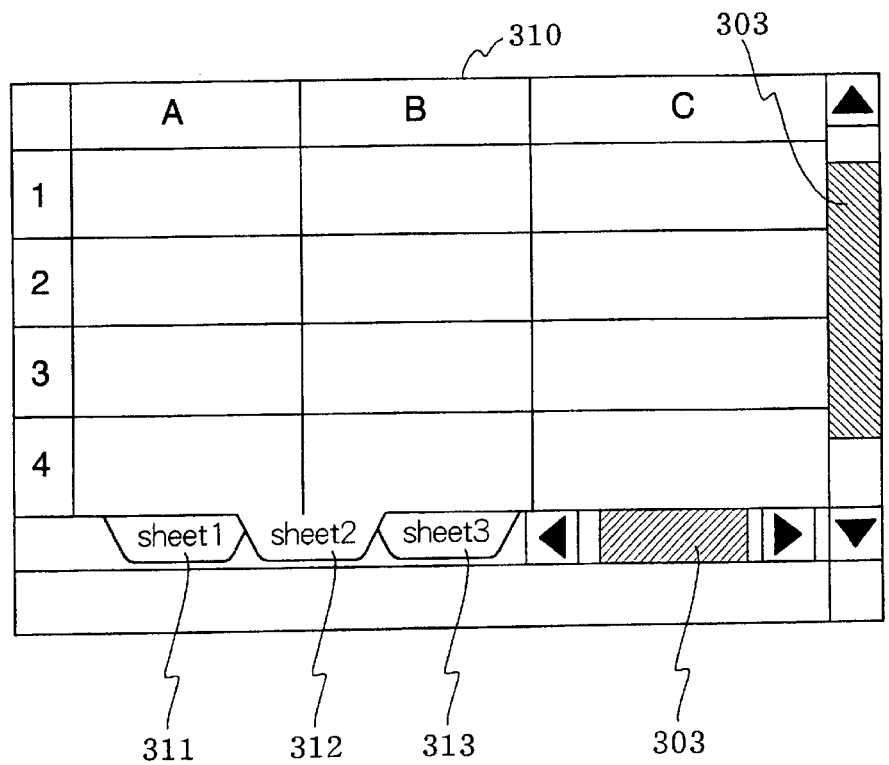

A sheet with tag for use in the spread sheet software (e.g., Excel (trademark) manufactured by Microsoft) is one of the interfaces in which the order of tags is not clearly defined. For instance, if a sheet 1 is opened, the arrangement of sheets is drawn in the order of the sheet 1 indicated by reference numeral 311, a sheet 2 indicated by reference numeral 312, and a sheet 3 indicated by reference numeral 313, as shown in FIG. 67A. However, if the sheet 2 is opened, it is possible to construe the arrangement of sheets in the order of sheet 2, sheet 1, and sheet 3 (or the order of sheet 2, sheet 3 and sheet 1), supposing that the physical sheets of paper are stacked, as shown in FIG. 67B. Only for the reason that the sheets are arranged in the order from the right, there is no gainsaying that the order of sheets is not changed, because it is unnatural visually. Some user layers may feel the interface to lack consistency and be irksome.

The conventional tag does not present a linear information structure (information structure having visually fixed order of sheet 1, sheet 2 and sheet 3 in this example) in accordance with the order of pages such as a book. Therefore, the user may be visually confused with respect to the order of electronic information. It is troublesome, particularly for the purposes of easily gaining access to the information, that the recognition of such information structure may sometimes confuse the user.

On the other hand, due to the arrangement of tags in this example, the user can understand a linear structure of page information from the state of overlapped tags in both the normal and the semantic display. After turning the page, the height or ratio of tag is consistently maintained. Accordingly, this interface may become attached to many users.

The present invention is configured and functions as described above and can provide a page information display method superior to the conventional display method in that when a dragging is made in a direction parallel or anti-parallel to the page turning direction, an operation of turning one page is effected in accordance with the dragging direction, and the pages of electronic information can be turned with the same operation as the movement of a user's hand when the actual pages of paper are turned, whereby the user unfamiliar with the computer can intuitively master the operations required to gain access to the electronic information, and the readers of the electronic information can be extended over the wide classes of society beyond the computer users.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2000-078220 (Filed on Mar. $21^{st}$, 2000) including specification, claims, drawings and summary are incorporated herein by reference in its entirety.

What is claimed is:

1. A page information display method for displaying the electronic information, employing an information access device having a storage unit for storing the electronic information having plural pages of information in a unit of page of predetermined size, a display unit for displaying the electronic information stored in said storage unit in said unit of page, and an operation unit for inputting an operation to gain access to said page information, said operation unit being provided in the substantially same area as said display unit, comprising:

a page turning operation detecting step of outputting a page turning operation detecting signal having the number of holding pages and a page turning direction defined, when a page turning operation for turning one or more pages is performed in said operation unit;

a next display page setting step of setting a preceding page or a succeeding page by said number of holding pages before or after the current page depending on said page turning direction to a next display page to be displayed at the next time, when the page turning operation is completed in said page turning operation detecting step and the page turning operation detecting signal is output; and a page turning process step of displaying the next display page set in said next display page setting step in place of said current page on said display unit, said page turning process step further comprising:

a next display page reading substep of reading said next display page from said storage unit, when said next display page is set;

a turning state display data creating substep of transforming the current page data making up the current page that is being displayed on said display unit at every unit display time, as well as creating the turning state display data into which said current page is transformed, when said page turning operation detecting signal is output; and a turning state display data overwriting step of overwriting the turning state display data created in said turning state display data creating substep on the next display data read in said next display page reading substep at every unit display time until said turning state display data is exhausted.

2. The page information display method according to claim 1, wherein turning state display data creating step further comprises an overwriting display control substep of deleting an area on the start point side in the page turning direction at every said unit time.

3. The page information display method according to claim 1, wherein said turning state display data creating step further comprises a slide display control substep of deleting an area on the end point side in the page turning direction at every said unit time as well as shifting the current page data by the amount of said deleted area in the page turning direction.

4. The page information display method according to claim 1, wherein said turning state display data creating step further comprises a compression display control substep of reducing the display length in the page turning direction at every said unit time as well as compressing said current page data to said reduced display length in said page turning direction.

5. The page information display method according to claim 1, wherein said turning state display data creating step further comprises:
   a three dimensional space defining substep of defining a virtual space in a normal direction of said display unit;
   a current page rotating and transforming substep of rotating and transforming said current page within said virtual space around the end point side in said page turning direction; and
   a three dimensional display control sub step of drawing a front side and a back side of the current page rotated and virtually transformed in said current page rotating substep in a two dimensional plane as viewed in a normal direction of said display unit as well as setting said drawing data to the turning state display data.

6. The page information display method according to claim 1, wherein said turning state display data creating step further comprises a substep of creating the turning state display data having said current page integrated with a tag portion, when a tag is appended to said current page.

7. The page information display method according to claim 1, wherein said turning state display data creating step further comprises a substep of transforming said current page ahead of transforming each of said holding pages, when the number of holding pages detected in said page turning operation detecting step is greater than one.

8. A page information display device having an electronic information memory for memorizing the electronic information having plural pages of information in a unit of page of predetermined size, a touch panel for displaying the electronic information stored in said electronic information memory in said unit of page, as well as inputting an operation to gain access to said page information, and a display controller for controlling the display of the page information stored in said electronic information memory on the basis of an operation content input into said touch panel,
   wherein said display controller comprises:
      a page turning operation detecting portion for outputting a page turning operation detecting signal with the number of holding pages and a page turning direction defined, when a page turning operation for turning one or more pages is performed on said touch panel;
      a next display page setting portion for setting a preceding page or a succeeding page by said number of holding pages before or after the current page depending on said page turning direction to a next display page to be displayed at the next time, when the page turning operation is completed in said page turning operation detecting portion and the page turning operation detecting signal is output; and
      a page turning process portion for displaying the next display page set in said next display page setting portion in place of said current page on said display unit,
   wherein said page turning process portion comprises:
      a next display page reading function of reading said next display page from said electronic information memory, when said next display page is set;
      a turning state display data creating function of transforming the current page data making up the current page that is being displayed on said touch panel at every unit display time as well as creating the turning state display data into which said current page is transformed, when said page turning operation detecting signal is output; and
      a turning state display data overwriting function of overwriting the turning state display data created in said turning state display data creating function on the next display page read in said next display page reading function until said turning state display data is exhausted.

9. A storage medium for storing a page information display program for displaying the electronic information, employing an information access device having an electronic information memory for memorizing the electronic information having plural pages of information in a unit of page of predetermined size, a touch panel for displaying the electronic information stored in said electronic information memory in said unit of page, as well as inputting an operation to gain access to said page information, and a display controller for controlling the display of the page information stored in said electronic information memory on the basis of an operation content input into said touch panel,
   wherein said page information display program comprises, as the commands for operating said display controller:
      a page turning operation detecting command for outputting a page turning operation detecting signal with the number of holding pages and a page turning direction defined, when a page turning operation for turning one or more pages is performed on said touch panel;
      a next display page setting command for setting a preceding page or a succeeding page by said number of holding pages before or after the current page depending on said page turning direction to a next display page to be displayed at the next time, when the page turning operation is completed in accordance with said page turning operation detecting command and the page turning operation detecting signal is output; and
      a page turning process command for displaying the next display page set in accordance with said next display page setting command in place of said current page on said display unit,
   said page turning process command further comprising:
      a next display page reading command for reading said next display page from said electronic information memory, when said next display page is set;
      a turning state display data creating command for transforming the current page data making up the current page that is being displayed on said display unit at every unit display time as well as creating the turning state display data into which said current page is transformed, when said page turning operation detecting signal is output; and
      a turning state display data overwriting command for overwriting the turning state display data created in accordance with said turning state display data creating command on the next display page read in accordance with said next display page reading command at every unit display time until said turning state display data is exhausted.

* * * * *